(12) United States Patent
Xue et al.

(10) Patent No.: US 10,687,332 B2
(45) Date of Patent: Jun. 16, 2020

(54) INFORMATION TRANSMISSION METHOD, USER EQUIPMENT, AND BASE STATION

(71) Applicant: HUAWEI TECHNOLOGIES CO., LTD., Shenzhen, Guangdong (CN)

(72) Inventors: Lixia Xue, Beijing (CN); Lei Guan, Beijing (CN); Yongxing Zhou, Beijing (CN); Jingyuan Sun, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 150 days.

(21) Appl. No.: 15/947,876

(22) Filed: Apr. 9, 2018

(65) Prior Publication Data

US 2018/0227915 A1    Aug. 9, 2018

Related U.S. Application Data

(63) Continuation of application No. 15/217,542, filed on Jul. 22, 2016, now Pat. No. 9,961,681, which is a
(Continued)

(30) Foreign Application Priority Data

Jan. 24, 2014    (WO) ................ PCT/CN2014/071323

(51) Int. Cl.
*H04W 72/04* (2009.01)
*H04L 27/227* (2006.01)
(Continued)

(52) U.S. Cl.
CPC ..... *H04W 72/0446* (2013.01); *H04L 27/2278* (2013.01); *H04L 27/26* (2013.01);
(Continued)

(58) Field of Classification Search
CPC . H04L 7/007; H04L 27/2278; H04L 27/2663; H04L 65/10
See application file for complete search history.

(56) References Cited

U.S. PATENT DOCUMENTS 9,065,630 B1    6/2015   Xiao et al.
9,166,718 B2   10/2015   Chen et al.
(Continued)

FOREIGN PATENT DOCUMENTS

CN    101601194 A   12/2009
CN    101690340 A    3/2010
(Continued)

OTHER PUBLICATIONS

NTT docomo et al:"pilot sequence allocation method in E-UTRA uplink", R1-061678, 3GPP TSG RAN WG1 LTE Ad Hoc, Cannes, France, Jun. 27-30, 2006, Jun. 20, 2006, 6 pages.
(Continued)

*Primary Examiner* — Raj Jain
(74) *Attorney, Agent, or Firm* — Huawei Technologies Co., Ltd.

(57) ABSTRACT

Embodiments of the present application provide a method for acquiring information of access resources, a terminal device, and a base station. A terminal device detects a synchronization signal of a cell to be accessed by the terminal device. The terminal device further receives a broadcast channel of the cell on a broadcast channel resource. The terminal device then determines a resource on which the cell is located according to resource indication information carried in the broadcast channel. The broadcast channel resource corresponds to an actual access resource, and the synchronization signal is detected on the actual access resource. The actual access resource is one of a plurality of candidate access resources of the cell. The resource indication information indicates a location relation-
(Continued)

ship between the actual access resource and the resource on which the cell is located.

22 Claims, 9 Drawing Sheets

Related U.S. Application Data continuation of application No. PCT/CN2014/087549, filed on Sep. 26, 2014.

(51) Int. Cl.
- *H04L 7/00* (2006.01)
- *H04L 27/26* (2006.01)
- *H04W 48/16* (2009.01)
- *H04W 4/02* (2018.01)
- *H04W 4/06* (2009.01)
- *H04W 74/08* (2009.01)

(52) U.S. Cl.
CPC ............ *H04W 4/025* (2013.01); *H04W 4/06* (2013.01); *H04W 48/16* (2013.01); *H04W 74/0833* (2013.01); *H04L 7/007* (2013.01)

(56) References Cited

U.S. PATENT DOCUMENTS

| | | | |
|---|---|---|---|
| 9,615,343 B2 * | 4/2017 | Seo | H04W 56/002 |
| 2002/0006176 A1 | 1/2002 | Motojima | |
| 2009/0196279 A1 | 8/2009 | Kim et al. | |
| 2010/0020905 A1 * | 1/2010 | Mansour | H04J 11/00 375/343 |
| 2010/0118839 A1 | 5/2010 | Malladi et al. | |
| 2010/0135257 A1 | 6/2010 | Higuchi et al. | |
| 2010/0250688 A1 * | 9/2010 | Sachs | H04L 47/12 709/206 |
| 2011/0013531 A1 | 1/2011 | Liu | |
| 2011/0069637 A1 | 3/2011 | Liu et al. | |
| 2011/0092200 A1 * | 4/2011 | Charbit | H04J 11/0069 455/424 |
| 2011/0261767 A1 | 10/2011 | Ji et al. | |
| 2012/0008615 A1 | 1/2012 | Inoue et al. | |
| 2012/0231790 A1 * | 9/2012 | Lindoff | H04W 56/0015 455/434 |
| 2013/0107851 A1 | 5/2013 | Park et al. | |
| 2013/0142138 A1 | 6/2013 | Dinan | |
| 2013/0201913 A1 * | 8/2013 | Niemela | H04L 25/0226 370/328 |
| 2013/0203419 A1 | 8/2013 | Siomina et al. | |
| 2014/0016596 A1 | 1/2014 | Kim et al. | |
| 2014/0036820 A1 | 2/2014 | McNamara et al. | |
| 2014/0192759 A1 | 7/2014 | Son et al. | |
| 2014/0269605 A1 | 9/2014 | Pecen et al. | |
| 2014/0341175 A1 | 11/2014 | Beale et al. | |
| 2015/0063265 A1 | 3/2015 | Seo et al. | |
| 2015/0319023 A1 | 11/2015 | Luo et al. | |
| 2015/0333859 A1 | 11/2015 | Lindoff et al. | |
| 2015/0341803 A1 | 11/2015 | Kim et al. | |
| 2016/0112979 A1 * | 4/2016 | Takano | H04W 72/042 370/336 |
| 2016/0338056 A1 * | 11/2016 | Xue | H04W 4/06 |

FOREIGN PATENT DOCUMENTS

| | | |
|---|---|---|
| CN | 101924724 A | 12/2010 |
| CN | 101932075 A | 12/2010 |
| CN | 102014462 A | 4/2011 |
| CN | 102113254 A | 6/2011 |
| CN | 102123432 A | 7/2011 |
| CN | 102238610 A | 11/2011 |
| CN | 102355325 A | 2/2012 |
| CN | 102362455 A | 2/2012 |
| CN | 102378190 A | 3/2012 |
| CN | 102438249 A | 5/2012 |
| CN | 102484871 A | 5/2012 |
| CN | 102547738 A | 7/2012 |
| CN | 102595605 A | 7/2012 |
| CN | 102752769 A | 10/2012 |
| CN | 102843180 A | 12/2012 |
| CN | 102843747 A | 12/2012 |
| CN | 102858014 A | 1/2013 |
| CN | 103068032 A | 4/2013 |
| CN | 103379079 A | 10/2013 |
| EP | 2696548 A2 | 2/2014 |
| JP | 2010507315 A | 3/2010 |
| JP | 2011504310 A | 2/2011 |
| JP | 2012533933 A | 12/2012 |
| WO | 2009147498 A1 | 12/2009 |
| WO | 2010116880 A1 | 10/2010 |
| WO | 2012104634 A1 | 8/2012 |
| WO | 2012138097 A2 | 10/2012 |
| WO | 2012104629 A3 | 12/2012 |

OTHER PUBLICATIONS

NTT Docomo: "Physical Channel Concept for Scalable Bandwidth in Evolved UTRA Downlink",3GPP Draft; 3GPP TSG RAN WG1 Ad Hoc on LTE, Sophia Antipolis, France, Jun. 20-21, 2005, R1-050592. Jun. 16, 2005, XP050950726, 14 pages.

Sharp: "Common search space design for ePDCCH", 3GPP Draft; 3GPP TSG RAN WG1 Meeting#68, Dresden, Germany, Feb. 6-10, 2012, R1-120280, XP050562819, Jan. 31, 2012, 3 pages.

Aleksandar Damnjanovic et al: "UE's role in LTE advanced heterogeneous networks", vol. 50, No. 2, Feb. 1, 2012 , XP011417053, 13 pages.

Ericsson, ST-Ericsson, New WI proposal: New Carrier Type for LTE-Core Part. 3GPP TSG-RAN Meeting#57, Chicago, USA, Sep. 4-7, 2012, RP-121415, 6 pages.

Ericsson, ST-Ericsson, New WI proposal: New Carrier Type for LTE-Feature. 3GPP TSG-RAN Meeting#57, Chicago, USA, Sep. 4-7, 2012, RP-121415, 6 pages.

Ericsson, ST-Ericsson, New WI proposal: New Carrier Type for LTE-Performance Part. 3GPP TSG-RAN Meeting#57 Chicago, USA, Sep. 4-7, 2012, RP-121415, 5 pages.

Samsung,"Time and frequency tracking on new carrier type",3GPP TSG RAN WG1 Meeting #68 R1-120163,Dresden, Germany, Feb. 6-10, 2012,total 4 pages.

Motorola Mobility,"Configuration of EPDCCH",3GPP TSG RAN WG1 #70 R1-123788,Aug 13, 2012-Aug 18, 2012,total 6 pages.

* cited by examiner

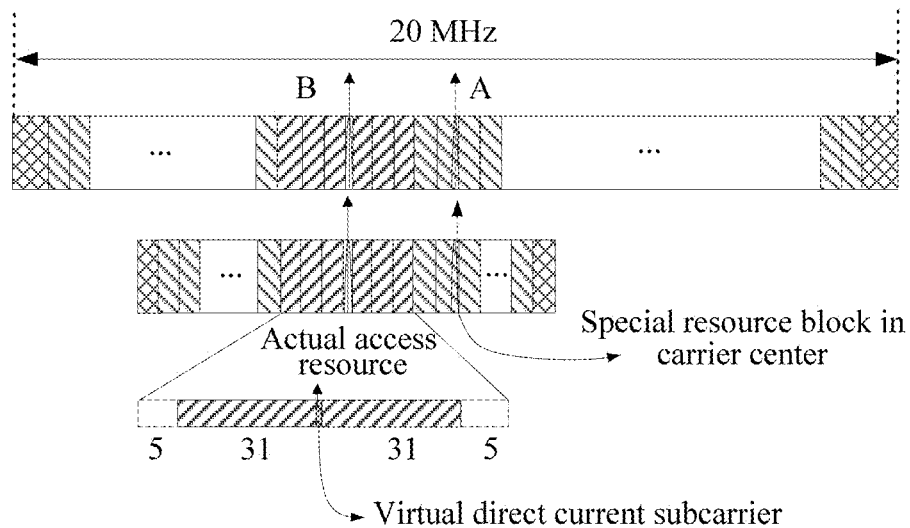

FIG. 5

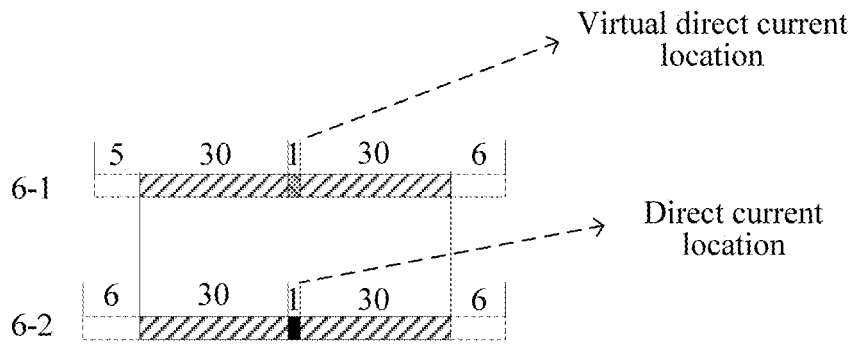

FIG. 6

| Determine an actual access resource of a current cell and an actual sequence of a synchronization signal of the current cell, where the actual access resource is at least one candidate access resource in multiple candidate access resources used by the current cell to send the synchronization signal, the actual sequence is one of at least one candidate sequence of the synchronization signal, and any candidate sequence in the at least one candidate sequence corresponds to one of the multiple candidate access resources | 701 |

↓

| Send the synchronization signal on the actual access resource by using the actual sequence | 702 |

FIG. 7

INFORMATION TRANSMISSION METHOD, USER EQUIPMENT, AND BASE STATION

CROSS-REFERENCE TO RELATED APPLICATIONS

This application is a continuation of U.S. patent application Ser. No. 15/217,542, filed on Jul. 22, 2016, which is a continuation of International Patent Application No. PCT/CN2014/087549, filed on Sep. 26, 2014. The International Patent Application No. PCT/CN2014/087549 claims priority to International Patent Application No. PCT/CN2014/071323, filed on Jan. 24, 2014. All of the aforementioned patent applications are hereby incorporated by reference in their entireties.

TECHNICAL FIELD

The present application relates to the communications field, and in particular, to an information transmission method, user equipment, and a base station.

BACKGROUND

In a Long Term Evolution (LTE) system release 10 and earlier releases, a process of accessing an LTE system by user equipment (UE) includes the following:

The UE detects a primary synchronization signal (PSS), and then a secondary synchronization signal (SSS) by using a time domain location relationship between the two, so as to achieve an initial synchronization of time and frequency. The initial synchronization includes symbol, subframe, and frame synchronization. The UE further acquires a physical cell identifier by using a combination of sequences of the detected PSS and SSS. A length of a cyclic prefix is determined according to a time interval between the PSS and the SSS. Then, the UE determines a cell-specific reference signal (CRS) to measure a cell. If a measurement result is relatively good, the UE reads system information A physical broadcast channel (PBCH) is first read to obtain information such as downlink system bandwidth, CRS antenna port, system frame number, physical HARQ indicator channel (PHICH) configuration information. Then, a first system information block (SIB) SIB1 is read, and other SIBs are read according to configuration information of the SIB 1. For example, a second SIB 2 is read to acquire random access configuration information. On the foregoing premise, if a service requires transmission, random access request may be sent to a base station to establish a radio link connection to the base station, and then normal data transmissions can be performed.

However, when base stations, especially micro base stations, are densely populated, in a synchronization system, interference between cells managed by the micro base stations is quite serious, making it more difficult or even impossible for the UE to read a common control channel of a cell.

SUMMARY

Embodiments of the present application provide an information transmission method, user equipment, and a base station, which can coordinate inter-cell interference of a common control channel, and improve performance of detection on the common control channel.

According to a first aspect, a method for acquiring a cell access resource is provided. A user equipment device (UE) determines at least one candidate sequence of a synchronization signal of an access cell of the UE, and multiple candidate access resources of the access cell. A corresponding location relationship exists between each candidate access resource in the multiple candidate access resources and a resource on which the access cell is located. Any candidate sequence in the at least one candidate sequence corresponds to one of the multiple candidate access resources. The UE detects the synchronization signal according to the at least one candidate sequence. The UE determines a resource location of an actual access resource corresponding to a detected actual sequence in the access cell. The determination is according to the location relationship between each candidate access resource in the multiple candidate access resources and the resource on which the access cell is located, and a correspondence between the any candidate sequence in the at least one candidate sequence and the multiple candidate access resources. The actual sequence is one of the at least one candidate sequence, and the actual access resource is one of the multiple candidate access resources.

With reference to the first aspect, a first possible implementation manner is provided. The UE determining resource location of an actual access resource corresponding to a detected actual sequence in the access cell includes that the UE determines the actual access resource corresponding to the actual sequence from the multiple candidate access resources. The UE then determines the resource location of the actual access resource in the access cell according to the location relationship between the multiple candidate access resources and the resource on which the access cell is located.

With reference to the first aspect or the first possible implementation manner of the first aspect, in a second possible implementation manner, the candidate sequence is a complete sequence; or the candidate sequence is a segment in a complete sequence.

With reference to the first aspect or the first possible implementation manner of the first aspect or the second possible implementation manner of the first aspect, in a third possible implementation manner, besides a first candidate access resource, at least one candidate access resource exists in the multiple candidate access resources. The first candidate access resource is a resource having a frequency domain width of N resource blocks in a center of the access cell, and N is a preconfigured natural number.

With reference to the first aspect or any of the first to third possible implementation manners of the first aspect, a fourth possible implementation manner is provided. After the UE determines a resource location of an actual access resource corresponding to a detected actual sequence in the access cell the UE determines a location of a center frequency point of the access cell according to the resource location of the actual access resource in the access cell.

With reference to the first aspect or any of the first to fourth possible implementation manners of the first aspect, a fifth possible implementation manner is provided. After the UE determines a resource location of an actual access resource corresponding to a detected actual sequence in the access cell, the UE receives a broadcast channel of the access cell. The broadcast channel carries bandwidth indication information of the access cell. The UE determines a bandwidth of the access cell according to the bandwidth indication information.

With reference to the first aspect or any of the first to fifth possible implementation manners of the first aspect, in a sixth possible implementation manner, after the determining, by the UE, a resource location of an actual access resource corresponding to a detected actual sequence in the access cell according to the location relationship between each candidate access resource in the multiple candidate access resources and the resource on which the access cell is located and a correspondence between the any candidate sequence in the at least one candidate sequence and the multiple candidate access resources, the method further includes: if the actual access resource includes a first actual access resource and a second actual access resource, acquiring, by the UE, a first random access configuration and a second random access configuration on the first actual access resource and the second actual access resource, respectively, where the first random access configuration corresponds to the first actual access resource, and the second random access configuration corresponds to the second actual access resource.

With reference to the first aspect or any of the first to sixth possible implementation manners of the first aspect, in a seventh possible implementation manner, after the determining, by the UE, a resource location of an actual access resource corresponding to a detected actual sequence in the access cell according to the location relationship between each candidate access resource in the multiple candidate access resources and the resource on which the access cell is located and a correspondence between the any candidate sequence in the at least one candidate sequence and the multiple candidate access resources, the method further includes: determining, by the UE, a second reference signal that is at the resource location of the actual access resource, where the second reference signal is a reference signal segment clipped from a first reference signal and corresponding to the resource location, and the first reference signal is a reference signal generated by using the center frequency point of the access cell as a center and using a quantity of resource blocks included in the bandwidth of the access cell as a frequency domain width; or determining, by the UE, a second reference signal that is at the resource location of the actual access resource, where the second reference signal is a reference signal segment clipped from a frequency domain center of a first reference signal and corresponding to a first frequency domain width, the first frequency domain width is a frequency domain width occupied by the actual access resource, a reference signal in bandwidth of the access cell is a cyclic shift of the first reference signal, and the first reference signal is a reference signal generated by using the center frequency point of the access cell as a center and using a quantity of resource blocks included in the bandwidth of the access cell as a frequency domain width.

With reference to the first aspect or any of the first to seventh possible implementation manners of the first aspect, in an eighth possible implementation manner, after the determining, by the UE, a resource location of an actual access resource corresponding to a detected actual sequence in the access cell according to the location relationship between each candidate access resource in the multiple candidate access resources and the resource on which the access cell is located and a correspondence between the any candidate sequence in the at least one candidate sequence and the multiple candidate access resources, the method further includes: if the resource location of the actual access resource is not a frequency domain center location of the access cell, processing, by the UE, a subcarrier in a center of the actual access resource as a virtual direct current subcarrier when determining division of resource blocks in the actual access resource.

According to a second aspect, a cell access resource indication method is provided. The method includes: determining an actual access resource of a current cell and an actual sequence of a synchronization signal of the current cell, where the actual access resource is at least one candidate access resource in multiple candidate access resources used by the current cell to send the synchronization signal, the actual sequence is one of at least one candidate sequence of the synchronization signal, and any candidate sequence in the at least one candidate sequence corresponds to one of the multiple candidate access resources; and sending the synchronization signal on the actual access resource by using the actual sequence.

With reference to the second aspect, in a first possible implementation manner of the second aspect, the one of the at least one candidate sequence is a complete sequence; or the one of the at least one candidate sequence is a segmental sequence in a complete sequence.

With reference to the second aspect or the first possible implementation manner of the second aspect, in a second possible implementation manner, besides a first candidate access resource, at least one candidate access resource exists in the multiple candidate access resources, the first candidate access resource is a resource having a frequency domain width of N resource blocks in a center of the current cell, and N is a preconfigured natural number.

With reference to the second aspect or any of the first and second possible implementation manners of the second aspect, in a third possible implementation manner, the method further includes: sending a broadcast channel in the current cell, where the broadcast channel carries bandwidth indication information of the current cell, and the bandwidth indication information of the current cell is used for indicating a bandwidth of the current cell.

With reference to the second aspect or any of the first to third possible implementation manners of the second aspect, in a fourth possible implementation manner, after the sending the synchronization signal on the actual access resource by using the actual sequence, the method further includes: if the actual access resource includes a first actual access resource and a second actual access resource, sending a first random access configuration of the current cell on a broadcast channel resource or common channel resource corresponding to the first actual access resource, and sending a second random access configuration of the current cell on a broadcast channel resource or common channel resource corresponding to the second actual access resource.

With reference to the second aspect or any of the first to fourth possible implementation manners of the second aspect, in a fifth possible implementation manner, after the sending the synchronization signal on the actual access resource by using the actual sequence, the method further includes: sending a second reference signal at the resource location of the actual access resource, where the second reference signal is a reference signal segment clipped from a first reference signal and corresponding to the resource location, and the first reference signal is a reference signal generated by using a center frequency point of the current cell as a center and using a quantity of resource blocks included in the bandwidth of the current cell as a frequency domain width; or sending a second reference signal at the resource location of the actual access resource, where the second reference signal is a reference signal segment clipped from a frequency domain center of a first reference signal and corresponding to a first frequency domain width, the first frequency domain width is a frequency domain width occupied by the actual access resource, a reference signal in the bandwidth of the current cell is a cyclic shift of the first reference signal, and the first reference signal is a reference signal generated by using a center frequency point of the current cell as a center and using a quantity of resource blocks included in the bandwidth of the current cell as a frequency domain width.

With reference to the second aspect or any of the first to fifth possible implementation manners of the second aspect, in a sixth possible implementation manner, a specific implementation of determining an actual access resource of a current cell is: if the resource location of the actual access resource is not a frequency domain center location of the current cell, processing a subcarrier in a center of the actual access resource as a virtual direct current subcarrier when determining division of resource blocks in the actual access resource.

According to a third aspect, a cell access resource acquisition method is provided. The method includes: determining, by user equipment UE, at least one candidate sequence of a synchronization signal of an access cell of the UE and multiple candidate access resources of the access cell; detecting, by the UE, the synchronization signal according to the at least one candidate sequence; receiving, by the UE, a broadcast channel of the access cell on a broadcast channel resource corresponding to an actual access resource on which the detected synchronization signal is located, where the actual access resource is one of the multiple candidate access resources, the broadcast channel carries resource indication information, and the resource indication information is used for indicating the actual access resource in the multiple candidate access resources, or the resource indication information is used for indicating a location relationship between the actual access resource and a resource on which the access cell is located; and determining, by the UE, a resource location of the actual access resource in the access cell according to the resource indication information.

With reference to the third aspect, in a first possible implementation manner, when the resource indication information is used for indicating the actual access resource in the multiple candidate access resources, a corresponding location relationship exists between each candidate access resource in the multiple candidate access resources and the resource on which the access cell is located, and in this case, a specific implementation of determining, by the UE, a resource location of the actual access resource in the access cell according to the resource indication information is: determining, by the UE, the actual access resource in the multiple candidate access resources according to the resource indication information; and determining, by the UE, the resource location of the actual access resource in the access cell according to the corresponding location relationship existing between each candidate access resource in the multiple candidate access resources and the resource on which the access cell is located.

With reference to the third aspect, in a second possible implementation manner, when the resource indication information is used for indicating the location relationship between the actual access resource and the resource on which the access cell is located, a specific implementation of determining, by the UE, a resource location of the actual access resource in the access cell according to the resource indication information includes: determining, by the UE, the resource location of the actual access resource in the access cell according to the location relationship, indicated by the resource indication information, between the actual access resource and the resource on which the access cell is located.

With reference to the third aspect or any of the first and the second possible implementation manners of the third aspect, after the determining, by the UE, a resource location of the actual access resource in the access cell according to the resource indication information, the method further includes: determining, by the UE, a cell identifier of the access cell according to the resource location of the actual access resource in the access cell and an actual sequence of the detected synchronization signal.

With reference to the third aspect or any of the first to third possible implementation manners of the third aspect, in a fourth possible implementation manner, after the determining, by the UE, a resource location of the actual access resource in the access cell according to the resource indication information, the method further includes: if the actual access resource includes a first actual access resource and a second actual access resource, acquiring, by the UE, a first random access configuration and a second random access configuration on the first actual access resource and the second actual access resource, respectively, where the first random access configuration corresponds to the first actual access resource, and the second random access configuration corresponds to the second actual access resource.

With reference to the third aspect or any of the first to fourth possible implementation manners of the third aspect, in a fifth possible implementation manner, after the determining, by the UE, a resource location of the actual access resource in the access cell according to the resource indication information, the method further includes:

determining, by the UE, a second reference signal that is at the resource location of the actual access resource, where the second reference signal is a reference signal segment clipped from a first reference signal and corresponding to the resource location, and the first reference signal is a reference signal generated by using a center frequency point of the access cell as a center and using a quantity of resource blocks included in a bandwidth of the access cell as a frequency domain width; or determining, by the UE, a second reference signal that is at the resource location of the actual access resource, where the second reference signal is a reference signal segment clipped from a frequency domain center of a first reference signal and corresponding to a first frequency domain width, the first frequency domain width is a frequency domain width occupied by the actual access resource, a reference signal in a bandwidth of the access cell is a cyclic shift of the first reference signal, and the first reference signal is a reference signal generated by using a center frequency point of the access cell as a center and using a quantity of resource blocks included in the bandwidth of the access cell as a frequency domain width.

With reference to the third aspect or any of the first to fifth possible implementation manners of the third aspect, in a sixth possible implementation manner, the method further includes: if the resource location of the actual access resource is not a frequency domain center location of the access cell, processing, by the UE, a subcarrier in a center of the actual access resource as a virtual direct current subcarrier when determining division of resource blocks in the actual access resource.

With reference to the sixth possible implementation manner of the third aspect, in a seventh possible implementation manner, the broadcast channel resource corresponding to the actual access resource is a resource on a predefined side of a center frequency point of the actual access resource.

According to a fourth aspect, a cell access resource indication method is provided. The method includes: determining an actual access resource of a current cell and an actual sequence of a synchronization signal of the current cell, where the actual access resource is at least one candidate access resource in multiple candidate access resources of the current cell, and the actual sequence is one of at least one candidate sequence of the synchronization signal; sending the synchronization signal of the current cell on the actual access resource by using the actual sequence; and sending a broadcast channel on a broadcast channel resource corresponding to the actual access resource, where the broadcast channel carries resource indication information, and the resource indication information is used for indicating the actual access resource in the multiple candidate access resources, or the resource indication information is used for indicating a location relationship between the actual access resource and a resource on which the current cell is located.

With reference to the fourth aspect, in a first possible implementation manner, a resource location of the actual access resource in the current cell and the actual sequence of the synchronization signal are further used for indicating a cell identifier of the current cell.

With reference to the fourth aspect or the first possible implementation manner of the fourth aspect, in a second possible implementation manner, after the sending a broadcast channel on a broadcast channel resource corresponding to the actual access resource, the method further includes: if the actual access resource includes a first actual access resource and a second actual access resource, respectively sending a first random access configuration and a second random access configuration on a broadcast channel resource or common channel resource corresponding to the first actual access resource and a broadcast channel resource or common channel resource corresponding to the second actual access resource, where the first random access configuration corresponds to the first actual access resource, and the second random access configuration corresponds to the second actual access resource.

With reference to the fourth aspect or any of the first and the second possible implementation manners of the fourth aspect, in a third possible implementation manner, after the sending a broadcast channel on a broadcast channel resource corresponding to the actual access resource, the method further includes: sending a second reference signal at the resource location of the actual access resource, where the second reference signal is a reference signal segment clipped from a first reference signal and corresponding to the resource location, and the first reference signal is a reference signal generated by using a center frequency point of the current cell as a center and using a quantity of resource blocks included in a bandwidth of the current cell as a frequency domain width; or sending a second reference signal at the resource location of the actual access resource, where the second reference signal is a reference signal segment clipped from a frequency domain center of a first reference signal and corresponding to a first frequency domain width, the first frequency domain width is a frequency domain width occupied by the actual access resource, a reference signal in a bandwidth of the current cell is a cyclic shift of the first reference signal, and the first reference signal is a reference signal generated by using a center frequency point of the current cell as a center and using a quantity of resource blocks included in the bandwidth of the current cell as a frequency domain width.

With reference to the fourth aspect or any of the first to third possible implementation manners of the fourth aspect, in a fourth possible implementation manner, a specific implementation of determining an actual access resource of a current cell is: if the resource location of the actual access resource is not a frequency domain center location of the current cell, processing a subcarrier in a center of the actual access resource as a virtual direct current subcarrier when determining division of resource blocks in the actual access resource.

With reference to the fourth possible implementation manner of the fourth aspect, in a fifth possible implementation manner, the broadcast channel resource corresponding to the actual access resource is a resource on a predefined side of a center frequency point of the actual access resource.

According to a fifth aspect, user equipment is provided. The user equipment includes: a determining unit, configured to determine at least one candidate sequence of a synchronization signal of an access cell of the user equipment and multiple candidate access resources of the access cell, where a corresponding location relationship exists between each candidate access resource in the multiple candidate access resources and a resource on which the access cell is located, and any candidate sequence in the at least one candidate sequence corresponds to one of the multiple candidate access resources; and a detecting unit, configured to detect the synchronization signal according to the at least one candidate sequence, where the determining unit is further configured to determine a resource location of an actual access resource corresponding to a detected actual sequence in the access cell according to the location relationship between each candidate access resource in the multiple candidate access resources and the resource on which the access cell is located and a correspondence between the any candidate sequence in the at least one candidate sequence and the multiple candidate access resources, where the actual sequence is one of the at least one candidate sequence, and the actual access resource is one of the multiple candidate access resources.

With reference to the fifth aspect, in a first possible implementation manner, when configured to determine the resource location of the actual access resource corresponding to the detected actual sequence in the access cell according to the location relationship between each candidate access resource in the multiple candidate access resources and the resource on which the access cell is located and a correspondence between the any candidate sequence in the at least one candidate sequence and the multiple candidate access resources, the determining unit is specifically configured to: determine the actual access resource corresponding to the actual sequence from the multiple candidate access resources; and determine the resource location of the actual access resource in the access cell according to the location relationship between the multiple candidate access resources and the resource on which the access cell is located.

With reference to the fifth aspect or the first possible implementation manner of the fifth aspect, in a second possible implementation manner, the candidate sequence is a complete sequence; or the candidate sequence is a segmental sequence in a complete sequence.

With reference to the fifth aspect or any of the first and the second possible implementation manners of the fifth aspect, in a third possible implementation manner, besides a first candidate access resource, at least one candidate access resource exists in the multiple candidate access resources, the first candidate access resource is a resource having a frequency domain width of N resource blocks in a center of the access cell, and N is a preconfigured natural number.

With reference to the fifth aspect or any of the first to third possible implementation manners of the fifth aspect, in a fourth possible implementation manner, the determining unit is further configured to determine a location of a center frequency point of the access cell according to the resource location of the actual access resource in the access cell.

With reference to the fifth aspect or any of the first to fourth possible implementation manners of the fifth aspect, in a fifth possible implementation manner, the user equipment further includes a receiving unit, configured to receive a broadcast channel of the access cell, where the broadcast channel carries bandwidth indication information of the access cell, where the determining unit is further configured to determine a bandwidth of the access cell according to the bandwidth indication information.

With reference to the fifth aspect or any of the first to fourth possible implementation manners of the fifth aspect, in a sixth possible implementation manner, the user equipment further includes a receiving unit, configured to: if the actual access resource includes a first actual access resource and a second actual access resource, acquire a first random access configuration and a second random access configuration on the first actual access resource and the second actual access resource, respectively, where the first random access configuration corresponds to the first actual access resource, and the second random access configuration corresponds to the second actual access resource.

With reference to the fifth aspect or any of the first to sixth possible implementation manners of the fifth aspect, in a seventh possible implementation manner, the determining unit is further configured to determine a second reference signal that is at the resource location of the actual access resource, where the second reference signal is a reference signal segment clipped from a first reference signal and corresponding to the resource location, and the first reference signal is a reference signal generated by using the center frequency point of the access cell as a center and using a quantity of resource blocks included in the bandwidth of the access cell as a frequency domain width; or the second reference signal is a reference signal segment clipped from a frequency domain center of a first reference signal and corresponding to a first frequency domain width, the first frequency domain width is a frequency domain width occupied by the actual access resource, a reference signal in the bandwidth of the access cell is a cyclic shift of the first reference signal, and the first reference signal is a reference signal generated by using the center frequency point of the access cell as a center and using a quantity of resource blocks included in the bandwidth of the access cell as a frequency domain width.

With reference to the fifth aspect or any of the first to seventh possible implementation manners of the fifth aspect, in an eighth possible implementation manner, the determining unit is further configured to: if the resource location of the actual access resource is not a frequency domain center location of the access cell, process a subcarrier in a center of the actual access resource as a virtual direct current subcarrier when determining division of resource blocks in the actual access resource.

According to a sixth aspect, a base station is provided. The base station includes: a determining unit, configured to determine an actual access resource of a current cell of the base station and an actual sequence of a synchronization signal of the current cell, where the actual access resource is at least one candidate access resource in multiple candidate access resources used by the current cell to send the synchronization signal, the actual sequence is one of at least one candidate sequence of the synchronization signal, and any candidate sequence in the at least one candidate sequence corresponds to one of the multiple candidate access resources; and a sending unit, configured to send the synchronization signal on the actual access resource by using the actual sequence.

With reference to the sixth aspect, in a first possible implementation manner, the one of the at least one candidate sequence is a complete sequence; or the one of the at least one candidate sequence is a segmental sequence in a complete sequence.

With reference to the sixth aspect or the first possible implementation manner of the sixth aspect, in a second possible implementation manner, besides a first candidate access resource, at least one candidate access resource exists in the multiple candidate access resources, the first candidate access resource is a resource having a frequency domain width of N resource blocks in a center of the current cell, and N is a preconfigured natural number.

With reference to the sixth aspect or any of the first and second possible implementation manners of the sixth aspect, in a third possible implementation manner, the sending unit is further configured to send a broadcast channel in the current cell, where the broadcast channel carries bandwidth indication information of the current cell, and the bandwidth indication information of the current cell is used for indicating a bandwidth of the current cell.

With reference to the sixth aspect or any of the first to third possible implementation manners of the sixth aspect, in a fourth possible implementation manner, the sending unit is further configured to: if the actual access resource includes a first actual access resource and a second actual access resource, send a first random access configuration of the current cell on a broadcast channel resource or common channel resource corresponding to the first actual access resource, and send a second random access configuration of the current cell on a broadcast channel resource or common channel resource corresponding to the second actual access resource.

With reference to the sixth aspect or any of the first to fourth possible implementation manners of the sixth aspect, in a fifth possible implementation manner, the sending unit is further configured to send a second reference signal at the resource location of the actual access resource, where the second reference signal is a reference signal segment clipped from a first reference signal and corresponding to the resource location, and the first reference signal is a reference signal generated by using a center frequency point of the current cell as a center and using a quantity of resource blocks included in the bandwidth of the current cell as a frequency domain width; or the second reference signal is a reference signal segment clipped from a frequency domain center of a first reference signal and corresponding to a first frequency domain width, the first frequency domain width is a frequency domain width occupied by the actual access resource, a reference signal in the bandwidth of the current cell is a cyclic shift of the first reference signal, and the first reference signal is a reference signal generated by using a center frequency point of the current cell as a center and using a quantity of resource blocks included in the bandwidth of the current cell as a frequency domain width.

With reference to the sixth aspect or any of the first to fifth possible implementation manners of the sixth aspect, in a sixth possible implementation manner, when configured to determine the actual access resource of the current cell of the base station, the determining unit is specifically configured to: if the resource location of the actual access resource is not a frequency domain center location of the current cell, process a subcarrier in a center of the actual access resource as a virtual direct current subcarrier when determining division of resource blocks in the actual access resource.

According to a seventh aspect, user equipment is provided. The user equipment includes: a determining unit, configured to determine at least one candidate sequence of a synchronization signal of an access cell and multiple candidate access resources of the access cell; a detecting unit, configured to detect the synchronization signal according to the at least one candidate sequence; and a receiving unit, configured to receive a broadcast channel of the access cell on a broadcast channel resource corresponding to an actual access resource on which the detected synchronization signal is located, where the actual access resource is one of the multiple candidate access resources, the broadcast channel carries resource indication information, and the resource indication information is used for indicating the actual access resource in the multiple candidate access resources, or the resource indication information is used for indicating a location relationship between the actual access resource and a resource on which the access cell is located, where the determining unit is further configured to determine a resource location of the actual access resource in the access cell according to the resource indication information.

With reference to the seventh aspect, in a first possible implementation manner, when the resource indication information is used for indicating the actual access resource in the multiple candidate access resources, a corresponding location relationship exists between each candidate access resource in the multiple candidate access resources and the resource on which the access cell is located, and in this case, when configured to determine the resource location of the actual access resource in the access cell according to the resource indication information, the determining unit is specifically configured to: determine the actual access resource in the multiple candidate access resources according to the resource indication information; and determine the resource location of the actual access resource in the access cell according to the corresponding location relationship existing between each candidate access resource in the multiple candidate access resources and the resource on which the access cell is located.

With reference to the seventh aspect, in a second possible implementation manner, when the resource indication information is used for indicating the location relationship between the actual access resource and the resource on which the access cell is located, when configured to determine the resource location of the actual access resource in the access cell according to the resource indication information, the determining unit is specifically configured to: determine the resource location of the actual access resource in the access cell according to the location relationship, indicated by the resource indication information, between the actual access resource and the resource on which the access cell is located.

With reference to the seventh aspect or any of the first and second possible implementation manners of the seventh aspect, in a third possible implementation manner, the determining unit is further configured to determine a cell identifier of the access cell according to the resource location of the actual access resource in the access cell and an actual sequence of the detected synchronization signal.

With reference to the seventh aspect or any of the first to third possible implementation manners of the seventh aspect, in a fourth possible implementation manner, the receiving unit is further configured to: if the actual access resource includes a first actual access resource and a second actual access resource, acquire a first random access configuration and a second random access configuration on the first actual access resource and the second actual access resource, respectively, where the first random access configuration corresponds to the first actual access resource, and the second random access configuration corresponds to the second actual access resource.

With reference to the seventh aspect or any of the first to fourth possible implementation manners of the seventh aspect, in a fifth possible implementation manner, a the determining unit is further configured to determine a second reference signal that is at the resource location of the actual access resource, where the second reference signal is a reference signal segment clipped from a first reference signal and corresponding to the resource location, and the first reference signal is a reference signal generated by using a center frequency point of the access cell as a center and using a quantity of resource blocks included in a bandwidth of the access cell as a frequency domain width; or the second reference signal is a reference signal segment clipped from a frequency domain center of a first reference signal and corresponding to a first frequency domain width, the first frequency domain width is a frequency domain width occupied by the actual access resource, a reference signal in a bandwidth of the access cell is a cyclic shift of the first reference signal, and the first reference signal is a reference signal generated by using a center frequency point of the access cell as a center and using a quantity of resource blocks included in the bandwidth of the access cell as a frequency domain width.

With reference to the seventh aspect or any of the first to fifth possible implementation manners of the seventh aspect, in a sixth possible implementation manner, the determining unit is further configured to: if the resource location of the actual access resource is not a frequency domain center location of the access cell, process a subcarrier in a center of the actual access resource as a virtual direct current subcarrier when determining division of resource blocks in the actual access resource.

With reference to the sixth possible implementation manner of the seventh aspect, in a seventh possible implementation manner, the broadcast channel resource corresponding to the actual access resource is a resource on a predefined side of a center frequency point of the actual access resource.

According to an eighth aspect, a base station is provided. The base station includes: a determining unit, configured to determine an actual access resource of a current cell of the base station and an actual sequence of a synchronization signal of the current cell, where the actual access resource is at least one candidate access resource in multiple candidate access resources of the current cell, and the actual sequence is one of at least one candidate sequence of the synchronization signal; and a sending unit, configured to send the synchronization signal of the current cell on the actual access resource by using the actual sequence, where the sending unit is further configured to send a broadcast channel on a broadcast channel resource corresponding to the actual access resource, where the broadcast channel carries resource indication information, and the resource indication information is used for indicating the actual access resource in the multiple candidate access resources, or the resource indication information is used for indicating a location relationship between the actual access resource and a resource on which the current cell is located.

With reference to the eighth aspect, in a first possible implementation manner, a resource location of the actual access resource in the current cell and the actual sequence of the synchronization signal are further used for indicating a cell identifier of the current cell.

With reference to the eighth aspect or the first possible implementation manner of the eighth aspect, in a second possible implementation manner, the sending unit is further configured to: if the actual access resource includes a first actual access resource and a second actual access resource, respectively send a first random access configuration and a second random access configuration on a broadcast channel resource or common channel resource corresponding to the first actual access resource and a broadcast channel resource or common channel resource corresponding to the second actual access resource, where the first random access configuration corresponds to the first actual access resource, and the second random access configuration corresponds to the second actual access resource.

With reference to the eighth aspect or any of the first and second possible implementation manners of the eighth aspect, in a third possible implementation manner, the sending unit is further configured to send a second reference signal at the resource location of the actual access resource, where the second reference signal is a reference signal segment clipped from a first reference signal and corresponding to the resource location, and the first reference signal is a reference signal generated by using a center frequency point of the current cell as a center and using a quantity of resource blocks included in a bandwidth of the current cell as a frequency domain width; or the second reference signal is a reference signal segment clipped from a frequency domain center of a first reference signal and corresponding to a first frequency domain width, the first frequency domain width is a frequency domain width occupied by the actual access resource, a reference signal in a bandwidth of the current cell is a cyclic shift of the first reference signal, and the first reference signal is a reference signal generated by using a center frequency point of the current cell as a center and using a quantity of resource blocks included in the bandwidth of the current cell as a frequency domain width.

With reference to the eighth aspect or any of the first to third possible implementation manners of the eighth aspect, in a fourth possible implementation manner, when configured to determine the actual access resource of the current cell of the base station, the determining unit is specifically configured to: if the resource location of the actual access resource is not a frequency domain center location of the current cell, process a subcarrier in a center of the actual access resource as a virtual direct current sub carrier when determining division of resource blocks in the actual access resource.

With reference to the fourth possible implementation manner of the eighth aspect, in a fifth possible implementation manner, the broadcast channel resource corresponding to the actual access resource is a resource on a predefined side of a center frequency point of the actual access resource.

In the information transmission method, the user equipment, and the base station in the embodiments of the present application, a resource location of an actual access resource in a resource on which an access cell is located is determined by using a location relationship between a candidate access resource and the resource on which the access cell is located and a detected actual sequence of a synchronization signal, which can, to some extent, avoid interference impact caused by intensive cells to access by UE, coordinate inter-cell interference of a common control channel, and improve performance of detection on the common control channel.

BRIEF DESCRIPTION OF DRAWINGS

The following briefly introduces the accompanying drawings used in describing the embodiments.

FIG. 5 is a schematic diagram of locations of a direct current subcarrier in a carrier center and a non-carrier center according to an embodiment of the present application;

FIG. 6 is a schematic diagram of relationships between a candidate access resource and a direct current subcarrier in two cases: a carrier center and a non-carrier center;

FIG. 7 is a flowchart of a cell access resource indication method according to an embodiment of the present application;

DESCRIPTION OF EMBODIMENTS

The technical solutions of the present application may be applied to various communications systems, such as Global System for Mobile Communications (GSM), Code Division Multiple Access (CDMA) system, Wideband Code Division Multiple Access (WCDMA) system, general packet radio service (GPRS), and Long Term Evolution (LTE) system.

User equipment (UE) may communicate with one or more core networks by using a radio access network (RAN). The user equipment may be a mobile terminal, such as a mobile phone (also referred to as a "cellular" phone) or a computer with a mobile terminal. For example, the user equipment may be a portable, pocket-sized, handheld, computer built-in, or in-vehicle mobile apparatus, which exchanges voice and/or data with the radio access network.

A base station may be a base transceiver station (BTS) in GSM or CDMA, may be a NodeB in WCDMA, or may be an evolved NodeB (eNB or e-NodeB) in LTE. The type of the base station is not limited in the present application. For ease of description, the following embodiments are described by using an eNB as an example.

Figure 1:
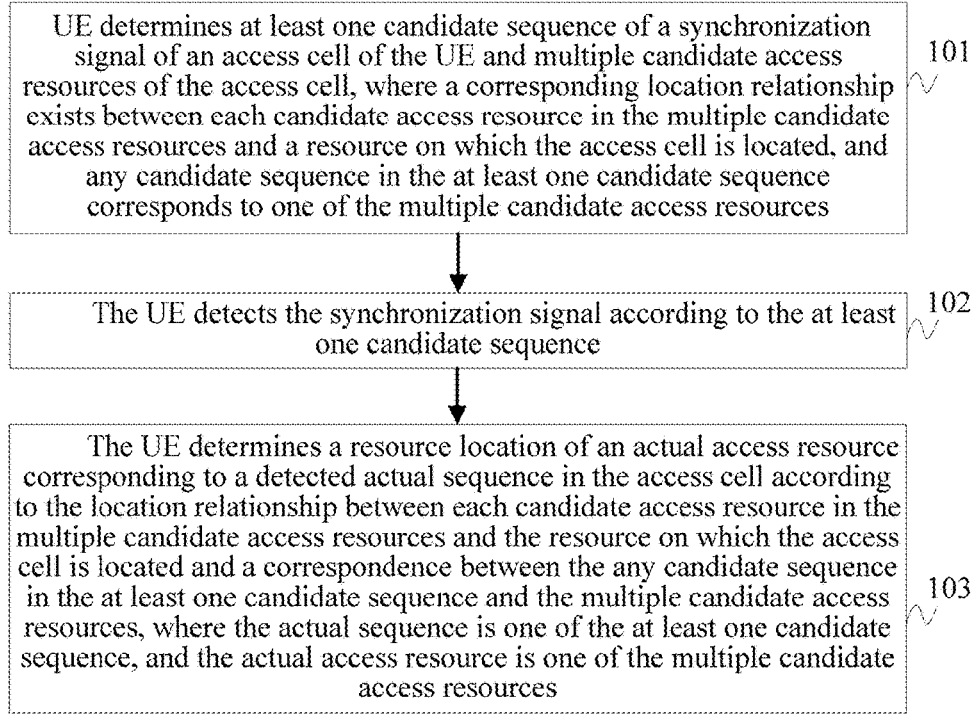
FIG. 1 is a flowchart of a cell access resource acquisition method according to an embodiment of the present application.

FIG. 1 is a flowchart of a method for acquiring a cell access resource according to an embodiment of the present application. The method is executed by a user equipment device (referred to as UE hereinafter).

101: The UE determines at least one candidate sequence of a synchronization signal of an access cell of the UE, and multiple candidate access resources of the access cell.

A corresponding location relationship exists between each candidate access resource and a resource on which the access cell is located, and any candidate sequence in the at least one candidate sequence corresponds to one of the multiple candidate access resources.

In this embodiment of the present application, a relative location relationship between a candidate access resource and the resource on which the access cell is located may be a frequency interval between a resource location of the candidate access resource and a location of a center frequency point of the access cell, or a frequency interval between a resource location of the candidate access resource and a location of a low frequency of the access cell, or a frequency interval between a resource location of the candidate access resource and a location of a high frequency of the access cell.

102: The UE detects the synchronization signal according to the at least one candidate sequence.

103: The UE determines a resource location of an actual access resource corresponding to a detected actual sequence in the access cell according to the location relationship between each candidate access resource in the multiple candidate access resources and the resource on which the access cell is located and a correspondence between the any candidate sequence in the at least one candidate sequence and the multiple candidate access resources.

The actual sequence is one of the at least one candidate sequence, and the actual access resource is one of the multiple candidate access resources.

In this embodiment of the present application, a resource location of an actual access resource in a resource on which an access cell is located is determined by using a location relationship between a candidate access resource and the resource on which the access cell is located and a detected actual sequence of a synchronization signal, which can, to some extent, avoid interference impact caused by intensive cells to access by UE, coordinate inter-cell interference of a common control channel, and improve performance of detection on the common control channel.

In addition, the actual access resource is determined by detecting the sequence of the synchronization signal. Because detection on the synchronization signal is the first step for the UE to discover a carrier, the UE can determine an access resource earliest, and detect another signal, such as a reference signal for measurement, on the resource, rather than determine the access resource by further reading another message such as a broadcast channel, which simplifies steps of system discovery and access, makes it unnecessary to read a broadcast message during measurement, and improves time efficiency and power efficiency.

Optionally, a specific implementation of step 103 may be: determining, by the UE, the actual access resource corresponding to the actual sequence from the multiple candidate access resources; and determining, by the UE, the resource location of the actual access resource in the access cell according to the location relationship between the multiple candidate access resources and the resource on which the access cell is located.

Optionally, the candidate sequence may be a complete sequence; or the candidate sequence may be a segmental sequence in a complete sequence.

Optionally, besides a first candidate access resource, at least one candidate access resource exists in the multiple candidate access resources. The first candidate access resource is a resource having a frequency domain width of N resource blocks in a center of the access cell, and N is a preconfigured natural number, for example, N is equal to 6. In addition, N may be specified in a protocol, or specified according to a policy of an operator.

Optionally, after step 103, the method further includes: determining, by the UE, the location of the center frequency point of the access cell according to the resource location of the actual access resource in the access cell.

Optionally, after step 103, the method further includes: receiving, by the UE, a broadcast channel of the access cell, where the broadcast channel carries bandwidth indication information of the access cell; and determining, by the UE, a bandwidth of the access cell according to the bandwidth indication information.

Optionally, after step 103, the method further includes: if the actual access resource includes a first actual access resource and a second actual access resource, acquiring, by the UE, a first random access configuration and a second random access configuration on the first actual access resource and the second actual access resource, respectively, where the first random access configuration corresponds to the first actual access resource, and the second random access configuration corresponds to the second actual access resource.

Optionally, in an embodiment, after step 103, the method further includes: determining, by the UE, a second reference signal that is at the resource location of the actual access resource. The second reference signal is a reference signal segment clipped from a first reference signal and corresponding to the resource location, and the first reference signal is a reference signal generated by using the center frequency point of the access cell as a center and using a quantity of resource blocks included in the bandwidth of the access cell as a frequency domain width.

Optionally, in an embodiment, after step 103, the method further includes: determining, by the UE, a second reference signal that is at the resource location of the actual access resource. The second reference signal is a reference signal segment clipped from a frequency domain center of a first reference signal and corresponding to a first frequency domain width, the first frequency domain width is a frequency domain width occupied by the actual access resource, a reference signal in the bandwidth of the access cell is a cyclic shift of the first reference signal, and the first reference signal is a reference signal generated by using the center frequency point of the access cell as a center and using a quantity of resource blocks included in the bandwidth of the access cell as a frequency domain width.

Optionally, after step 103, the method further includes: if the resource location of the actual access resource is not a frequency domain center location of the access cell, processing, by the UE, a subcarrier in a center of the actual access resource as a virtual direct current subcarrier when analyzing division of resource blocks in the actual access resource.

The following describes the method in this embodiment of the present application by using a specific embodiment.

Embodiment 1 of the present application: UE determines a resource location of an actual access resource in a resource on which an access cell is located according to a location relationship between a candidate access resource and the resource on which the access cell is located and a detected actual sequence of a synchronization signal.

First, before detecting the synchronization signal, the UE may first determine at least one candidate sequence of the synchronization signal of the UE and multiple candidate access resources of the access cell. The at least one candidate sequence is a candidate sequence that is used by the access cell of the UE to send the synchronization signal, the multiple candidate access resources are access resources that may be used by the access cell of the UE, the resource on which the access cell is located refers to an entire carrier resource on which the access cell is located, and a corresponding location relationship exists between the multiple candidate access resources and the resource on which the access cell is located.

Figure 2:
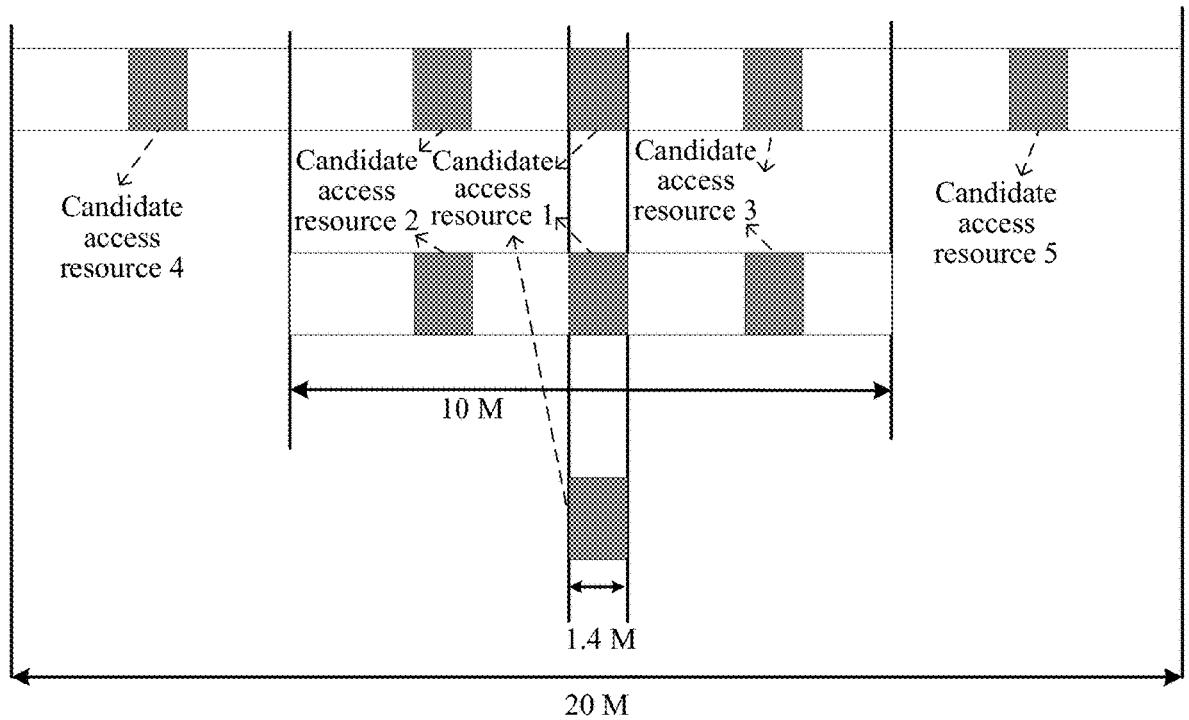
FIG. 2 is a schematic diagram of a location relationship between a cell carrier and a candidate access resource according to an embodiment of the present application.

FIG. 2 is a schematic diagram of a location relationship between a cell carrier and a candidate access resource according to an embodiment of the present application. As shown in FIG. 2, when a cell carrier bandwidth is 20 MHz, the cell carrier bandwidth may include five candidate access resources: candidate access resources 1 to 5 in total; when a cell carrier bandwidth is 10 MHz, the cell carrier bandwidth may include three candidate access resources: candidate access resources 1 to 3 in total; when a cell carrier bandwidth is 1.4 MHz, the cell carrier bandwidth includes only a candidate access resource 1. Certainly, FIG. 2 shows only a possible location relationship between a candidate access resource and a cell carrier, which does not exclude a possibility of another location relationship, for example, when a cell carrier bandwidth is 10 MHz, nine candidate access resources may be included.

An access cell having a 20-MHz carrier bandwidth and including 100 resource blocks is used as an example. Assuming that there are five candidate access resources in the access cell and each candidate access resource occupies six resource blocks, corresponding location relationships of the five candidate access resources in the 20-MHz carrier may be preset, for example, there is one candidate access resource in a carrier center, and two candidate access resources are respectively included at predefined locations on either side of a carrier center frequency point, as shown by the candidate access resources 1 to 5 in FIG. 2.

In addition, any candidate sequence in the at least one candidate sequence corresponds to one of the multiple candidate access resources, for example, sequences 1 to 5 correspond to the candidate access resource 1, and sequences 6 to 10 correspond to the candidate access resource 2. In this way, the UE detects all the candidate sequences, and if detecting that the actual sequence is the sequence 6, the UE may determine, according to the correspondence, that a current actual access resource is the candidate access resource 2. The candidate sequence may be a Zadoff-Chu (ZC) sequence, a Gold sequence, an m sequence, or the like, or may be a segmental sequence clipped from one of the sequences. The candidate sequences, the location relationships of the candidate access resources in the carrier, and the correspondences between the candidate sequences and the candidate access resources are all preset.

A location relationship of a candidate access resource in the resource on which the access cell is located may be a frequency interval between a resource location of the candidate access resource and a location of a center frequency point of the access cell, or a frequency interval between a resource location of the candidate access resource and a location of a lowest frequency of the access cell, or a frequency interval between a resource location of the candidate access resource and a location of a highest frequency of the access cell, which is not specifically limited, as long as the location relationship is preset.

Besides a first candidate access resource, the multiple candidate access resources of the UE may include a candidate access resource. The first candidate access resource is a resource having a frequency domain width of N resource blocks in a center of the access cell, and N is a preconfigured natural number, and may be specified in a protocol, or specified according to a policy of an operator.

For example, in FIG. 2, in this case, the first candidate access resource is the candidate access resource 1, and occupies 1.4 MHz, that is, a frequency domain width of six resource blocks. A specific implementation in FIG. 2 of that besides the first candidate access resource, the multiple candidate access resources of the UE include at least one candidate access resource is: Besides the candidate access resource 1, the multiple candidate access resources of the UE further include the candidate access resource 2 to the candidate access resource 5. In addition, location relationships of the five candidate access resources in the entire carrier resource on which the access cell is located may be specified in a protocol, or specified according to a policy of an operator.

In this embodiment of the present application, at least one candidate access resource of the access cell may be predefined. Specifically, the candidate access resource may be predefined according to a maximum carrier bandwidth, and a specific carrier bandwidth may be less than or equal to the maximum carrier bandwidth. For example, each candidate access resource may satisfy a condition that a center frequency point is on a 100-KHz grid, to facilitate cell search by the UE, that is, detection on the synchronization signal. For example, in FIG. 2, a maximum carrier bandwidth is 20 MHz and has five candidate access resources: the candidate access resource 1 to the candidate access resource 5. If an actual carrier bandwidth is 10 MHz, there are three actual candidate access resources, but before the UE acquires carrier bandwidth information, the UE can still assume that there are five candidate access resources, perform detection on the five candidate access resources, and finally determine one or more actual access resources from three candidate access resources in the middle. That is, a candidate access resource set in the case of a large carrier bandwidth includes a candidate access resource set in the case of a small carrier bandwidth. In this design manner, detection complexity can be simplified, and compatibility of system designs of different bandwidths can be retained.

In addition, in this embodiment of the present application, a Zadoff-Chu sequence or an m sequence or the like may be used as the candidate sequence. Certainly, a possibility of another sequence is not excluded. Preferably, the Zadoff-Chu sequence may be used as the candidate sequence in this embodiment of the present application. An original sequence length of the candidate sequence may be less than a sequence length of a primary synchronization sequence in an LTE release 8.

In an implementation manner of this embodiment of the present application, the candidate sequence may be a sequence whose length is 61, so as to distinguish an earlier-release LTE carrier and a subsequently evolved LTE carrier.

In another implementation manner of this embodiment of the present application, the original sequence length of the candidate sequence is equal to the sequence length of the primary synchronization sequence in the LTE release 8, but an actual length of the candidate sequence is determined after puncture of a primary synchronization signal. For example, the sequence length of the primary synchronization sequence in the LTE release 8 is 63, and the candidate sequence in this embodiment of the present application may be a sequence in which a location of a subcarrier at a direct current location in a carrier center is punctured, whose final sequence length is 62. For another example, two or more subcarriers may also be punctured for the candidate sequence in this embodiment of the present application. In this case, a structure of primary synchronization signal is consistent with that in an LTE system in the release 8. To distinguish a carrier type, a candidate sequence space may be expanded, that is, a quantity of sequences is newly designed to distinguish the carrier type, or the carrier type may be distinguished in another manner, for example, through indication by using a broadcast channel. A function of carrier type distinguishing in the foregoing is that a new carrier can use multiple candidate access resources, while an original carrier type, that is, an earlier-release LTE system carrier, has only an access resource in a carrier center.

For example, in FIG. 2, the maximum bandwidth 20 MHz has five candidate access resources. Therefore, five different groups of candidate sequences: sequence groups 0 to 4 in total may be used for the synchronization signal of the access cell, and sequences in the groups do not overlap. Candidate sequences of the sequence groups 0 to 4 respectively correspond to the candidate access resources 1 to 5, for example, candidate sequences of the sequence group 0 correspond to the candidate access resource 1, and candidate sequences of the sequence group 1 correspond to the candidate access resource 2. The candidate sequence may be a complete sequence, for example, a ZC sequence whose length is 61. Alternatively, the candidate sequence may be a sequence segment in a complete sequence. For example, in FIG. 2, the candidate sequence may be a sequence segment whose length is 61 in a long sequence whose length is at least 61*5. The long sequence has five sequence segments whose length is 61, which respectively correspond to the candidate access resources 1 to 5.

Then, the UE detects the synchronization signal according to the at least one candidate sequence.

The detecting, by the UE, the synchronization signal according to the at least one candidate sequence refers to detecting, by the UE, a synchronization signal on the at least one candidate sequence. When the UE detects a synchronization signal and a sequence of the synchronization signal is one of the at least one candidate sequence, it may be considered that the UE detects a synchronization signal of the access cell, and the detected candidate sequence is an actual sequence of the synchronization signal of the access cell. Herein, a sequence and an access resource before the sequence of the synchronization signal is detected are respectively referred to as a candidate sequence and a candidate access resource, the detected sequence of the synchronization signal is referred to as an actual sequence, and an access resource corresponding to the actual sequence is referred to as an actual access resource. It can be seen that, the actual sequence is a candidate sequence in multiple candidate sequences, and the actual access resource is a candidate access resource in the multiple candidate access resources. It should be noted that, in one access cell, actual sequences of the access cell may be respectively sent on multiple access resources, that is, the UE may respectively detect the actual sequences on the multiple candidate access resources.

Next, the UE determines, according to the detected actual sequence, the actual access resource on which the actual sequence is located.

After the UE detects the synchronization signal, the UE can determine one, corresponding to the actual access resource of the access cell, of the multiple candidate access resources of the access cell by using the actual sequence of the synchronization signal. For example, if the actual sequence of the synchronization signal detected by the UE is a candidate sequence in the sequence group 0, the UE may determine that the actual access resource of the access cell is the candidate access resource 1.

Moreover, if multiple actual sequences, for example, an actual sequence 1 in the sequence group 0 and an actual sequence 2 in the sequence group 1, are detected, the UE may determine, according to the correspondences between the candidate sequences and the candidate access resources, the actual access resource 1 and the actual access resource 2 corresponding to the actual sequence 1 and the actual sequence 2, respectively.

Finally, the UE may determine the resource location of the actual access resource of the detected actual sequence in the access cell according to the location relationship between each candidate access resource in the multiple candidate access resources and the resource on which the access cell is located and a correspondence between the any candidate sequence in the at least one candidate sequence and the multiple candidate access resources. The actual sequence is one of the at least one candidate sequence, and the actual access resource is one of the multiple candidate access resources.

A specific implementation of determining the resource location of the actual access resource of the detected actual sequence in the access cell may be: determining, by the UE, one of the multiple candidate access resources that corresponds to the actual sequence; and determining, by the UE, the resource location of the actual access resource in the access cell according to a location relationship between the one of the multiple candidate access resources that corresponds to the actual sequence and the resource on which the access cell is located. The determining, by the UE, one of the multiple candidate access resources that corresponds to the actual sequence refers to that the UE may determine, according to the actual sequence, which one of the multiple candidate access resources of the UE corresponds to the actual access resource for sending the actual sequence. Then, the UE may determine the resource location of the actual access resource in the access cell according to the location relationship between the candidate access resource and the resource on which the access cell is located.

Specifically, that the UE may determine, according to the actual sequence, a candidate access resource corresponding to the actual access resource of the detected actual sequence is that the UE determines the actual access resource is which candidate access resource in the multiple candidate access resources, or determines a location or a sequence number of the actual access resource in the multiple candidate access resources. In this case, the UE cannot yet obtain a resource location of the actual access resource in an entire carrier on which the access cell is located. To acquire the resource location, the resource location of the actual access resource in the access cell needs to be further determined according to location relationships of the actual access resource and the multiple candidate access resources in the resource on which the access cell is located, that is, predefined location relationships. For example, the UE may learn, by using the actual sequence 2, that the actual access resource corresponds to the candidate access resource 2, and then determine, according to a predefined location relationship of the candidate access resource in the carrier on which the cell is located, the resource location of the actual access resource in the carrier on which the access cell is located. Specifically, it can be seen from FIG. 2 that, the candidate access resource 2 corresponding to the actual access resource is at the second location from the left in the five predefined candidate access resources, and then it may be determined that the actual access resource is at the location in the carrier.

Further, the UE may determine a location of a center frequency point of the access cell according to the resource location of the actual access resource in the access cell. After determining that the actual access resource is at the location in the carrier, the UE may further determine a specific location of the carrier, for example, a location of a center frequency point of the carrier.

In addition, after determining the resource location of the actual access resource of the detected actual sequence in the access cell, the UE may further determine a bandwidth of the access cell. In an implementation manner of this embodiment of the present application, the UE may receive a broadcast channel of the access cell, acquire, from the broadcast channel, bandwidth indication information of the access cell carried by the broadcast channel, and determine the bandwidth of the access cell according to the bandwidth indication information. In this case, a complete location of the carrier can be totally determined in combination with the determined center frequency point of the carrier and the bandwidth of the carrier acquired from the broadcast channel.

In addition, after determining the resource location of the actual access resource of the detected actual sequence in the access cell, the UE may further acquire a random access configuration of the access cell. In this embodiment of the present application, the UE may determine multiple actual access resources. If the actual access resource includes a first actual access resource and a second actual access resource, the UE acquires a first random access configuration and a second random access configuration on the first actual access resource and the second actual access resource, respectively. The first random access configuration corresponds to the first actual access resource, and the second random access configuration corresponds to the second actual access resource. The first random access configuration and the second random access configuration may be uplink random access configuration information, including information such as preamble sequences or resource configurations for random access. The UE may receive the first random access configuration on a broadcast channel resource or common channel resource corresponding to the first actual access resource, and receive the second actual access resource on a broadcast channel resource or common channel resource corresponding to the second random access configuration. In this way, it can be ensured that multiple first access resources in one carrier can separately support independent access by the UE, which is equivalent to that one carrier has multiple subsystems. The multiple subsystems may be subsystems in a same standard or release (the standard may be LTE, CDMA, or the like, and the release may be an LTE release 8 or release 12 or the like), or may be subsystems in different standards or different releases. Flexibility of system multiplexing is achieved, and a function of balancing access load can be further implemented.

In addition, after determining the resource location of the actual access resource of the detected actual sequence in the access cell, the UE may further determine a second reference signal corresponding to the actual access resource. In this embodiment of the present application, a reference signal in the prior art and generated by using the center frequency point of the access cell as a center and using a quantity of resource blocks included in the bandwidth of the access cell as a frequency domain width is referred to as a first reference signal, and a reference signal corresponding to the actual access resource is referred to as a second reference signal.

Figure 3:
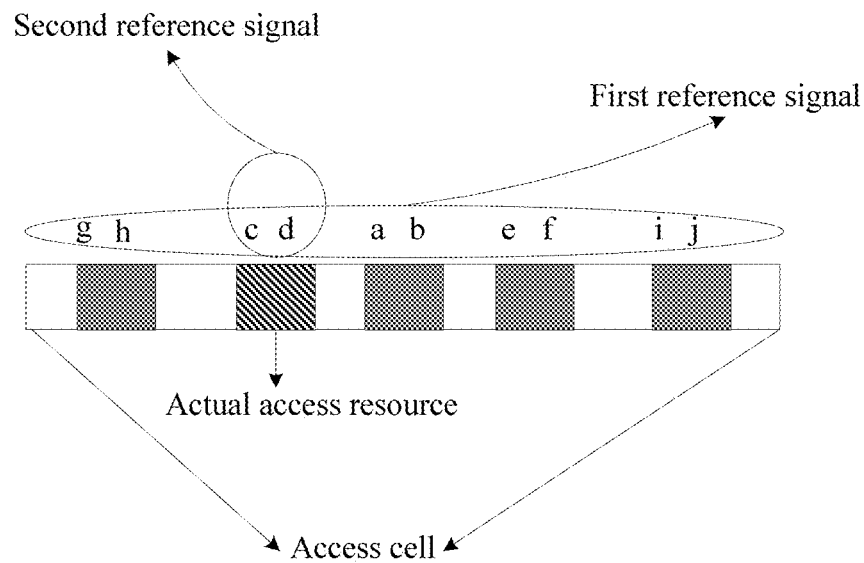
FIG. 3 is a schematic diagram of a relationship between a reference signal and a cell carrier according to an embodiment of the present application.

In an implementation manner of this embodiment of the present application, the second reference signal is a reference signal segment clipped from a first reference signal and corresponding to the resource location, and the first reference signal is a reference signal generated by using the center frequency point of the access cell as a center and using a quantity of resource blocks included in the bandwidth of the access cell as a frequency domain width. FIG. 3 is a schematic diagram of a relationship between a reference signal and a cell carrier according to an embodiment of the present application. As shown in FIG. 3, the access cell corresponds to the first reference signal, and the actual access resource corresponds to the second reference signal. The first reference signal is a reference signal generated by using the center frequency point of the access cell as a center and using a quantity of resource blocks included in the bandwidth of the access cell as a frequency domain width. A cell carrier corresponding to the first reference signal is the 20-MHz carrier shown in FIG. 2. Assuming that the actual access resource is the candidate access resource 2 in FIG. 2, the second reference signal is a part of reference signal in the first reference signal and corresponding to the actual access resource. As shown in FIG. 3, it is assumed that a reference signal in a frequency domain direction in one candidate access resource includes two numerical points (certainly, another numerical point is not excluded, and the description herein is merely an example), and the first reference signal is {g, h, c, d, a, b, e, f, i, j}. After determining that the actual access resource is the second candidate access resource on the left side in the carrier of the access cell, and determining the resource location of the actual access resource in the entire carrier, the UE may clip a second reference signal {c, d} at the resource location of the actual access resource from the first reference signal {g, h, c, d, a, b, e, f, i, j }. In this case, the UE may perform measurement by using the second reference signal {c, d}. Then, after acquiring bandwidth information of the access cell from the broadcast channel, the UE may further acquire the reference signal that is on the entire carrier of the access cell.

In another implementation manner of this embodiment of the present application, the second reference signal is a reference signal segment clipped from a frequency domain center of a first reference signal and corresponding to a first frequency domain width. The first frequency domain width is a frequency domain width occupied by the actual access resource. A reference signal in the bandwidth of the access cell is a cyclic shift of the first reference signal. The first reference signal is a reference signal generated by using the center frequency point of the access cell as a center and using a quantity of resource blocks included in the bandwidth of the access cell as a frequency domain width.

Figure 4:
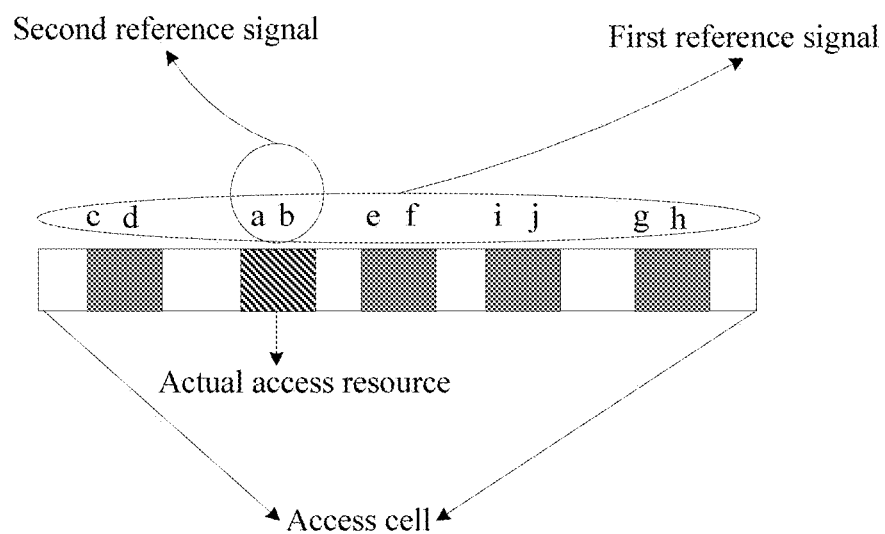
FIG. 4 is a schematic diagram of another relationship between a reference signal and a cell carrier according to an embodiment of the present application.

FIG. 4 is a schematic diagram of a relationship between a reference signal and a cell carrier according to an embodiment of the present application. As shown in FIG. 4, the access cell corresponds to the first reference signal, and the actual access resource corresponds to the second reference signal. Specifically, a first reference signal before a shift may be that shown in FIG. 3. A cell carrier corresponding to the first reference signal is the 20-MHz carrier shown in FIG. 2. As shown in FIG. 3, it is assumed that a reference signal in a frequency domain direction in one candidate access resource includes two numerical points (certainly, another numerical point is not excluded, and the description herein is merely an example),In this case, the first reference signal may be represented by {g, h, c, d, a, b, e, f, i, j}. Similarly, assuming that the actual access resource is the candidate access resource 2 in FIG. 2, after determining that the actual access resource is the second candidate access resource on the left side in the carrier of the access cell, and determining the resource location of the actual access resource in the entire carrier, the UE may use reference signal numerical points {a, b} corresponding to the candidate access resource and at a center location of the first reference signal {g, h, c, d, a, b, e, f, i, j} before a cyclic shift as the second reference signal that is at the resource location of the actual access resource. In other words, the UE may use original numerical points at the carrier center location as numerical points of the second reference signal in this case. Correspondingly, a first reference signal after a cyclic shift is shown in FIG. 4, and is {c, d, a, b, e, f, i, j, g, h}. In this case, measurement may be performed by using the second reference signal {a, b}. Then, after acquiring bandwidth information of the access cell from the broadcast channel, the UE may further acquire the reference signal that is on the entire carrier of the access cell.

In addition, after determining the resource location of the actual access resource of the detected actual sequence in the access cell, the UE further needs to determine an available resource in the actual access resource. If the resource location of the actual access resource is not a frequency domain center location of the access cell, the UE may process a subcarrier in a center of the actual access resource as a virtual direct current subcarrier when determining division of resource blocks in the actual access resource. In this embodiment of the present application, before receiving the broadcast channel, the UE needs to first detect the synchronization signal. If the candidate access resource carrying the synchronization signal is not in a center of the carrier, the candidate access resource does not reserve a direct current subcarrier. Because the direct current subcarrier is generally at the center frequency point of the carrier, if a design structure of a sequence of a synchronization signal in the LTE release 8 needs to be retained in this case, that is, a numerical point at a location of the direct current subcarrier in the center is punctured in a sequence whose length is of an odd number to obtain a sequence whose length is of an even number, when the actual access resource is not at the carrier center location, a subcarrier needs to be reserved at a center frequency point of the actual access resource as a virtual direct current subcarrier. However, the virtual direct current subcarrier actually occupies a real subcarrier, and the virtual direct current subcarrier does not belong to any resource block; as a result, a real direct current subcarrier at the carrier center frequency point belongs to a special resource block in the carrier center, but the special resource block cannot use the real direct current subcarrier.

FIG. 5 is a schematic diagram of locations of a direct current subcarrier in a carrier center and a non-carrier center according to an embodiment of the present application. As shown in FIG. 5, an arrow A indicates a center location of a 20-MHz carrier, and an arrow B indicates a center location of an actual access resource. In a special resource block in the carrier center indicated by the arrow A, a direct current subcarrier belongs to a specific resource block in the special resource block. In other words, a candidate access resource at the carrier center location includes a real direct current subcarrier in the carrier center, but the resource block is not scheduled for UE because of a problem of interference at the direct current subcarrier. In addition, it should be understood that, in the actual access resource, not all subcarriers are used for sending a resource, and there may also be a null subcarrier. As shown in FIG. 5, assuming that the actual access resource is 36 subcarriers on either side of the carrier center, there may be five null subcarriers, and 31 effective subcarriers for sending a resource.

FIG. 6 is a schematic diagram of relationships between a candidate access resource and a direct current subcarrier in two cases: a carrier center and a non-carrier center. In a specific example, resource division structures at a virtual direct current subcarrier and a real direct current subcarrier are shown in diagrams 6-1 and 6-2 of FIG. 6. In the diagram 6-1 of FIG. 6, the candidate access resource has 5 null subcarriers +30 effective subcarriers on the left side, and has 6 null subcarriers +30 effective subcarriers on the right side, and one subcarrier occupied by a virtual direct current location belongs to the candidate access resource. In the diagram 6-2 of FIG. 6, the candidate access resource has 6 null subcarriers +30 effective subcarriers on each of the left and right sides, and one subcarrier occupied by a direct current location does not belong to the candidate access resource. As shown in the diagram 6-1 of FIG. 6, when the candidate access resource is not in a carrier center, quantities of subcarriers on the left and right sides of the virtual direct current location are not symmetric, which affects division of resource blocks on one side of the virtual direct current location, especially when UE detects a synchronization signal and the UE cannot yet distinguish whether the location is a virtual direct current location or a real direct current location, causes fuzziness in resource block determining for subsequent broadcast channel receiving. In an implementation manner of this embodiment of the present application, first, the UE determines, by detecting a synchronization signal, a direct current subcarrier location or a virtual direct current subcarrier location in a candidate access resource on which the synchronization signal is located, but in this case, the UE cannot yet distinguish whether it is specifically a direct current carrier location or a virtual direct current subcarrier location; next, the UE receives a broadcast channel on a frequency domain side of the direct current subcarrier location or the virtual direct current subcarrier location in the candidate access resource. Which side is selected may be predefined, which can ensure that surely an integer quantity of resource blocks are divided or sequenced on the side, and that each resource block still includes 12 subcarriers, avoiding fuzziness in the division of resource blocks and avoiding including unequal quantities of subcarriers. For example, in the diagram 6-1 of FIG. 6, it may be predefined that the broadcast channel is detected on the right side of a virtual direct current or direct current subcarrier, and it can be seen that there are 36 subcarriers on the right side, which are exactly a frequency domain width of three resource blocks, and there are three resource blocks on the left side, which are one subcarrier less.

The foregoing method for determining a sequence of a reference signal may also be implemented independently, without depending on the foregoing embodiment of determining a resource location of an actual access resource in an access cell. The following steps are specifically included:

S1: UE detects, by using at least one candidate sequence, a synchronization signal sent by an access cell, and determines an actual sequence of the synchronization signal; and determines an actual access resource of the access cell according to the determined actual sequence of the synchronization signal, where the at least one candidate sequence includes the actual sequence.

S2: The UE determines a second sequence of a second reference signal that is on the actual access resource, where a first sequence of the first reference signal is generated by using a maximum bandwidth of a single carrier supported in an LTE system, the second sequence is a second segmental sequence clipped at a first resource location that is in a center of the first sequence and that has a first frequency domain width, and the first frequency domain width is a frequency domain width of the actual access resource.

S3: The UE communicates with the access cell according to the second sequence.

Optionally, the actual access resource is not at a frequency domain center location of the access cell.

Optionally, a direct current subcarrier that does not belong to any resource block is independently reserved in a frequency domain center of the actual access resource.

Optionally, the UE determines a third sequence of a third reference signal that is on a reconfiguration resource, where the third sequence is a third segmental sequence clipped at a second resource location in the first sequence or a head-to-tail cycle of the first sequence, and a location shift relationship between the second segmental sequence at the first resource location and the third segmental sequence at the second resource location in the first sequence or the head-to-tail cycle of the first sequence is the same as a location shift relationship between the second sequence on the actual access resource and the third sequence on the reconfiguration resource in a carrier of the access cell. The reconfiguration resource is a resource reconfigured for the UE by a network side device, where a frequency domain width of the reconfiguration resource is not greater than a carrier bandwidth of the access cell, and the reconfiguration resource and the actual access resource may overlap or not. Further, the UE communicates with the access cell according to the third sequence.

An embodiment of the present application provides user equipment UE, including a processing unit and a communications unit, where the processing unit is configured to detect, by using at least one candidate sequence, a synchronization signal sent by an access cell, and determine an actual sequence of the synchronization signal; and determine an actual access resource of the access cell according to the determined actual sequence of the synchronization signal, where the at least one candidate sequence includes the actual sequence; and configured to determine a second sequence of a second reference signal that is on the actual access resource, where a first sequence of the first reference signal is generated by using a maximum bandwidth of a single carrier supported in an LTE system, the second sequence is a second segmental sequence clipped at a first resource location that is in a center of the first sequence and that has a first frequency domain width, and the first frequency domain width is a frequency domain width of the actual access resource; and the communications unit is configured to communicate with the access cell according to the second sequence.

The processing unit may be a processor. The communications unit may be a transceiver.

The UE is configured to execute the foregoing method, which is not repeatedly limited.

Figure 18:
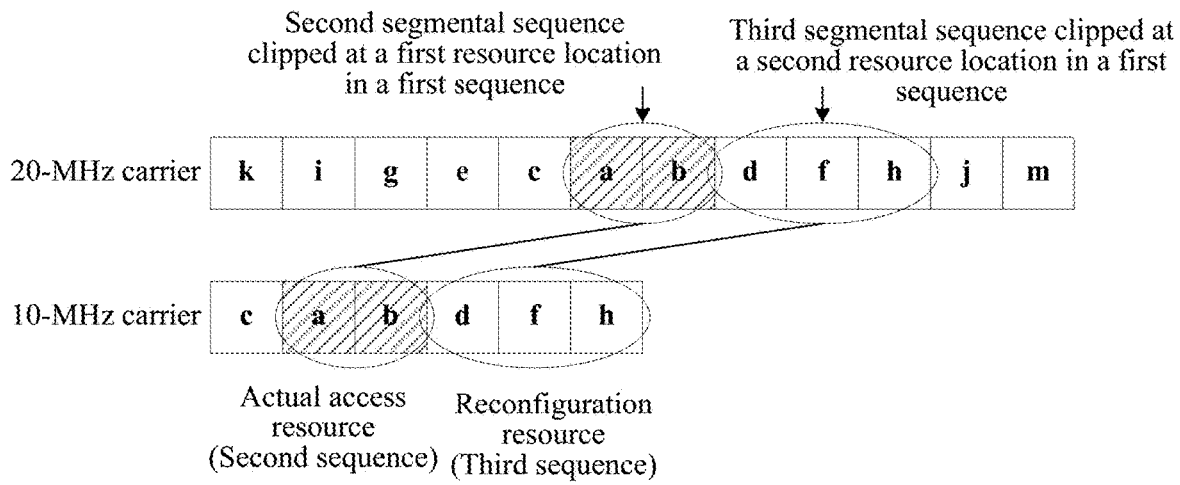
FIG. 18 is a schematic diagram of a method for determining a sequence of a reference signal according to an embodiment of the present application.

A specific description is provided by using the following example:

Refer to an embodiment a in FIG. 18 (it is assumed that a maximum bandwidth of a current LTE single carrier is 20 MHz, and a carrier bandwidth of an access cell is 10 MHz):

An actual access resource has a frequency domain width of six resource blocks in 10 MHz. A first sequence is generated by using the maximum bandwidth 20 MHz, and it is assumed that the first sequence is {k, i, g, e, c, a, b, d, f, h, j, m}. A second sequence is a second segmental sequence clipped at a first resource location that is in a center of the first sequence and that has a frequency domain width of six resource blocks, and it is assumed that the second segmental sequence is {a, b}. If a second sequence on an actual access resource in the 10-MHz-bandwidth carrier of the access cell is {a, b}, the second sequence is a second segmental sequence clipped at the first resource location that is in the center of the first sequence and that has a frequency domain width of six resource blocks.

UE may detect a synchronization signal on the actual access resource to access the cell, where the synchronization signal may be the same as a synchronization signal in a current LTE system, so that backward compatible UE can be supported. The actual access resource may be not at a frequency domain center location of the access cell, one direct current subcarrier is independently reserved at a center location of the actual access resource, and the subcarrier does not belong to any resource block, which is similar to reservation of a direct current subcarrier at a carrier center location in a conventional LTE system in which access is performed from a frequency domain center. After access, the UE may communicate with a network side by using the determined second sequence of a second reference signal that is on the actual access resource, for example, perform measurement, synchronization, and/or demodulation by using the second reference signal.

After access, a frequency domain resource may also be reconfigured for the UE, where the frequency domain resource may be referred to as a reconfiguration resource, a frequency domain width of the reconfiguration resource is not greater than the carrier bandwidth of the access cell, and the reconfiguration resource and the actual access resource may overlap or not. For example, a reconfiguration may be performed for the UE to use the entire 10-MHz bandwidth of the carrier of the access cell, or a reconfiguration may be performed for the UE to use some resources of the 10-MHz bandwidth of the carrier of the access cell, where the some resources and the actual access resource may overlap or not. Alternatively, the foregoing reconfiguration process may be not implemented by a network side device such as a base station but implemented by using radio resource control signaling, or the UE may receive a broadcast message on the actual access resource or a broadcast channel resource corresponding to the actual access resource to acquire the reconfiguration resource; or the UE even may autonomously decide the reconfiguration bandwidth according to a service status of the UE, and the UE may further report the determined reconfiguration resource to the network side device.

After reconfiguration, the UE needs to determine a third sequence of a third reference signal that is on the reconfiguration resource, where the third sequence is a third segmental sequence clipped at a second resource location in the first sequence, which is specifically shown in FIG. 18. It is assumed that the reconfiguration resource and the actual access resource are adjacent but do not overlap, and certainly, overlapping is not excluded. It can be seen that, the third sequence on the reconfiguration resource is a third segmental sequence {d, f, h} clipped at the second resource location in the first sequence, where selection of the second resource location needs to satisfy a condition: a location shift relationship between the second segmental sequence at the first resource location and the third segmental sequence at the second resource location in the first sequence is the same as a location shift relationship between the second sequence on the actual access resource and the third sequence on the reconfiguration resource in the carrier of the access cell. Specifically, the location shift relationship between the second sequence {a, b} on the actual access resource in the carrier of the access cell and the third sequence {d, f, h} on the reconfiguration resource in the carrier of the access cell is being adjacent, and then the second segmental sequence {a, b} clipped at the first resource location in the first sequence and the third segmental sequence {d, f, h} clipped at the second resource location in the first sequence are also kept in the same location shift relationship, that is, the sequences of the reference signals on the 10-MHz carrier of the access cell are sequence copies clipped from the first sequence. After reconfiguration, the UE may communicate with the network side by using the determined third sequence of the third reference signal, for example, perform measurement, synchronization, and/or demodulation by using the third reference signal. Refer to an embodiment b in FIG. 19 (it is assumed that a maximum bandwidth of a current LTE single carrier is 20 MHz, and a carrier bandwidth of an access cell is 15 MHz):

An actual access resource has a frequency domain width of six resource blocks in 15 MHz. A first sequence is generated by using the maximum bandwidth 20 MHz, and it is assumed that the first sequence is {k, i, g, e, c, a, b, d, f, h, j, m}. A second sequence is a second segmental sequence clipped at a first resource location that is in a center of the first sequence and that has a frequency domain width of six resource blocks, and it is assumed that the second segmental sequence is {a, b}. If a second sequence on an actual access resource in the 15-MHz-bandwidth carrier of the access cell is {a, b}, the second sequence is a second segmental sequence clipped at the first resource location that is in the center of the first sequence and that has a frequency domain width of six resource blocks.

Synchronization and reconfiguration processes of the UE are the same as those in the embodiment in FIG. 18, and are not described herein again.

Figure 19:
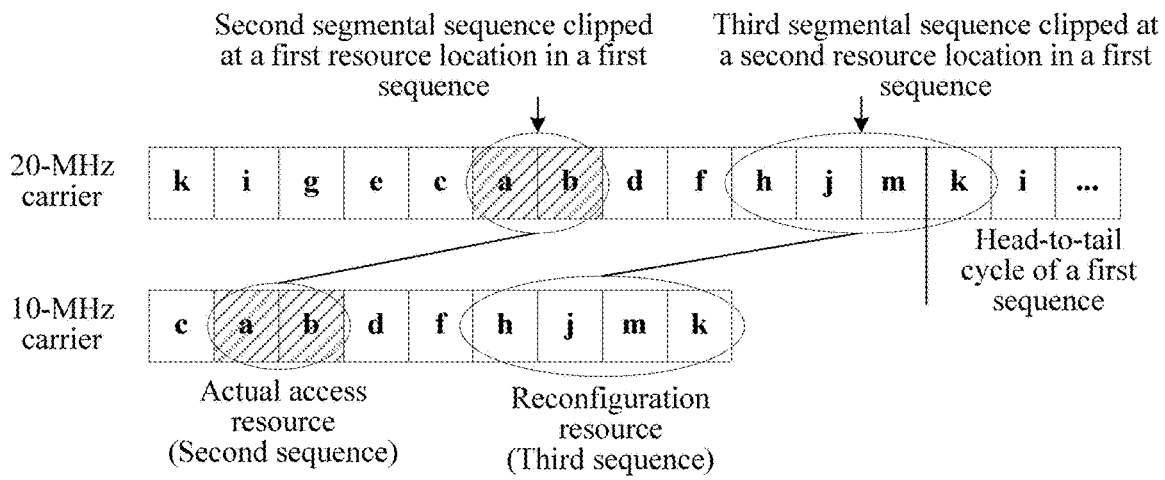
FIG. 19 is a schematic diagram of another method for determining a sequence of a reference signal according to an embodiment of the present application.

After reconfiguration, the UE needs to determine a third sequence of a third reference signal that is on the reconfiguration resource, where the third sequence is a third segmental sequence clipped at a second resource location in a head-to-tail cycle of the first sequence, which is specifically shown in FIG. 19. It is assumed that the reconfiguration resource and the actual access resource are adjacent but do not overlap, and certainly, overlapping is not excluded. It can be seen that, the head-to-tail cycle of the first sequence is {k, i, g, e, c, a, b, d, f, h, j, m, k, i, ...}, and the third sequence on the reconfiguration resource is a third segmental sequence {h, j, m, k} clipped at the second resource location in the head-to-tail cycle of the first sequence, where selection of the second resource location needs to satisfy a condition: a location shift relationship between the second segmental sequence at the first resource location and the third segmental sequence at the second resource location in the head-to-tail cycle of the first sequence is the same as a location shift relationship between the second sequence on the actual access resource and the third sequence on the reconfiguration resource in the carrier of the access cell. Specifically, the location shift relationship between the second sequence {a, b} on the actual access resource in the carrier of the access cell and the third sequence {h, j, m, k} on the reconfiguration resource in the carrier of the access cell is being adjacent, and then the second segmental sequence {a, b} clipped at the first resource location in the head-to-tail cycle of the first sequence and the third segmental sequence {h, j, m, k} clipped at the second resource location in the cyclic shift of the first sequence are also kept in the same location shift relationship, that is, the sequences of the reference signals on the 15-MHz carrier of the access cell are sequence copies clipped from the head-to-tail cycle of the first sequence. After reconfiguration, the UE may communicate with the network side by using the determined third sequence of the third reference signal, for example, perform measurement, synchronization, and/or demodulation by using the third reference signal.

In the foregoing embodiments, it can be ensured that backward compatibility is supported; a sequence of a synchronization signal and/or a manner of mapping a broadcast channel does not need to be modified, and implementation complexity is low; and UE is not required to perform access from a carrier center, which can coordinate inter-cell interference, and can further support a non-standard LTE bandwidth, for example, a 7-MHz or 8-MHz bandwidth, where the current LTE supports only six standard bandwidths, that is, 1.4, 3, 5, 10, 15, and 20 MHz.

The previously described UE may also be configured to execute the foregoing method, which is not repeatedly limited. The foregoing method may also be used on a network side. Specifically:

S1: A base station determines an actual access resource in a carrier of an access cell, where a second reference signal is included in the actual access resource, a second sequence of the second reference signal is a second segmental sequence clipped at a first resource location that is in a center of a first sequence and that has a first frequency domain width, the first frequency domain width is a frequency domain width of the actual access resource, and the first sequence of a first reference signal is generated by using a maximum bandwidth of a single carrier supported in an LTE system.

S2: The base station determines a third reference signal that is on the carrier of the access cell, where a third sequence of the third reference signal is a third segmental sequence clipped at a second resource location in the first sequence or a head-to-tail cycle of the first sequence, and a location shift relationship between the second segmental sequence at the first resource location and the third segmental sequence at the second resource location in the first sequence or the head-to-tail cycle of the first sequence is the same as a location shift relationship between the second sequence on the actual access resource in the carrier of the access cell and the third sequence on the carrier of the access cell.

S3: The base station sends the second reference signal and the third reference signal on the carrier of the access cell.

Optionally, the actual access resource is not at a frequency domain center location of the access cell.

Optionally, a direct current subcarrier that does not belong to any resource block is independently reserved in a frequency domain center of the actual access resource.

The foregoing method may also be used on an apparatus side, for example, a terminal and a base station.

An embodiment of the present application provides a base station, including a processing unit and a sending unit, where the processing unit is configured to determine an actual access resource in a carrier of an access cell, where a second reference signal is included in the actual access resource, a second sequence of the second reference signal is a second segmental sequence clipped at a first resource location that is in a center of a first sequence and that has a first frequency domain width, the first frequency domain width is a frequency domain width of the actual access resource, and the first sequence of a first reference signal is generated by using a maximum bandwidth of a single carrier supported in an LTE system; and configured to determine a third reference signal that is on the carrier of the access cell, where a third sequence of the third reference signal is a third segmental sequence clipped at a second resource location in the first sequence or a head-to-tail cycle of the first sequence, and a location shift relationship between the second segmental sequence at the first resource location and the third segmental sequence at the second resource location in the first sequence or the head-to-tail cycle of the first sequence is the same as a location shift relationship between the second sequence on the actual access resource in the carrier of the access cell and the third sequence on the carrier of the access cell; and the sending unit is configured to send the second reference signal and the third reference signal on the carrier of the access cell.

The processing unit may be a processor. The sending unit may be a transmitter.

The base station is configured to execute the foregoing method, which is not repeatedly limited. The foregoing method for determining a sequence of a reference signal may also be implemented independently according to the following embodiment, without depending on the foregoing embodiment of determining a resource location of an actual access resource in an access cell. A sequence in this embodiment is a sequence of a reference signal. The following steps are specifically included:

S1: UE determines a fourth sequence, where the fourth sequence is a sequence clipped from a fifth sequence and at a location corresponding to a resource of a transmission bandwidth of the UE, and the fifth sequence is generated by using a maximum bandwidth of a single carrier supported in an LTE system, or the fifth sequence is obtained through a cyclic shift or a head-to-tail cycle of a sequence generated by using a maximum bandwidth of a single carrier supported in an LTE system.

S2: The UE communicates with a base station according to the fourth sequence.

The fourth sequence is used as a sequence corresponding to a fourth reference signal. The UE receives the fourth reference signal on the transmission bandwidth. In this way, the UE may perform measurement, synchronization, and/or demodulation by using the fourth reference signal, to communicate with the base station.

Optionally, the transmission bandwidth is not at a center location of a frequency domain bandwidth of a cell in which the base station serves the UE. Optionally, the transmission bandwidth is not at a center location of a carrier used by the base station to serve the UE.

Optionally, the fourth sequence is clipped at a third resource location that is in a center of the fifth sequence and that has a third frequency domain width, where the third frequency domain width is a width of the transmission bandwidth of the UE.

Optionally, the fourth sequence is not a center part of the fifth sequence, or the fourth sequence is clipped at a third resource location that is a location determined according to a first shift from a center of the fifth sequence and that has a third frequency domain width, where the third frequency domain width is a width of the transmission bandwidth of the UE.

Optionally, a width of the transmission bandwidth is less than the maximum bandwidth of the single carrier supported in the LTE system.

Optionally, the UE performs access on a carrier on which the transmission bandwidth is located or performs access on a carrier other than a carrier on which the transmission bandwidth is located.

Optionally, the UE performs access by using the transmission bandwidth or performs access by using a frequency band in a same carrier other than the transmission bandwidth. A resource of a carrier on which the fourth sequence used by the UE in access is located is an actual access resource of the UE.

The transmission bandwidth of the UE and the actual access resource of the UE may overlap or not overlap.

Optionally, the first shift is a shift of a center of the transmission bandwidth of the UE relative to a frequency point corresponding to a center of the fifth sequence; or the first shift is a shift of a sequence center corresponding to the transmission bandwidth of the UE relative to a center of the fifth sequence.

The transmission bandwidth may be acquired by the UE by using signaling of a network side device such as the base station, for example, acquired by using radio resource control signaling, or may be acquired by the UE by receiving a broadcast message on the actual access resource or a broadcast channel resource corresponding to the actual access resource, or the UE may autonomously decide the transmission bandwidth according to a service status of the UE. The UE may further report the determined transmission bandwidth to the network side device. The UE may determine the first shift by using a location relationship between the transmission bandwidth and the access resource.

Alternatively, the first shift may be acquired by the UE by using signaling of the network side device such as the base station, for example, acquired by using radio resource control signaling, or may be acquired by the UE by receiving a broadcast message on the actual access resource or the broadcast channel resource corresponding to the actual access resource, or the UE may autonomously decide the first shift according to a service status of the UE. The UE may further report the determined first shift to the network side device.

Optionally, the actual access resource is not at a frequency domain center location of the cell in which the base station serves the UE. Certainly, optionally, it is not excluded that the actual access resource may also be at the frequency domain center location of the cell in which the base station serves the UE.

Optionally, a direct current subcarrier that does not belong to any resource block is independently reserved in a frequency domain center of the actual access resource.

Optionally, a direct current subcarrier that does not belong to any resource block is independently reserved in a frequency domain center of the transmission bandwidth.

An example is provided in the following. It is assumed that a maximum bandwidth of a current LTE single carrier is 20 MHz, and the fifth sequence is generated by using 20 MHz. It is assumed that the fifth sequence is {k, i, g, e, c, a, b, d, f, h, j, m}, and the UE may determine a location of the fourth sequence in the fifth sequence and a specific sequence of the fourth sequence by using the first shift and the center of the transmission bandwidth of the UE, that is, according to the location of the fourth sequence in the fifth sequence, determine the fourth sequence, for example, {e, c, a, b, d, f} or {d, f, h, j}, where a location of the first shift is a shift of a center of the fourth sequence relative to a center of the fifth sequence. Alternatively, the fifth sequence is a cyclic shift of {k, i, g, e, c, a, b, d, f, h, j, m}, for example, {j, m, k, i, g, e, c, a, b, d, f, h}, and the UE may determine a location of the fourth sequence in the fifth sequence and a specific sequence of the fourth sequence, for example, {e, c, a, b, d, f} or {b, d, f, h}, by using the first shift and the center of the transmission bandwidth of the UE, where a location of the first shift is a shift of a center of the fourth sequence relative to a center of the fifth sequence.

In this design manner, a problem of how to obtain a sequence of a reference signal that is on a transmission bandwidth actually used by the UE, in a case in which UE does not know a size of a bandwidth actually used by a base station and the base station generates, by means of continuous generation by using a sequence generator, a sequence of a reference signal used on the entire bandwidth actually used by the base station, is resolved. In this design manner, the bandwidth used by the base station and the bandwidth used by the UE may be decoupled, and a sequence of a reference signal used on the entire bandwidth actually used by the base station may be generated by means of continuous generation by using a sequence generator. In this design manner, sequence generation complexity can be simplified, and compatibility of system designs of different bandwidths can be retained. Moreover, the UE may be further allowed to use some of the bandwidth actually used by the base station, and the bandwidth actually used by the base station may be a standard LTE bandwidth or a non-standard LTE bandwidth, for example, may be or not be only six standard bandwidths supported by the current LTE, that is, 1.4, 3, 5, 10, 15, and 20 MHz.

An embodiment of the present application provides user equipment UE, including a processing unit and a communications unit, where the processing unit is configured to determine a fourth sequence, where the fourth sequence is a sequence clipped from a fifth sequence and at a location corresponding to a resource of a transmission bandwidth of the UE, and the fifth sequence is generated by using a maximum bandwidth of a single carrier supported in an LTE system, or the fifth sequence is obtained through a cyclic shift or a head-to-tail cycle of a sequence generated by using a maximum bandwidth of a single carrier supported in an LTE system; and the communications unit is configured to communicate with a base station according to the fourth sequence.

The processing unit may be a processor. The communications unit may be a transceiver.

The UE is configured to execute the foregoing method, which is not repeatedly limited.

The foregoing method may also be used on a network side, and is consistent with the method on a UE side. Specifically:

S1: A base station determines a fourth sequence, where the fourth sequence is a sequence clipped from a fifth sequence and at a location corresponding to a resource of a transmission bandwidth of the UE, and the fifth sequence is generated by using a maximum bandwidth of a single carrier supported in an LTE system, or is obtained through a cyclic shift or a head-to-tail cycle of a sequence generated by using a maximum bandwidth of a single carrier supported in an LTE system.

S2: The base station communicates with UE according to the fourth sequence.

The fourth sequence is used as a sequence corresponding to a fourth reference signal. The base station sends the fourth reference signal on the transmission bandwidth. In this way, the UE may perform measurement, synchronization, and/or demodulation by using the fourth reference signal, and the base station may communicate with the UE.

The method on the network side is consistent with that on the UE side, and details are not described again.

An embodiment of the present application provides a base station, including a processing unit and a communications unit, where the processing unit is configured to determine a fourth sequence, where the fourth sequence is a sequence clipped from a fifth sequence and at a location corresponding to a resource of a transmission bandwidth of the UE, and the fifth sequence is generated by using a maximum bandwidth of a single carrier supported in an LTE system, or is obtained through a cyclic shift or a head-to-tail cycle of a sequence generated by using a maximum bandwidth of a single carrier supported in an LTE system; and the communications unit is configured to communicate with UE according to the fourth sequence.

The processing unit may be a processor. The communications unit may be a transceiver.

The base station is configured to execute the foregoing method, which is not repeatedly limited.

FIG. 7 is a flowchart of a cell access resource indication method according to an embodiment of the present application. The method in FIG. 7 is executed by a base station.

701: Determine an actual access resource of a current cell and an actual sequence of a synchronization signal of the current cell.

The actual access resource is at least one candidate access resource in multiple candidate access resources used by the current cell to send the synchronization signal, the actual sequence is one of at least one candidate sequence of the synchronization signal, and any candidate sequence in the at least one candidate sequence corresponds to one of the multiple candidate access resources.

702: Send the synchronization signal on the actual access resource by using the actual sequence.

In this embodiment of the present application, a synchronization signal is sent on an actual access resource according to a correspondence between a sequence for sending the synchronization signal and a candidate access resource of the synchronization signal by using an actual sequence, so that UE can determine a resource location of the actual access resource in a current cell according to the actual sequence, the actual access resource, and a relative location relationship between a candidate access resource indicated by the actual sequence and the current cell, which can, to some extent, avoid interference impact caused by intensive cells to access by the UE when the UE accesses the current cell, coordinate inter-cell interference of a common control channel, and improve performance of detection on the common control channel.

Optionally, the one of the at least one candidate sequence is a complete sequence; or the one of the at least one candidate sequence is a segmental sequence in a complete sequence.

Optionally, besides a first candidate access resource, at least one candidate access resource exists in the multiple candidate access resources. The first candidate access resource is a resource having a frequency domain width of N resource blocks in a center of the current cell, and N is a preconfigured natural number. In addition, N may be specified in a protocol, or specified according to a policy of an operator.

Optionally, after step 702, the method further includes: sending a broadcast channel in the current cell. The broadcast channel carries bandwidth indication information of the current cell, and the bandwidth indication information of the current cell is used for indicating a bandwidth of the current cell.

Optionally, after the sending the synchronization signal on the actual access resource by using the actual sequence, the method further includes: if the actual access resource includes a first actual access resource and a second actual access resource, sending a first random access configuration of the current cell on the first actual access resource, and sending a second random access configuration of the current cell on the second actual access resource.

Optionally, after step 702, the method further includes: if the actual access resource includes a first actual access resource and a second actual access resource, sending a first random access configuration of the current cell on a broadcast channel resource or common channel resource corresponding to the first actual access resource, and sending a second random access configuration of the current cell on a broadcast channel resource or common channel resource corresponding to the second actual access resource.

Optionally, after step 702, the method further includes: sending a second reference signal at the resource location of the actual access resource. The second reference signal is a reference signal segment clipped from a first reference signal and corresponding to the resource location, and the first reference signal is a reference signal generated by using a center frequency point of the current cell as a center and using a quantity of resource blocks included in the bandwidth of the current cell as a frequency domain width.

Optionally, in another embodiment, after step 702, the method further includes: sending a second reference signal at the resource location of the actual access resource. The second reference signal is a reference signal segment clipped from a frequency domain center of a first reference signal and corresponding to a first frequency domain width, the first frequency domain width is a frequency domain width occupied by the actual access resource, a reference signal in the bandwidth of the current cell is a cyclic shift of the first reference signal, and the first reference signal is a reference signal generated by using a center frequency point of the current cell as a center and using a quantity of resource blocks included in the bandwidth of the current cell as a frequency domain width.

Optionally, a specific implementation of step 701 is: if the resource location of the actual access resource is not a frequency domain center location of the current cell, processing a subcarrier in a center of the actual access resource as a virtual direct current subcarrier when analyzing division of resource blocks in the actual access resource.

The following describes the method in this embodiment of the present application by using a specific embodiment.

Embodiment 2 of the present application: A sequence for a base station to send a synchronization signal can indicate a resource location relationship between a resource for sending the synchronization signal and a resource on which a current cell is located. The base station sends the synchronization signal on an actual access resource by using an actual sequence, so that on the premise that UE can parse out the synchronization signal, the UE avoids interference impact caused by intensive cells to access by the UE.

First, the base station may first determine the actual access resource and the actual sequence of the synchronization signal.

There may be multiple candidate access resources and multiple candidate sequences in the current cell of the base station. A candidate access resource is an access resource that may be used when the synchronization signal is sent, a candidate sequence is a sequence that may be used when the synchronization signal is sent, and each candidate sequence in the multiple candidate sequences corresponds to one of the multiple candidate access resources.

FIG. 2 is a schematic diagram of a relationship between a cell carrier and a candidate access resource according to an embodiment of the present application. As shown in FIG. 2, when a cell carrier bandwidth is 20 MHz, the cell carrier bandwidth may include five candidate access resources: candidate access resources 1 to 5 in total; when a cell carrier bandwidth is 10 MHz, the cell carrier bandwidth may include three candidate access resources: candidate access resources 1 to 3 in total; when a cell carrier bandwidth is 1.4 MHz, the cell carrier bandwidth includes only a candidate access resource 1. Certainly, FIG. 2 shows only a possible relationship between a candidate access resource and a cell carrier, and there may be another possible relationship, for example, when a cell carrier bandwidth is 10 MHz, the cell carrier bandwidth may include nine candidate access resources.

Besides a first candidate access resource, the multiple candidate access resources of the base station may include a candidate access resource. The first candidate access resource is a resource having a frequency domain width of N resource blocks in a center of the current cell, and N is a preconfigured natural number, and may be specified in a protocol, or specified according to a policy of an operator. For example, in FIG. 2, the candidate access resource 1 is the first candidate access resource, and occupies 1.4 MHz, that is, a frequency domain width of six resource blocks. Besides the first candidate access resource, the multiple candidate access resources of the base station include at least one candidate access resource; in FIG. 2, besides the candidate access resource 1, the multiple candidate access resources of the base station further include the candidate access resource 2 to the candidate access resource 5. Location relationships of the candidate access resources in an entire carrier resource on which the current cell is located are preset.

In this embodiment of the present application, at least one candidate access resource of the current cell may be predefined, for example, defined according to a maximum carrier bandwidth, and a specific carrier bandwidth may be less than or equal to the maximum carrier bandwidth. For example, each candidate access resource may satisfy a condition that a center frequency point is on a 100-KHz grid, to facilitate cell search by the UE, that is, detection on the synchronization signal. For example, in FIG. 2, a maximum bandwidth is 20 MHz and has five candidate access resources: the candidate access resource 1 to the candidate access resource 5. If an actual bandwidth is 10 MHz, there are three actual candidate access resources.

In addition, when determining the actual access resource, the base station further needs to determine an available resource block in the actual access resource according to a location of the actual access resource. If the resource location of the actual access resource is not a frequency domain center location of the current cell, the base station may process a subcarrier in a center of the actual access resource as a virtual direct current subcarrier when determining division of resource blocks in the actual access resource. Because the direct current subcarrier is generally at a center frequency point of the carrier, if an original design structure of a sequence of a synchronization signal needs to be retained in this case, that is, a numerical point at a location of the direct current subcarrier in the center is punctured in a sequence whose length is of an odd number to obtain a sequence whose length is of an even number, when the actual access resource is not at the carrier center location, a subcarrier needs to be reserved at a center frequency point of the actual access resource as a virtual direct current subcarrier. However, the virtual direct current subcarrier actually occupies a real subcarrier, and the virtual direct current subcarrier does not belong to any resource block; as a result, a real direct current subcarrier at the carrier center frequency point belongs to a special resource block in the carrier center, but the special resource block cannot use the real direct current subcarrier. Specifically, as shown in FIG. 5, a subcarrier that is not counted into any resource block is reserved in a center of the actual access resource that is not at the carrier center location, and the subcarrier is referred to as a virtual direct current subcarrier; and a candidate access resource at the carrier center location includes a real direct current subcarrier in the carrier center, and the real direct current subcarrier needs to be counted into a resource block, but the resource block is not scheduled for UE because of a problem of interference at the direct current subcarrier. In addition, it can be seen from resource division structures at a virtual direct current subcarrier and a real direct current subcarrier that are shown in diagrams 6-1 and 6-2 of FIG. 6 that, quantities of subcarriers on the left and right sides of a virtual direct current location are not symmetric, which affects division of resource blocks on one side of the virtual direct current location, especially when the UE detects the synchronization signal and the UE cannot yet distinguish whether the location is a virtual direct current location or a real direct current location, causes fuzziness in resource block determining for subsequent broadcast channel receiving. Therefore, when sending a broadcast channel, the base station may send the broadcast channel by selecting a frequency domain resource on a same side of the direct current subcarrier location and the virtual direct current subcarrier location, so as to ensure that surely an integer quantity of resource blocks are divided or sequenced on the side. For example, in the diagram 6-1 of FIG. 6, it may be predefined that the broadcast channel is sent on the right side of the virtual direct current or direct current subcarrier, and it can be seen that there are 36 subcarriers on the right side, which are exactly a frequency domain width of three resource blocks, and there are three resource blocks on the left side, which are one subcarrier less.

In an implementation manner of this embodiment of the present application, the base station may first determine the actual access resource for sending the synchronization signal, and then determine, according to the resource location relationship between the actual access resource and the current cell, a candidate sequence corresponding to the resource location relationship as the actual sequence for sending the synchronization signal, where the actual sequence is one of the multiple candidate sequences for sending the synchronization signal, and the actual access resource is one of the multiple candidate access resources used for sending the synchronization signal.

In another implementation manner of this embodiment of the present application, the base station may first determine the actual sequence for sending the synchronization signal, and then determine, according to a candidate sequence corresponding to the actual sequence and used for sending the synchronization signal, the actual access resource for sending the synchronization signal, where the actual sequence is one of the multiple candidate sequences for sending the synchronization signal, and the actual access resource is one of the multiple candidate access resources used for sending the synchronization signal.

A current cell having a 20-MHz carrier bandwidth and including 100 resource blocks is used as an example. Assuming that there are five candidate access resources in the current cell and each candidate access resource occupies six resource blocks, corresponding location relationships of the five candidate access resources in the 20-MHz carrier may be preset, for example, there is one candidate access resource in a carrier center, and two candidate access resources are respectively included at predefined locations on either side of a carrier center frequency point. In addition, any candidate sequence in the at least one candidate sequence corresponds to one of the multiple candidate access resources, for example, sequences 1 to 5 correspond to the candidate access resource 1, and sequences 6 to 10 correspond to the candidate access resource 2. If the actual access resource selected by the current cell to send the synchronization signal is 2, the actual sequence selected by the current cell to send the synchronization signal can only be 6 to 10; or if the actual sequence selected by the current cell to send the synchronization signal is 6, the actual access resource selected by the current cell to send the synchronization signal can only be the candidate access resource 2.

In addition, the candidate sequence may be a complete sequence; or the candidate sequence may be a segmental sequence in a complete sequence.

In this embodiment of the present application, the candidate sequence may be a Zadoff-Chu sequence or an m sequence. Certainly, a possibility of another sequence is not excluded. Preferably, the candidate sequence in this embodiment of the present application may be a Zadoff-Chu sequence. An original sequence length of the candidate sequence may be less than a sequence length of a primary synchronization sequence in an LTE release 8. The sequence length of the primary synchronization sequence in the LTE release 8 is 63, and then a numerical value at a location of a subcarrier at a direct current location in a carrier center is punctured to use a final sequence whose sequence length is 62.

In an implementation manner of this embodiment of the present application, on the carrier of the present application, the primary synchronization sequence may be a sequence whose length is 61, which can distinguish an earlier-release LTE carrier and a subsequently evolved LTE carrier.

In another implementation manner of this embodiment of the present application, the original sequence length of the candidate sequence is equal to the sequence length of the primary synchronization sequence in the LTE release 8, but an actual length of the candidate sequence is determined after puncture of a primary synchronization signal, for example, two or three subcarriers are punctured.

In this case, a structure of primary synchronization signal is consistent with that in an LTE system in the release 8. To distinguish a carrier type, a candidate sequence space may be expanded, that is, a quantity of sequences is newly designed to distinguish the carrier type, or the carrier type may be distinguished in another manner, for example, through indication by using a broadcast channel. A function of carrier type distinguishing in the foregoing is that a new carrier can use multiple candidate access resources, while an original carrier type, that is, an earlier-release LTE system carrier, has only a resource in a carrier center.

For example, in FIG. 2, the maximum bandwidth 20 MHz has five candidate access resources. Therefore, five different groups of candidate sequences: sequence groups 0 to 4 in total may be used for the synchronization signal of the access cell, and sequences in the groups do not overlap. Candidate sequences of the sequence groups 0 to 4 respectively correspond to the candidate access resources 1 to 5, for example, candidate sequences of the sequence group 0 correspond to the candidate access resource 1, and candidate sequences of the sequence group 1 correspond to the candidate access resource 2. The candidate sequence may be a complete sequence, for example, a ZC sequence whose length is 61; or the candidate sequence may be a sequence segment in a complete sequence, for example, in FIG. 2, the candidate sequence may be a sequence segment whose length is 61 in a long sequence whose length is at least 61*5, where the long sequence has five sequence segments whose length is 61, which respectively correspond to the candidate access resources 1 to 5.

The multiple candidate access resources used for sending the synchronization signal and the multiple candidate sequences for sending the synchronization signal may be specified in a protocol, or may be specified by an operator, or is notified by the base station to the UE by using broadcast signaling. In addition, a candidate sequence for the base station to send the synchronization signal may be further used for indicating a candidate access resource. Specifically, the candidate sequence may be used for indicating an identifier of the candidate access resource or a resource location relationship between the candidate access resource and the resource on which the current cell is located.

Then the synchronization signal is sent on the actual access resource by using the actual sequence.

After selecting the actual sequence and the actual access resource, the base station may send the synchronization signal.

In addition, after sending the synchronization signal on the actual access resource by using the actual sequence, the base station may further send a broadcast channel in the current cell. The broadcast channel carries bandwidth indication information of the current cell, and the bandwidth indication information of the current cell is used for indicating a bandwidth of the current cell.

For example, in the embodiment shown in FIG. 2, after sending the synchronization signal on the candidate access resource 2 by using the candidate sequence 1, the base station may further send a broadcast channel in the current cell, where the broadcast channel carries bandwidth indication information of the current cell, for example, 20 M or a bandwidth indication code representing 20 M.

In addition, after sending the synchronization signal on the actual access resource by using the actual sequence, the base station may further send different random configuration information according to different actual access resources. For example, assuming that the base station sends the synchronization signal of the current cell on each of the candidate access resource 1 and the candidate access resource 2 shown in FIG. 2, the base station may send first random configuration information on a broadcast channel resource or common channel resource corresponding to the candidate access resource 1, and send second random configuration information on a broadcast channel resource or common channel resource corresponding to the candidate access resource 2. In this way, the UE may distinguish different random configuration information according to different access resource locations of the received random configuration information.

In addition, after sending the synchronization signal on the actual access resource by using the actual sequence, the base station may further send a second reference signal at the resource location of the actual access resource.

In an implementation manner of this embodiment of the present application, the second reference signal is a reference signal segment clipped from a first reference signal and corresponding to the resource location, and the first reference signal is a reference signal generated by using the center frequency point of the current cell as a center and using a quantity of resource blocks included in the bandwidth of the current cell as a frequency domain width. For example, in FIG. 3, the base station may send the first reference signal on the entire cell resource of the current cell, where the second reference signal corresponding to the actual access resource is a part of reference signal in the first reference signal and corresponding to the actual access resource.

In another implementation manner of this embodiment of the present application, the second reference signal is a reference signal segment clipped from a frequency domain center of a first reference signal and corresponding to a first frequency domain width, the first frequency domain width is a frequency domain width occupied by the actual access resource, a reference signal in the bandwidth of the current cell is a cyclic shift of the first reference signal, and the first reference signal is a reference signal generated by using the center frequency point of the current cell as a center and using a quantity of resource blocks included in the bandwidth of the current cell as a frequency domain width. For example, in FIG. 3 and FIG. 4, a first reference signal shown in FIG. 3 is a reference signal sent by the base station when the actual access resource is at the center frequency point of the current cell, a first reference signal shown in FIG. 4 is a reference signal sent by the base station when the actual access resource is not at the center frequency point of the current cell, a second reference signal in the first reference signal in FIG. 4 and corresponding to the actual access resource is the same as a reference signal corresponding to an access resource on which the center frequency point is located in FIG. 3, and the first reference signal in FIG. 4 is obtained through a cyclic shift of the first reference signal in FIG. 3.

Figure 8:
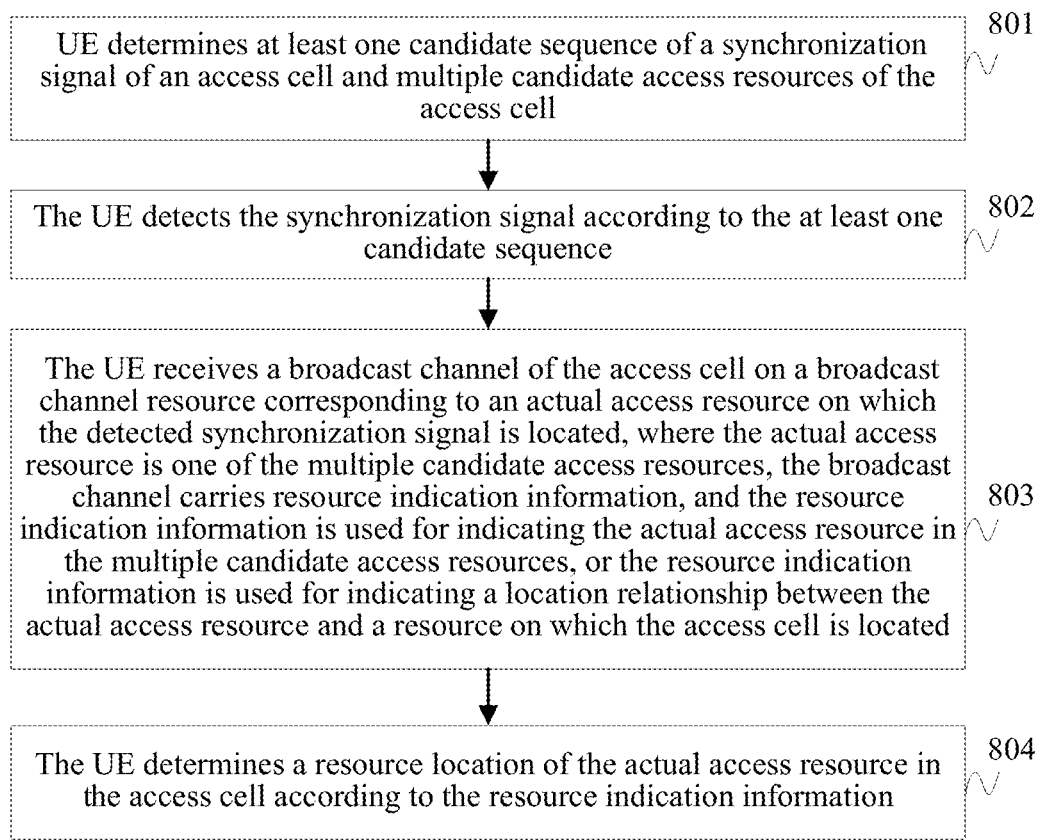
FIG. 8 is a flowchart of another cell access resource acquisition method according to an embodiment of the present application.

FIG. 8 is a flowchart of another cell access resource acquisition method according to an embodiment of the present application. The method in FIG. 8 is executed by UE.

801: The UE determines at least one candidate sequence of a synchronization signal of an access cell and multiple candidate access resources of the access cell.

802: The UE detects the synchronization signal according to the at least one candidate sequence.

803: The UE receives a broadcast channel of the access cell on a broadcast channel resource corresponding to an actual access resource on which the detected synchronization signal is located.

The actual access resource is one of the multiple candidate access resources, the broadcast channel carries resource indication information, and the resource indication information is used for indicating the actual access resource in the multiple candidate access resources, or the resource indication information is used for indicating a location relationship between the actual access resource and a resource on which the access cell is located.

804: The UE determines a resource location of the actual access resource in the access cell according to the resource indication information.

In this embodiment of the present application, a resource location of an actual access resource in an access cell is determined by using the actual access resource of a detected synchronization signal and resource indication information received on a broadcast channel, which can, to some extent, avoid interference impact caused by intensive cells to access by UE, coordinate inter-cell interference of a common control channel, and improve performance of detection on the common control channel.

Optionally, in an embodiment, when the resource indication information is used for indicating the actual access resource in the multiple candidate access resources, a corresponding location relationship exists between each candidate access resource in the multiple candidate access resources and the resource on which the access cell is located, and a specific implementation of step 804 may be: determining, by the UE, the actual access resource in the multiple candidate access resources according to the resource indication information; and determining, by the UE, the resource location of the actual access resource in the access cell according to the corresponding location relationship existing between each candidate access resource in the multiple candidate access resources and the resource on which the access cell is located.

Optionally, in another embodiment, when the resource indication information is used for indicating the location relationship between the actual access resource and the resource on which the access cell is located, a specific implementation of step 804 may be: determining, by the UE, the resource location of the actual access resource in the access cell according to the location relationship, indicated by the resource indication information, between the actual access resource and the resource on which the access cell is located.

Optionally, after step 804, the method further includes: determining, by the UE, a cell identifier of the access cell according to the resource location of the actual access resource in the access cell and an actual sequence of the detected synchronization signal.

Optionally, after step 804, the method further includes: if the actual access resource includes a first actual access resource and a second actual access resource, acquiring, by the UE, a first random access configuration and a second random access configuration on the first actual access resource and the second actual access resource, respectively, where the first random access configuration corresponds to the first actual access resource, and the second random access configuration corresponds to the second actual access resource.

Optionally, in an embodiment, after step 804, the method further includes: determining, by the UE, a second reference signal that is at the resource location of the actual access resource. The second reference signal is a reference signal segment clipped from a first reference signal and corresponding to the resource location, and the first reference signal is a reference signal generated by using a center frequency point of the access cell as a center and using a quantity of resource blocks included in a bandwidth of the access cell as a frequency domain width.

Optionally, in another embodiment, after step 804, the method further includes: determining, by the UE, a second reference signal that is at the resource location of the actual access resource. The second reference signal is a reference signal segment clipped from a frequency domain center of a first reference signal and corresponding to a first frequency domain width, the first frequency domain width is a frequency domain width occupied by the actual access resource, a reference signal in a bandwidth of the access cell is a cyclic shift of the first reference signal, and the first reference signal is a reference signal generated by using a center frequency point of the access cell as a center and using a quantity of resource blocks included in the bandwidth of the access cell as a frequency domain width.

Optionally, after step 804, the method further includes: if the resource location of the actual access resource is not a frequency domain center location of the access cell, processing, by the UE, a subcarrier in a center of the actual access resource as a virtual direct current subcarrier when analyzing division of resource blocks in the actual access resource. Further, the broadcast channel resource corresponding to the actual access resource is located on a predefined side of a center frequency point of the actual access resource.

The following describes the method in this embodiment of the present application by using a specific embodiment.

Embodiment 3 of the present application: UE determines a resource location of an actual access resource in an access cell according to a location relationship of the actual access resource in a resource on which the cell is located and resource indication information in a broadcast channel.

First, before detecting a synchronization signal, the UE may first determine at least one candidate sequence of the synchronization signal of the UE and multiple candidate access resources of the access cell. The at least one candidate sequence is a candidate sequence that is used by the access cell of the UE to send the synchronization signal, the multiple candidate access resources are access resources that may be used by the access cell of the UE, the resource on which the access cell is located refers to an entire carrier resource on which the access cell is located, and a corresponding location relationship exists between each candidate access resource in the multiple candidate access resources and the resource on which the access cell is located.

An access cell having a 20-MHz carrier bandwidth and including 100 resource blocks is used as an example. Assuming that there are five candidate access resources in the access cell and each candidate access resource occupies six resource blocks, corresponding location relationships of the five candidate access resources in the 20-MHz carrier may be preset, for example, there is one candidate access resource in a carrier center, and two candidate access resources are respectively included at predefined locations on either side of a carrier center frequency point.

A location relationship of a candidate access resource in the resource on which the access cell is located may be a frequency interval between a resource location of the candidate access resource and a location of a center frequency point of the access cell, or a frequency interval between a resource location of the candidate access resource and a location of a lowest frequency of the access cell, or a frequency interval between a resource location of the candidate access resource and a location of a highest frequency of the access cell, which is not specifically limited, as long as the location relationship is preset.

Besides a first candidate access resource, the multiple candidate access resources of the UE may include a candidate access resource. The first candidate access resource is a resource having a frequency domain width of N resource blocks in a center of the access cell, and N is a preconfigured natural number, and may be specified in a protocol, or specified according to a policy of an operator. For example, in FIG. 2, the candidate access resource 1 is the first candidate access resource, and occupies 1.4 MHz, that is, a frequency domain width of six resource blocks. Besides the first candidate access resource, the multiple candidate access resources of the UE include at least one candidate access resource; in FIG. 2, besides the candidate access resource 1, the multiple candidate access resources of the UE further include the candidate access resource 2 to the candidate access resource 5. Location relationships of the candidate access resources in the entire carrier resource on which the access cell is located are preset.

In this embodiment of the present application, at least one candidate access resource of the access cell may be predefined, for example, defined according to a maximum carrier bandwidth, and a specific carrier bandwidth may be less than or equal to the maximum carrier bandwidth. For example, each candidate access resource may satisfy a condition that a center frequency point is on a 100-KHz grid, to facilitate cell search by the UE, that is, detection on the synchronization signal. For example, in FIG. 2, a maximum bandwidth is 20 MHz and has five candidate access resources: the candidate access resource 1 to the candidate access resource 5. If an actual bandwidth is 10 MHz, there are three actual candidate access resources, but before the UE acquires bandwidth information, the UE can still assume in detection that there are five candidate access resources, and finally determine one or more actual access resources from three candidate access resources in the middle. That is, a candidate access resource set in a large-bandwidth scenario includes a candidate access resource set in a small-bandwidth scenario. In this way, detection complexity can be simplified, and compatibility of system designs of different bandwidths can be retained.

In this embodiment of the present application, the candidate sequence may be a Zadoff-Chu sequence or an m sequence. Certainly, a possibility of another sequence is not excluded. Preferably, the candidate sequence in this embodiment of the present application may be a Zadoff-Chu sequence. An original sequence length of the candidate sequence may be less than a sequence length of a primary synchronization sequence in an LTE release 8. The sequence length of the primary synchronization sequence in the LTE release 8 is 63, and then a numerical value at a location of a subcarrier at a direct current location in a carrier center is punctured to use a final sequence whose sequence length is 62.

In an implementation manner of this embodiment of the present application, on the carrier of the present application, the primary synchronization sequence may be a sequence whose length is 61, which can distinguish an earlier-release LTE carrier and a subsequently evolved LTE carrier.

In another implementation manner of this embodiment of the present application, the original sequence length of the candidate sequence is equal to the sequence length of the primary synchronization sequence in the LTE release 8, but an actual length of the candidate sequence is determined after puncture of a primary synchronization signal, for example, two or three subcarriers are punctured.

In this case, a structure of primary synchronization signal is consistent with that in an LTE system in the release 8. To distinguish a carrier type, a candidate sequence space may be expanded, that is, a quantity of sequences is newly designed to distinguish the carrier type, or the carrier type may be distinguished in another manner, for example, through indication by using a broadcast channel. A function of carrier type distinguishing in the foregoing is that a new carrier can use multiple candidate access resources, while an original carrier type, that is, an earlier-release LTE system carrier, has only an access resource in a carrier center.

Then, the UE detects the synchronization signal according to the at least one candidate sequence.

The UE detects a synchronization signal according to a candidate sequence. When the UE detects a synchronization signal and an actual sequence of the synchronization signal is one of the at least one candidate sequence, it may be considered that the UE detects the synchronization signal of the access cell, and the detected candidate sequence is an actual sequence of the synchronization signal of the access cell. Moreover, multiple actual sequences may be sent in one access cell, and the multiple actual sequences are respectively sent on the multiple candidate access resources. In this way, the UE may detect the multiple actual sequences.

Next, the UE receives a broadcast channel of the access cell on a broadcast channel resource corresponding to an actual access resource on which the detected synchronization signal is located.

After the UE detects the synchronization signal, an access resource on which the synchronization signal is located is the actual access resource.

The UE receives a broadcast channel of the access cell on a broadcast channel resource corresponding to the actual access resource. The broadcast channel carries resource indication information, and the resource indication information indicates the actual access resource in the multiple candidate access resources. The resource indication information may be specifically information that can distinguish a candidate access resource, such as an identifier or a code of the candidate access resource. For example, the resource indication information is "010", indicating the candidate access resource 2 in FIG. 2, or a relative location relationship of the candidate access resource 2 relative to the access cell.

The broadcast channel resource corresponding to the actual access resource may be understood as that a resource occupied by the broadcast channel is a subset of the actual access resource, or that a relatively fixed location relationship exists between a resource on which the broadcast channel is located and the actual access resource, or the like, and these correspondences are not limited.

The UE receives the broadcast channel, where the broadcast channel may be a physical broadcast channel or a physical broadcast channel enhanced in the future, which is not limited. The UE may acquire the resource indication information carried in the broadcast channel, where the resource indication information may be carried by a bit, a scrambling code, a time/frequency resource location, or the like in the broadcast channel, which is not limited herein.

Finally, the UE determines the resource location of the actual access resource in the access cell according to the corresponding location relationship existing between each candidate access resource in the multiple candidate access resources and the resource on which the access cell is located.

For example, when the UE receives the resource indication information "010", the UE may determine, according to the actual access resource and the resource indication information, that the actual access resource corresponds to the candidate access resource 2, and further determine the resource location of the actual access resource in the access cell according to the location relationship of the actual access resource in the resource on which the cell is located.

In addition, the resource indication information may further include bandwidth information of the access cell, and the UE may further determine a bandwidth of the access cell according to the bandwidth information of the access cell in the resource indication information.

In addition, the UE may further determine a cell identifier of the access cell according to the resource location of the actual access resource in the access cell and the sequence of the synchronization signal.

In an existing system, after detecting the synchronization signal of the carrier from the carrier center, the UE may acquire a cell identifier of the carrier according to sequence information of the synchronization signal, where a value of the cell identifier ranges from 0 to 503. After the multiple candidate access resources are introduced, the value range of the cell identifier can be expanded, to adapt to a deployment scenario of more intensive cells in the future, and resolve a problem of a cell identifier conflict. For example, the cell identifier of the access cell is determined by using the resource location of the actual access resource and the sequence of the synchronization signal. Specifically, assuming that a size of a value space of the cell identifier carried by the sequence is still 504, the value space of the cell identifier may be further expanded according to a resource location of a first access resource in the carrier. Assuming that the carrier has five candidate access resources, the space can be expanded to 504*5, that is, location information of each candidate access resource may provide a degree of freedom of expansion. For example, in the five candidate access resources shown in FIG. 2, the candidate access resource 1 may correspond to cell identifiers 0 to 503, the candidate access resource 2 may correspond to cell identifiers 504 to 1007, and by analog, the candidate access resource 5 may correspond to cell identifiers 504*4 to 504*5-1.

In addition, the UE may further acquire different random access configurations of the access cell according to different actual access resources. For a specific method, reference may be made to the method of acquiring, by UE, different random access configurations of an access cell according to different actual access resources in Embodiment 1 of the present application, and details are not described herein again in this embodiment of the present application.

In addition, the UE may further determine a second reference signal that is at the resource location of the actual access resource. For a specific method, reference may be made to the method of determining, by UE, a second reference signal that is at a resource location of an actual access resource in Embodiment 1 of the present application, and details are not described herein again in this embodiment of the present application.

In addition, after determining the resource location of the actual access resource of the detected actual sequence in the access cell, the UE further needs to determine an available resource in the actual access resource. If the resource location of the actual access resource is not a frequency domain center location of the access cell, the UE may process a subcarrier in a center of the actual access resource as a virtual direct current sub carrier when determining division of resource blocks in the actual access resource. For a specific implementation, reference may be made to the method of determining, by UE, an available resource in an actual access resource in Embodiment 1 of the present application, and details are not described herein again in this embodiment of the present application.

In this embodiment of the present application, an actual access resource is determined by using a broadcast channel, which can ensure that a synchronization signal is consistent with that in a previous system, complexity of additional synchronization signal designs is not introduced, a check function is implemented in receiving the broadcast channel, and reliability is better.

Embodiment 4 of the present application: UE determines a resource location of an actual access resource in an access cell according to a location relationship, carried in resource indication information in a broadcast channel, between the actual access resource and the access cell.

First, before detecting a synchronization signal, the UE may first determine at least one candidate sequence of the synchronization signal of the UE and multiple candidate access resources of the access cell. In this embodiment of the present application, whether a corresponding location relationship exists between a candidate access resource and a resource on which the access cell is located is not limited herein in this embodiment of the present application.

An access cell having a 20-MHz carrier bandwidth and including 100 resource blocks is used as an example. Assuming that there are five candidate access resources in the access cell and each candidate access resource occupies six resource blocks, location relationships of the five candidate access resources in the 20-MHz carrier may be preset, or may be determined by a base station randomly or according to a rule.

Then, the UE detects the synchronization signal according to the at least one candidate sequence.

The UE detects a synchronization signal according to a candidate sequence. When the UE detects a synchronization signal and an actual sequence of the synchronization signal is one of the at least one candidate sequence, it may be considered that the UE detects the synchronization signal of the access cell, and the detected candidate sequence is an actual sequence of the synchronization signal of the access cell. Moreover, multiple actual sequences may be sent in one access cell, and the multiple actual sequences are respectively sent on the multiple candidate access resources. In this way, the UE may detect the multiple actual sequences.

Next, the UE receives a broadcast channel of the access cell on a broadcast channel resource corresponding to an actual access resource on which the detected synchronization signal is located.

After the UE detects the synchronization signal, an access resource on which the synchronization signal is located is the actual access resource.

The UE receives a broadcast channel of the access cell on a broadcast channel resource corresponding to the actual access resource. The broadcast channel carries resource indication information, and the resource indication information is used for indicating a location relationship of the actual access resource in the multiple candidate access resources of the access cell.

The broadcast channel resource corresponding to the actual access resource may be understood as that a resource occupied by the broadcast channel is a subset of the actual access resource, or that a relatively fixed location relationship exists between a resource on which the broadcast channel is located and the actual access resource, or the like, and these correspondences are not limited.

The UE receives the broadcast channel, where the broadcast channel may be a physical broadcast channel or a physical broadcast channel enhanced in the future, which is not limited. The UE may acquire the resource indication information carried in the broadcast channel, where the resource indication information may be carried by a bit, a scrambling code, a time/frequency resource location, or the like in the broadcast channel, which is not limited herein.

The location relationship, indicated by the resource indication information, of the actual access resource in the multiple candidate access resources of the access cell may be a location relationship between the actual access resource and a center frequency point of the resource on which the cell is located, or a location relationship between the actual access resource and a high frequency location in the resource on which the cell is located, or a location relationship between the actual access resource and a low frequency location in the resource on which the cell is located. Generally, the location relationship refers to the location relationship between the actual access resource and the center frequency point of the resource on which the cell is located.

For example, the resource indication information being 1 MHz may indicate that the actual access resource is on a resource 1 MHz higher than the center frequency point of the access cell; and the resource indication information being −1 MHz may indicate that the actual access resource is on a resource 1 MHz lower than the center frequency point of the access cell. Certainly, "001" may also be used to indicate that the actual access resource is on the resource 1 MHz higher than the center frequency point of the access cell, and "002" may also be to indicate that the actual access resource is on the resource 1 MHz lower than the center frequency point of the access cell.

Finally, the UE determines the resource location of the actual access resource in the access cell according to the location relationship, indicated by the resource indication information, between the actual access resource and the resource on which the cell is located.

In addition, the resource indication information may further include bandwidth information of the access cell, and the UE may further determine a bandwidth of the access cell according to the bandwidth information of the access cell in the resource indication information.

In addition, the UE may further determine a cell identifier of the access cell according to the resource location of the actual access resource in the access cell and the sequence of the synchronization signal. For a specific implementation, reference may be made to the method of determining, by the UE, a cell identifier of the access cell according to the resource location of the actual access resource in the access cell and the sequence of the synchronization signal in Embodiment 3 of the present application, and details are not described herein again in this embodiment of the present application.

In addition, the UE may further acquire different random access configurations of the access cell according to different actual access resources. For a specific implementation, reference may be made to the method of acquiring, by UE, different random access configurations of an access cell according to different actual access resources in Embodiment 1 of the present application, and details are not described herein again in this embodiment of the present application.

In addition, the UE may further determine a second reference signal that is at the resource location of the actual access resource. For a specific method, reference may be made to the method of determining, by UE, a second reference signal that is at a resource location of an actual access resource in Embodiment 1 of the present application, and details are not described herein again in this embodiment of the present application.

In addition, after determining the resource location of the actual access resource of the detected actual sequence in the access cell, the UE further needs to determine an available resource in the actual access resource. If the resource location of the actual access resource is not a frequency domain center location of the access cell, the UE may process a subcarrier in a center of the actual access resource as a virtual direct current sub carrier when determining division of resource blocks in the actual access resource. For a specific implementation, reference may be made to the method of determining, by UE, an available resource in an actual access resource in Embodiment 1 of the present application, and details are not described herein again in this embodiment of the present application.

In this embodiment of the present application, an actual access resource is determined by using a broadcast channel, which can ensure that a synchronization signal is consistent with that in a previous system, complexity of additional synchronization signal designs is not introduced, a check function is implemented in receiving the broadcast channel, and reliability is better.

Figure 9:
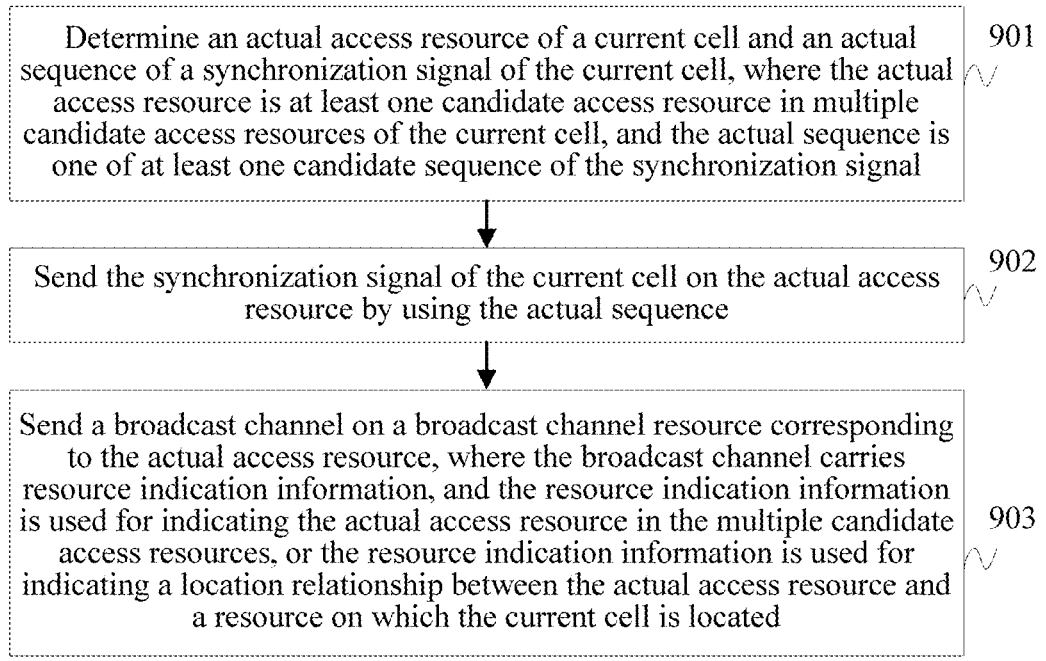
FIG. 9 is a flowchart of another cell access resource indication method according to an embodiment of the present application.

FIG. 9 is a flowchart of another cell access resource indication method according to an embodiment of the present application. The method in FIG. 9 is executed by a base station.

901: Determine an actual access resource of a current cell and an actual sequence of a synchronization signal of the current cell.

The actual access resource is at least one candidate access resource in multiple candidate access resources of the current cell, and the actual sequence is one of at least one candidate sequence of the synchronization signal.

902: Send the synchronization signal of the current cell on the actual access resource by using the actual sequence.

903: Send a broadcast channel on a broadcast channel resource corresponding to the actual access resource, where the broadcast channel carries resource indication information.

The resource indication information is used for indicating the actual access resource in the multiple candidate access resources, or the resource indication information is used for indicating a location relationship between the actual access resource and a resource on which the current cell is located, so that UE in the current cell can determine a resource location of the actual access resource in the current cell according to the actual access resource and the resource indication information.

In this embodiment of the present application, a resource indication information is sent on a broadcast channel of an actual access resource for sending a synchronization signal, so that a UE side can determine a resource location of the actual access resource in a current cell according to the resource indication information, which can, to some extent, avoid interference impact caused by intensive cells to access by the UE when the UE accesses the current cell, coordinate inter-cell interference of a common control channel, and improve performance of detection on the common control channel.

Optionally, the resource location of the actual access resource in the current cell and the actual sequence of the synchronization signal are further used for indicating a cell identifier of the current cell.

Optionally, after step 903, the method further includes: if the actual access resource includes a first actual access resource and a second actual access resource, respectively sending a first random access configuration and a second random access configuration on a broadcast channel resource or common channel resource corresponding to the first actual access resource and a broadcast channel resource or common channel resource corresponding to the second actual access resource, where the first random access configuration corresponds to the first actual access resource, and the second random access configuration corresponds to the second actual access resource.

Optionally, in an embodiment, after step 903, the method further includes: sending a second reference signal at the resource location of the actual access resource. The second reference signal is a reference signal segment clipped from a first reference signal and corresponding to the resource location, and the first reference signal is a reference signal generated by using a center frequency point of the current cell as a center and using a quantity of resource blocks included in a bandwidth of the current cell as a frequency domain width.

Optionally, in another embodiment, after step 903, the method further includes:

sending a second reference signal at the resource location of the actual access resource. The second reference signal is a reference signal segment clipped from a frequency domain center of a first reference signal and corresponding to a first frequency domain width, the first frequency domain width is a frequency domain width occupied by the actual access resource, a reference signal in a bandwidth of the current cell is a cyclic shift of the first reference signal, and the first reference signal is a reference signal generated by using a center frequency point of the current cell as a center and using a quantity of resource blocks included in the bandwidth of the current cell as a frequency domain width.

Optionally, after step 903, the method further includes: if the resource location of the actual access resource is not a frequency domain center location of the current cell, processing a subcarrier in a center of the actual access resource as a virtual direct current subcarrier when analyzing division of resource blocks in the actual access resource. Further, the broadcast channel resource corresponding to the actual access resource is a resource on a predefined side of a center frequency point of the actual access resource.

The following describes the method in this embodiment of the present application by using a specific embodiment.

Embodiment 5 of the present application: Resource indication information sent by a base station on a broadcast channel resource corresponding to an actual access resource can indicate the actual access resource in multiple candidate access resources of a current cell. The base station sends the resource indication information on the broadcast channel resource corresponding to the actual access resource, so that on the premise that UE can parse out a synchronization signal, the UE avoids interference impact caused by intensive cells to access by the UE.

First, the base station may first determine the actual access resource and an actual sequence of the synchronization signal.

There may be multiple candidate access resources in the current cell of the base station. A candidate access resource is an access resource that may be used when the synchronization signal is sent, a candidate sequence is a sequence that may be used when the synchronization signal is sent, and each candidate sequence in the multiple candidate sequences corresponds to one of the multiple candidate access resources.

FIG. 2 is a schematic diagram of a relationship between a cell carrier and a candidate access resource according to an embodiment of the present application. As shown in FIG. 2, when a cell carrier bandwidth is 20 MHz, the cell carrier bandwidth may include five candidate access resources: candidate access resources 1 to 5 in total; when a cell carrier bandwidth is 10 MHz, the cell carrier bandwidth may include three candidate access resources: candidate access resources 1 to 3 in total; when a cell carrier bandwidth is 1.4 MHz, the cell carrier bandwidth includes only a candidate access resource 1. Certainly, FIG. 2 shows only a possible relationship between a candidate access resource and a cell carrier, and there may be another possible relationship, for example, when a cell carrier bandwidth is 10 MHz, the cell carrier bandwidth may include nine candidate access resources.

Besides a first candidate access resource, the multiple candidate access resources of the base station may include a candidate access resource. The first candidate access resource is a resource having a frequency domain width of N resource blocks in a center of the current cell, and N is a preconfigured natural number, and may be specified in a protocol, or specified according to a policy of an operator. For example, in FIG. 2, a candidate access resource 1 is the first candidate access resource, and occupies 1.4 MHz, that is, a frequency domain width of six resource blocks. Besides the first candidate access resource, the multiple candidate access resources of the base station include at least one candidate access resource; in FIG. 2, besides the candidate access resource 1, the multiple candidate access resources of the base station further include the candidate access resource 2 to the candidate access resource 5. Location relationships of the candidate access resources in an entire carrier resource on which the current cell is located are preset.

In this embodiment of the present application, at least one candidate access resource of the current cell may be predefined, for example, defined according to a maximum carrier bandwidth, and a specific carrier bandwidth may be less than or equal to the maximum carrier bandwidth. For example, each candidate access resource may satisfy a condition that a center frequency point is on a 100-KHz grid, to facilitate cell search by the UE, that is, detection on the synchronization signal. For example, in FIG. 2, a maximum bandwidth is 20 MHz and has five candidate access resources: the candidate access resource 1 to the candidate access resource 5. If an actual bandwidth is 10 MHz, there are three actual candidate access resources.

In addition, when determining the actual access resource, the base station further needs to determine an available resource block in the actual access resource according to a location of the actual access resource. If the resource location of the actual access resource is not a frequency domain center location of the current cell, the base station may process a subcarrier in a center of the actual access resource as a virtual direct current subcarrier when determining division of resource blocks in the actual access resource. For a specific implementation, reference may be made to a specific method of processing, by a base station, a subcarrier in a center of an actual access resource as a virtual direct current subcarrier when determining division of resource blocks in the actual access resource in Embodiment 2 of the present application.

In addition, the candidate sequence in this embodiment of the present application may be a complete sequence, or a segmental sequence in a complete sequence.

In this embodiment of the present application, the candidate sequence may be a Zadoff-Chu sequence or an m sequence. Certainly, a possibility of another sequence is not excluded. Preferably, the candidate sequence in this embodiment of the present application may be a Zadoff-Chu sequence. An original sequence length of the candidate sequence may be less than a sequence length of a primary synchronization sequence in an LTE release 8. The sequence length of the primary synchronization sequence in the LTE release 8 is 63, and then a numerical value at a location of a subcarrier at a direct current location in a carrier center is punctured to use a final sequence whose sequence length is 62.

In an implementation manner of this embodiment of the present application, on the carrier of the present application, the primary synchronization sequence may be a sequence whose length is 61, which can distinguish an earlier-release LTE carrier and a subsequently evolved LTE carrier.

In another implementation manner of this embodiment of the present application, the original sequence length of the candidate sequence is equal to the sequence length of the primary synchronization sequence in the LTE release 8, but an actual length of the candidate sequence is determined after puncture of a primary synchronization signal, for example, two or three subcarriers are punctured.

In this case, a structure of primary synchronization signal is consistent with that in an LTE system in the release 8. To distinguish a carrier type, a candidate sequence space may be expanded, that is, a quantity of sequences is newly designed to distinguish the carrier type, or the carrier type may be distinguished in another manner, for example, through indication by using a broadcast channel. A function of carrier type distinguishing in the foregoing is that a new carrier can use multiple candidate access resources, while an original carrier type, that is, an earlier-release LTE system carrier, has only a resource in a carrier center.

In addition, the base station may further determine the actual access resource in the multiple candidate access resources and the sequence of the synchronization signal according to a cell identifier of the current cell. Specifically, assuming that a size of a value space of the cell identifier carried by the sequence is still 504, the value space of the cell identifier may be further expanded according to a resource location of a first access resource in the carrier.

Assuming that the carrier has five candidate access resources, the space can be expanded to 504*5, that is, information about a location of each candidate access resource in the multiple candidate access resources may provide a degree of freedom of expansion. For example, in the five candidate access resources shown in FIG. 2, the candidate access resource 1 may correspond to cell identifiers 0 to 503, the candidate access resource 2 may correspond to cell identifiers 504 to 1007, and by analog, the candidate access resource 5 may correspond to cell identifiers **504*4 to 504*5-1**.

Then, the base station may send the synchronization signal of the current cell on the actual access resource by using the actual sequence.

In this embodiment of the present application, after determining the actual access resource and the actual sequence, the base station may send a synchronization sequence on the actual access resource.

Finally, the base station may send a broadcast channel on a broadcast channel resource corresponding to the actual access resource. The broadcast channel carries resource indication information, and the resource indication information is used for indicating the actual access resource in the multiple candidate access resources. Specifically, the resource indication information may be identification information of a candidate access resource, or a sequence number of a candidate access resource, or the like. For example, the resource indication information may indicate a candidate access resource 2 by using "010", or indicate a candidate access resource 2 by using a sequence number "2".

In this way, after detecting the actual sequence of the current cell, a UE side may obtain the actual access resource, and then may determine a location of the actual access resource in the current cell according to the resource indication information received on the actual access resource.

In addition, after sending the synchronization signal on the actual access resource by using the actual sequence, the base station may further send different random configuration information according to different actual access resources. For a specific implementation, reference may be made to the method of sending, by a base station, different random configuration information according to different actual access resources in Embodiment 2 of the present application, and details are not described herein again in this embodiment of the present application.

In addition, after sending the synchronization signal on the actual access resource by using the actual sequence, the base station may further send a second reference signal at the resource location of the actual access resource. For a specific implementation, reference may be made to the method of sending, by a base station, a second reference signal at a resource location of an actual access resource in Embodiment 2 of the present application, and details are not described herein again in this embodiment of the present application.

Embodiment 6 of the present application: Resource indication information sent by a base station on a broadcast channel resource corresponding to an actual access resource can indicate a resource location relationship between the actual access resource and a current cell. The base station sends the resource indication information on the broadcast channel resource corresponding to the actual access resource, so that on the premise that UE can parse out a synchronization signal, the UE avoids interference impact caused by intensive cells to access by the UE.

First, the base station may first determine the actual access resource and an actual sequence of the synchronization signal.

There may be multiple candidate access resources in the current cell of the base station. A candidate access resource is an access resource that may be used when the synchronization signal is sent, a candidate sequence is a sequence that may be used when the synchronization signal is sent, and each candidate sequence in the multiple candidate sequences corresponds to one of the multiple candidate access resources.

FIG. 2 is a schematic diagram of a relationship between a cell carrier and a candidate access resource according to an embodiment of the present application. As shown in FIG. 2, when a cell carrier bandwidth is 20 MHz, the cell carrier bandwidth may include five candidate access resources:

candidate access resources 1 to 5 in total; when a cell carrier bandwidth is 10 MHz, the cell carrier bandwidth may include three candidate access resources: candidate access resources 1 to 3 in total; when a cell carrier bandwidth is 1.4 MHz, the cell carrier bandwidth includes only a candidate access resource 1. Certainly, FIG. 2 shows only a possible relationship between a candidate access resource and a cell carrier, and there may be another possible relationship, for example, when a cell carrier bandwidth is 10 MHz, the cell carrier bandwidth may include nine candidate access resources.

Besides a first candidate access resource, the multiple candidate access resources of the base station may include a candidate access resource. The first candidate access resource is a resource having a frequency domain width of N resource blocks in a center of the current cell, and N is a preconfigured natural number, and may be specified in a protocol, or specified according to a policy of an operator. For example, in FIG. 2, a candidate access resource 1 is the first candidate access resource, and occupies 1.4 MHz, that is, a frequency domain width of six resource blocks. Besides the first candidate access resource, the multiple candidate access resources of the base station include at least one candidate access resource; in FIG. 2, besides the candidate access resource 1, the multiple candidate access resources of the base station further include the candidate access resource 2 to the candidate access resource 5. Location relationships of the candidate access resources in an entire carrier resource on which the current cell is located are preset.

In this embodiment of the present application, at least one candidate access resource of the current cell may be predefined, for example, defined according to a maximum carrier bandwidth, and a specific carrier bandwidth may be less than or equal to the maximum carrier bandwidth. For example, each candidate access resource may satisfy a condition that a center frequency point is on a 100-KHz grid, to facilitate cell search by the UE, that is, detection on the synchronization signal. For example, in FIG. 2, a maximum bandwidth is 20 MHz and has five candidate access resources: the candidate access resource 1 to the candidate access resource 5. If an actual bandwidth is 10 MHz, there are three actual candidate access resources.

In addition, when determining the actual access resource, the base station further needs to determine an available resource block in the actual access resource according to a location of the actual access resource. If the resource location of the actual access resource is not a frequency domain center location of the current cell, the base station may process a subcarrier in a center of the actual access resource as a virtual direct current subcarrier when determining division of resource blocks in the actual access resource. For a specific implementation, reference may be made to a specific method of processing, by a base station, a subcarrier in a center of an actual access resource as a virtual direct current subcarrier when determining division of resource blocks in the actual access resource in Embodiment 2 of the present application.

In addition, the candidate sequence in this embodiment of the present application may be a complete sequence, or a segmental sequence in a complete sequence.

In this embodiment of the present application, the candidate sequence may be a Zadoff-Chu sequence or an m sequence. Certainly, a possibility of another sequence is not excluded. Preferably, the candidate sequence in this embodiment of the present application may be a Zadoff-Chu sequence. An original sequence length of the candidate sequence may be less than a sequence length of a primary synchronization sequence in an LTE release 8. The sequence length of the primary synchronization sequence in the LTE release 8 is 63, and then a numerical value at a location of a subcarrier at a direct current location in a carrier center is punctured to use a final sequence whose sequence length is 62.

In an implementation manner of this embodiment of the present application, on the carrier of the present application, the primary synchronization sequence may be a sequence whose length is 61, which can distinguish an earlier-release LTE carrier and a subsequently evolved LTE carrier.

In another implementation manner of this embodiment of the present application, the original sequence length of the candidate sequence is equal to the sequence length of the primary synchronization sequence in the LTE release 8, but an actual length of the candidate sequence is determined after puncture of a primary synchronization signal, for example, two or three subcarriers are punctured.

In this case, a structure of primary synchronization signal is consistent with that in an LTE system in the release 8. To distinguish a carrier type, a candidate sequence space may be expanded, that is, a quantity of sequences is newly designed to distinguish the carrier type, or the carrier type may be distinguished in another manner, for example, through indication by using a broadcast channel. A function of carrier type distinguishing in the foregoing is that a new carrier can use multiple candidate access resources, while an original carrier type, that is, an earlier-release LTE system carrier, has only a resource in a carrier center.

In addition, the base station may further determine the location relationship between the actual access resource and the current cell and the sequence of the synchronization signal of the current cell according to a cell identifier of the current cell. Specifically, assuming that a size of a value space of the cell identifier carried by the sequence is still 504, the value space of the cell identifier may be further expanded according to a resource location of a first access resource in the carrier. Assuming that the carrier has five candidate access resources, respectively corresponding to five location relationships of the current cell, the space can be expanded to 504*5, that is, information about a location of each candidate access resource in the multiple candidate access resources may provide a degree of freedom of expansion. For example, in the five candidate access resources shown in FIG. 2, a location relationship between the candidate access resource 1 and the current cell may correspond to cell identifiers 0 to 503, a location relationship between the candidate access resource 2 and the current cell may correspond to cell identifiers 504 to 1007, and so on, and a location relationship between the candidate access resource 5 and the current cell may correspond to cell identifiers **504*4 to 504*5-1**.

Then, the base station may send the synchronization signal of the current cell on the actual access resource by using the actual sequence.

In this embodiment of the present application, after determining the actual access resource and the actual sequence, the base station may send a synchronization sequence on the actual access resource.

Finally, the base station may send a broadcast channel on a broadcast channel resource corresponding to the actual access resource. The broadcast channel carries resource indication information, and the resource indication information is used for indicating the location relationship between the actual access resource and the current cell. Specifically, the resource indication information may be a specific location relationship, or an identifier corresponding to a location relationship, or the like. For example, the resource indication information may be "001" and indicates a resource location 10 MHz higher than a center frequency point of the current cell, or be "10" and indicates a resource location 10 MHz higher than a center frequency point of the current cell.

In this way, after detecting the actual sequence of the current cell, a UE side may obtain the actual access resource, and then may determine a location of the actual access resource in the current cell according to the resource indication information received on the actual access resource.

In addition, after sending the synchronization signal on the actual access resource by using the actual sequence, the base station may further send different random configuration information according to different actual access resources. For a specific implementation, reference may be made to the method of sending, by a base station, different random configuration information according to different actual access resources in Embodiment 2 of the present application, and details are not described herein again in this embodiment of the present application.

In addition, after sending the synchronization signal on the actual access resource by using the actual sequence, the base station may further send a second reference signal at the resource location of the actual access resource. For a specific implementation, reference may be made to the method of sending, by a base station, a second reference signal at a resource location of an actual access resource in Embodiment 2 of the present application, and details are not described herein again in this embodiment of the present application.

Figure 10:
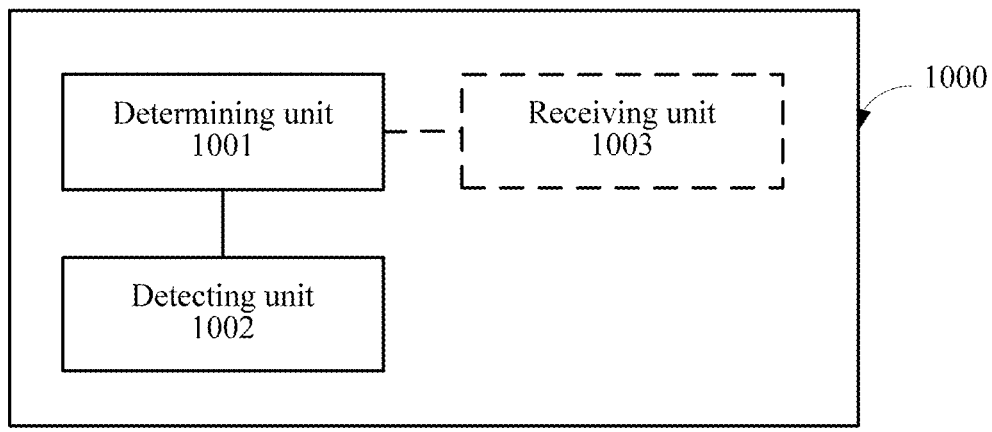
FIG. 10 is a schematic block diagram of user equipment according to an embodiment of the present application.

FIG. 10 is a schematic block diagram of user equipment 1000 according to an embodiment of the present application. The user equipment 1000 may include a determining unit 1001 and a detecting unit 1002, where the determining unit 1001 may be configured to determine at least one candidate sequence of a synchronization signal of an access cell of the user equipment and multiple candidate access resources of the access cell, where a corresponding location relationship exists between each candidate access resource in the multiple candidate access resources and a resource on which the access cell is located, and any candidate sequence in the at least one candidate sequence corresponds to one of the multiple candidate access resources; and the detecting unit 1002 may be configured to detect the synchronization signal according to the at least one candidate sequence, where the determining unit 1001 may be further configured to determine a resource location of an actual access resource corresponding to a detected actual sequence in the access cell according to the location relationship between each candidate access resource in the multiple candidate access resources and the resource on which the access cell is located and a correspondence between the any candidate sequence in the at least one candidate sequence and the multiple candidate access resources, where the actual sequence is one of the at least one candidate sequence, and the actual access resource is one of the multiple candidate access resources.

In this embodiment of the present application, the user equipment 1000 determines a resource location of an actual access resource in a resource on which an access cell is located by using a location relationship between a candidate access resource and the resource on which the access cell is located and a detected actual sequence of a synchronization signal, which can, to some extent, avoid interference impact caused by intensive cells to access by the UE, coordinate inter-cell interference of a common control channel, and improve performance of detection on the common control channel.

In addition, the actual access resource is determined by detecting the sequence of the synchronization signal. Because detection on the synchronization signal is the first step for the UE to discover a carrier, the UE can determine an access resource earliest, and detect another signal, such as a reference signal for measurement, on the resource, rather than determine the access resource by further reading another message such as a broadcast channel, which simplifies steps of system discovery and access, makes it unnecessary to read a broadcast message during measurement, and improves time efficiency and power efficiency.

Optionally, when configured to determine the resource location of the actual access resource corresponding to the detected actual sequence in the access cell according to the location relationship between each candidate access resource in the multiple candidate access resources and the resource on which the access cell is located and a correspondence between the any candidate sequence in the at least one candidate sequence and the multiple candidate access resources, the determining unit is specifically configured to: determine the actual access resource corresponding to the actual sequence from the multiple candidate access resources; and determine the resource location of the actual access resource in the access cell according to the location relationship between the multiple candidate access resources and the resource on which the access cell is located.

Optionally, the candidate sequence may be a complete sequence; or the candidate sequence may be a segmental sequence in a complete sequence.

Optionally, besides a first candidate access resource, at least one candidate access resource exists in the multiple candidate access resources. The first candidate access resource is a resource having a frequency domain width of N resource blocks in a center of the access cell, and N is a preconfigured natural number, for example, N is equal to 6. In addition, N may be specified in a protocol, or specified according to a policy of an operator.

Optionally, the determining unit 1001 is further configured to determine a location of a center frequency point of the access cell according to the resource location of the actual access resource in the access cell.

The user equipment 1000 may further include a receiving unit 1003.

Optionally, the receiving unit 1003 may be configured to receive a broadcast channel of the access cell, and the determining unit 1001 is further configured to determine a bandwidth of the access cell according to bandwidth indication information. The broadcast channel carries the bandwidth indication information of the access cell.

Optionally, the receiving unit 1003 may be configured to: if the actual access resource includes a first actual access resource and a second actual access resource, acquire a first random access configuration and a second random access configuration on the first actual access resource and the second actual access resource, respectively, where the first random access configuration corresponds to the first actual access resource, and the second random access configuration corresponds to the second actual access resource.

Optionally, the determining unit 1001 is further configured to determine a second reference signal that is at the resource location of the actual access resource. The second reference signal is a reference signal segment clipped from a first reference signal and corresponding to the resource location, and the first reference signal is a reference signal generated by using the center frequency point of the access cell as a center and using a quantity of resource blocks included in the bandwidth of the access cell as a frequency domain width; or the second reference signal is a reference signal segment clipped from a frequency domain center of a first reference signal and corresponding to a first frequency domain width, the first frequency domain width is a frequency domain width occupied by the actual access resource, a reference signal in the bandwidth of the access cell is a cyclic shift of the first reference signal, and the first reference signal is a reference signal generated by using the center frequency point of the access cell as a center and using a quantity of resource blocks included in the bandwidth of the access cell as a frequency domain width.

Optionally, the determining unit 1001 is further configured to: if the resource location of the actual access resource is not a frequency domain center location of the access cell, process a subcarrier in a center of the actual access resource as a virtual direct current subcarrier when determining division of resource blocks in the actual access resource.

Figure 11:
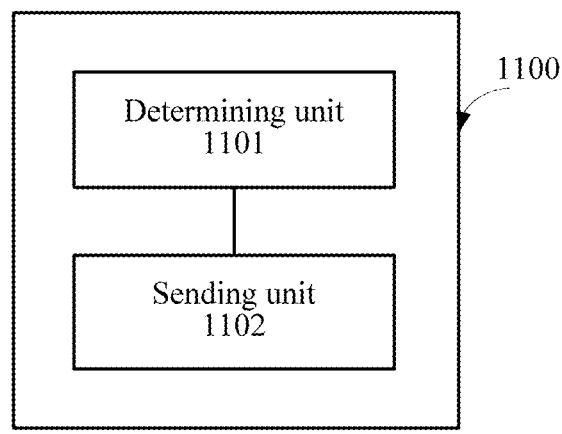
FIG. 11 is a schematic block diagram of a base station according to an embodiment of the present application.

FIG. 11 is a schematic block diagram of a base station 1100 according to an embodiment of the present application. The base station 1100 may include a determining unit 1101 and a sending unit 1102, where the determining unit 1101 is configured to determine an actual access resource of a current cell of the base station and an actual sequence of a synchronization signal of the current cell, where the actual access resource is at least one candidate access resource in multiple candidate access resources used by the current cell to send the synchronization signal, the actual sequence is one of at least one candidate sequence of the synchronization signal, and any candidate sequence in the at least one candidate sequence corresponds to one of the multiple candidate access resources; and the sending unit 1102 is configured to send the synchronization signal on the actual access resource by using the actual sequence.

In this embodiment of the present application, the base station 1100 sends a synchronization signal on an actual access resource according to a correspondence between a sequence for sending the synchronization signal and a candidate access resource of the synchronization signal by using an actual sequence, so that UE can determine a resource location of the actual access resource in a current cell according to the actual sequence, the actual access resource, and a relative location relationship between a candidate access resource indicated by the actual sequence and the current cell, which can, to some extent, avoid interference impact caused by intensive cells to access by the UE when the UE accesses the current cell, coordinate inter-cell interference of a common control channel, and improve performance of detection on the common control channel.

Optionally, the one of the at least one candidate sequence is a complete sequence; or the one of the at least one candidate sequence is a segmental sequence in a complete sequence.

Optionally, besides a first candidate access resource, at least one candidate access resource exists in the multiple candidate access resources. The first candidate access resource is a resource having a frequency domain width of N resource blocks in a center of the current cell, and N is a preconfigured natural number. In addition, N may be specified in a protocol, or specified according to a policy of an operator.

Optionally, the sending unit 1102 is further configured to send a broadcast channel in the current cell. The broadcast channel carries bandwidth indication information of the current cell, and the bandwidth indication information of the current cell is used for indicating a bandwidth of the current cell.

Optionally, the sending unit 1102 is further configured to: if the actual access resource includes a first actual access resource and a second actual access resource, send a first random access configuration of the current cell on a broadcast channel resource or common channel resource corresponding to the first actual access resource, and send a second random access configuration of the current cell on a broadcast channel resource or common channel resource corresponding to the second actual access resource.

The sending unit 1102 is further configured to send a second reference signal at the resource location of the actual access resource. The second reference signal is a reference signal segment clipped from a first reference signal and corresponding to the resource location, and the first reference signal is a reference signal generated by using a center frequency point of the current cell as a center and using a quantity of resource blocks included in the bandwidth of the current cell as a frequency domain width; or the second reference signal is a reference signal segment clipped from a frequency domain center of a first reference signal and corresponding to a first frequency domain width, the first frequency domain width is a frequency domain width occupied by the actual access resource, a reference signal in the bandwidth of the current cell is a cyclic shift of the first reference signal, and the first reference signal is a reference signal generated by using a center frequency point of the current cell as a center and using a quantity of resource blocks included in the bandwidth of the current cell as a frequency domain width.

Optionally, when configured to determine the actual access resource of the current cell, the determining unit 1101 is specifically configured to: if the resource location of the actual access resource is not a frequency domain center location of the current cell, process a subcarrier in a center of the actual access resource as a virtual direct current subcarrier when determining division of resource blocks in the actual access resource.

Figure 12:
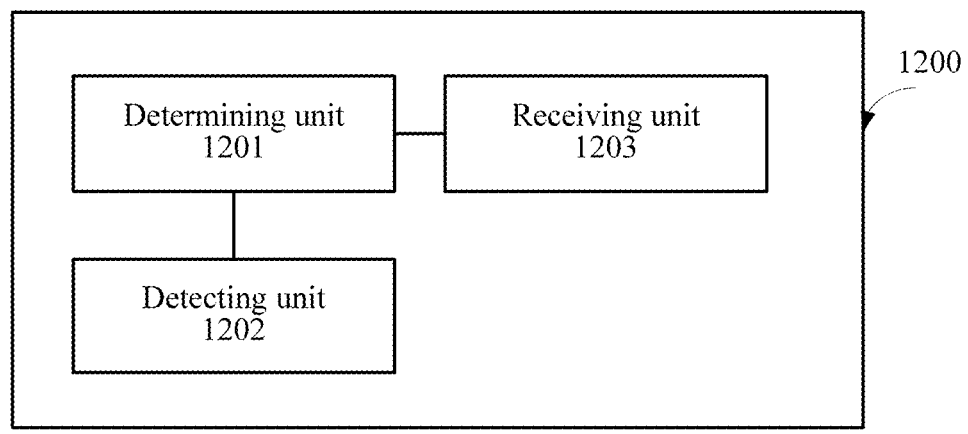
FIG. 12 is a schematic block diagram of another user equipment according to an embodiment of the present application.

FIG. 12 is a schematic block diagram of user equipment 1200 according to an embodiment of the present application. The user equipment 1200 may include a determining unit 1201, a detecting unit 1202, and a receiving unit 1203, where the determining unit 1201 is configured to determine at least one candidate sequence of a synchronization signal of an access cell and multiple candidate access resources of the access cell;

the detecting unit 1202 is configured to detect the synchronization signal according to the at least one candidate sequence;

the receiving unit 1203 is configured to receive a broadcast channel of the access cell on a broadcast channel resource corresponding to an actual access resource on which the detected synchronization signal is located, where the actual access resource is one of the multiple candidate access resources, the broadcast channel carries resource indication information, and the resource indication information is used for indicating the actual access resource in the multiple candidate access resources, or the resource indication information is used for indicating a location relationship between the actual access resource and a resource on which the access cell is located; and the determining unit 1201 is further configured to determine a resource location of the actual access resource in the access cell according to the resource indication information.

In this embodiment of the present application, the user equipment 1200 determines a resource location of an actual access resource in an access cell by using the actual access resource of a detected synchronization signal and resource indication information received on a broadcast channel, which can, to some extent, avoid interference impact caused by intensive cells to access by the UE, coordinate inter-cell interference of a common control channel, and improve performance of detection on the common control channel.

Optionally, in an embodiment, when the resource indication information is used for indicating the actual access resource in the multiple candidate access resources, a corresponding location relationship exists between each candidate access resource in the multiple candidate access resources and the resource on which the access cell is located, and the determining unit 1201 is specifically configured to: determine the actual access resource in the multiple candidate access resources according to the resource indication information; and determine the resource location of the actual access resource in the access cell according to the corresponding location relationship existing between each candidate access resource in the multiple candidate access resources and the resource on which the access cell is located.

Optionally, in another embodiment, when the resource indication information is used for indicating the location relationship between the actual access resource and the resource on which the access cell is located, when configured to determine the resource location of the actual access resource in the access cell according to the resource indication information, the determining unit 1201 is specifically configured to: determine the resource location of the actual access resource in the access cell according to the location relationship, indicated by the resource indication information, between the actual access resource and the resource on which the access cell is located.

Optionally, the determining unit 1201 is further configured to determine a cell identifier of the access cell according to the resource location of the actual access resource in the access cell and an actual sequence of the detected synchronization signal.

Optionally, the receiving unit 1203 is further configured to: if the actual access resource includes a first actual access resource and a second actual access resource, respectively acquire a first random access configuration and a second random access configuration on the first actual access resource and the second actual access resource. The first random access configuration corresponds to the first actual access resource, and the second random access configuration corresponds to the second actual access resource.

Optionally, the determining unit 1201 is further configured to determine a second reference signal that is at the resource location of the actual access resource. The second reference signal is a reference signal segment clipped from a first reference signal and corresponding to the resource location, and the first reference signal is a reference signal generated by using a center frequency point of the access cell as a center and using a quantity of resource blocks included in a bandwidth of the access cell as a frequency domain width; or the second reference signal is a reference signal segment clipped from a frequency domain center of a first reference signal and corresponding to a first frequency domain width, the first frequency domain width is a frequency domain width occupied by the actual access resource, a reference signal in a bandwidth of the access cell is a cyclic shift of the first reference signal, and the first reference signal is a reference signal generated by using a center frequency point of the access cell as a center and using a quantity of resource blocks included in the bandwidth of the access cell as a frequency domain width.

Optionally, the determining unit 1201 is further configured to: if the resource location of the actual access resource is not a frequency domain center location of the access cell, process a subcarrier in a center of the actual access resource as a virtual direct current subcarrier when determining division of resource blocks in the actual access resource.

Optionally, the broadcast channel resource corresponding to the actual access resource is a resource on a predefined side of a center frequency point of the actual access resource.

Figure 13:
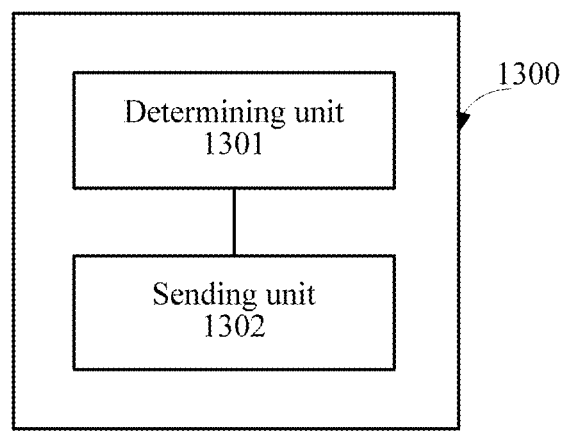
FIG. 13 is a schematic block diagram of another base station according to an embodiment of the present application.

FIG. 13 is a schematic block diagram of a base station 1300 according to an embodiment of the present application. The base station 1300 may include a determining unit 1301 and a sending unit 1302, where the determining unit 1301 is configured to determine an actual access resource of a current cell of the base station and an actual sequence of a synchronization signal of the current cell, where the actual access resource is at least one candidate access resource in multiple candidate access resources of the current cell, and the actual sequence is one of at least one candidate sequence of the synchronization signal;

the sending unit 1302 is configured to send the synchronization signal of the current cell on the actual access resource by using the actual sequence; and the sending unit 1302 is further configured to send a broadcast channel on a broadcast channel resource corresponding to the actual access resource, where the broadcast channel carries resource indication information, and the resource indication information is used for indicating the actual access resource in the multiple candidate access resources, or the resource indication information is used for indicating a location relationship between the actual access resource and a resource on which the current cell is located.

In this embodiment of the present application, the base station 1300 sends a resource indication information on a broadcast channel of an actual access resource for sending a synchronization signal, so that a UE side can determine a resource location of the actual access resource in a current cell according to the resource indication information, which can, to some extent, avoid interference impact caused by intensive cells to access by UE when the UE accesses the current cell, coordinate inter-cell interference of a common control channel, and improve performance of detection on the common control channel.

Optionally, the resource location of the actual access resource in the current cell and the actual sequence of the synchronization signal are further used for indicating a cell identifier of the current cell.

Optionally, the sending unit 1302 is further configured to: if the actual access resource includes a first actual access resource and a second actual access resource, respectively send a first random access configuration and a second random access configuration on a broadcast channel resource or common channel resource corresponding to the first actual access resource and a broadcast channel resource or common channel resource corresponding to the second actual access resource, where the first random access configuration corresponds to the first actual access resource, and the second random access configuration corresponds to the second actual access resource.

Optionally, the sending unit 1302 is further configured to send a second reference signal at the resource location of the actual access resource. The second reference signal is a reference signal segment clipped from a first reference signal and corresponding to the resource location, and the first reference signal is a reference signal generated by using a center frequency point of the current cell as a center and using a quantity of resource blocks included in a bandwidth of the current cell as a frequency domain width; or the second reference signal is a reference signal segment clipped from a frequency domain center of a first reference signal and corresponding to a first frequency domain width, the first frequency domain width is a frequency domain width occupied by the actual access resource, a reference signal in a bandwidth of the current cell is a cyclic shift of the first reference signal, and the first reference signal is a reference signal generated by using a center frequency point of the current cell as a center and using a quantity of resource blocks included in the bandwidth of the current cell as a frequency domain width.

Optionally, the determining unit 1301 is specifically configured to: if the resource location of the actual access resource is not a frequency domain center location of the current cell, process a subcarrier in a center of the actual access resource as a virtual direct current subcarrier when determining division of resource blocks in the actual access resource.

Optionally, the broadcast channel resource corresponding to the actual access resource is a resource on a predefined side of a center frequency point of the actual access resource.

Figure 14:
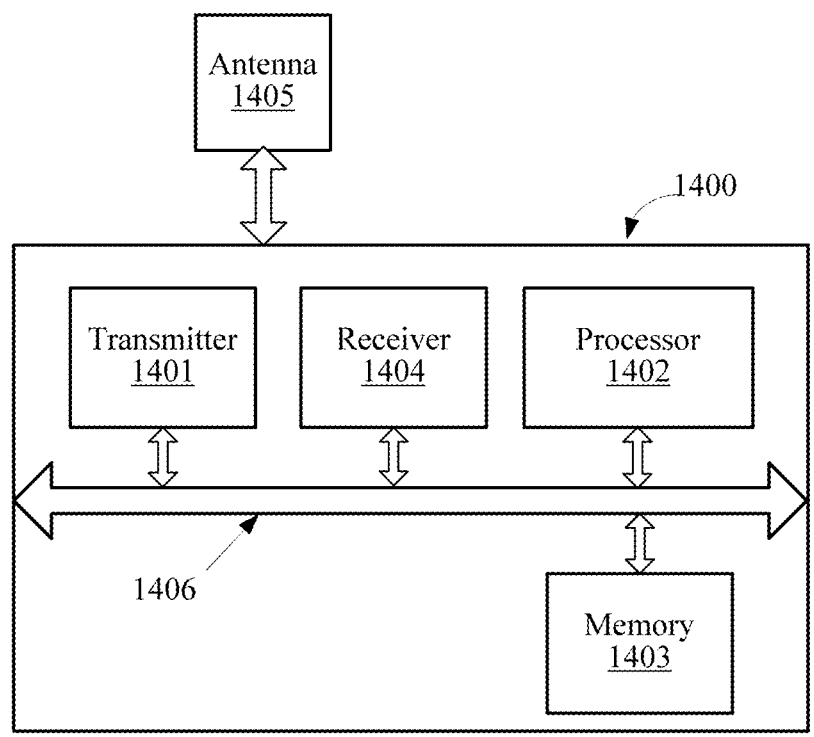
FIG. 14 is a simplified structural diagram of still another user equipment according to an embodiment of the present application.

FIG. 14 is a simplified structural diagram of user equipment 1400 according to an embodiment of the present application. The user equipment 1400 may include: a processor 1402, a memory 1403, a transmitter 1401, and a receiver 1404.

The receiver 1404, the transmitter 1401, the processor 1402, and the memory 1403 are connected to each other by using a bus 1406 system. The bus 1406 may be a industry standard architecture (ISA) bus, a peripheral component interconnect (PCI) bus, an extended industry standard architecture (EISA) bus, or the like. The bus may be classified into an address bus, a data bus, a control bus, and the like. For ease of illustration, in FIG. 14, the bus is represented by using only one double-sided arrow, which, however, does not indicate that there is only one bus or only one type of bus. In specific application, the transmitter 1401 and the receiver 1404 may be coupled to an antenna 1405.

The memory 1403 is configured to store a program. Specifically, the program may include program code, where the program code includes a computer operation instruction. The memory 1403 may include a read-only memory and a random access memory, and provides an instruction and data to the processor 1402. The memory 1403 may include a high-speed random access memory (RAM) memory, and may further include a non-volatile memory, for example, at least one magnetic disk memory.

The processor 1402 executes the program stored in the memory 1403, to determine at least one candidate sequence of a synchronization signal of an access cell of the user equipment and multiple candidate access resources of the access cell, where a corresponding location relationship exists between each candidate access resource in the multiple candidate access resources and a resource on which the access cell is located, and any candidate sequence in the at least one candidate sequence corresponds to one of the multiple candidate access resources. The processor 1402 is further configured to detect the synchronization signal according to the at least one candidate sequence, and determine a resource location of an actual access resource corresponding to a detected actual sequence in the access cell according to the location relationship between each candidate access resource in the multiple candidate access resources and the resource on which the access cell is located and a correspondence between the any candidate sequence in the at least one candidate sequence and the multiple candidate access resources. The actual sequence is one of the at least one candidate sequence, and the actual access resource is one of the multiple candidate access resources.

Any one of the foregoing embodiments like that in FIG. 1 of the present application and the method disclosed in Embodiment 1 of the present application and executed by a coordination device may be applied to the processor 1402, or implemented by the processor 1402. The processor 1402 may be an integrated circuit chip and has a signal processing capability. In an implementation process, steps of the foregoing method may be completed by using an integrated logical circuit of hardware in the processor 1402 or an instruction in a form of software. The processor 1402 may be a general-purpose processor, including a central processing unit (CPU), a network processor (NP), and the like; and may also be a digital signal processor (DSP), an application-specific integrated circuit (ASIC), a field programmable gate array (FPGA) or another programmable logical device, discrete gate or transistor logic device, or discrete hardware assembly. The processor may implement or execute methods, steps, and logical block diagrams disclosed in the embodiments of the present application. The general-purpose processor may be a microprocessor or the processor may be any regular processor, or the like. Steps of the methods disclosed with reference to the embodiments of the present application may be directly executed and completed by means of a hardware decoding processor, or may be executed and completed by using a combination of hardware and software modules in a decoding processor. The software modules may be located in a mature storage medium in the art, such as a random access memory, a flash memory, a read-only memory, a programmable read-only memory, an electronically erasable programmable memory, or a register. The storage medium is located in the memory 1403, and the processor 1402 reads information in the memory 1403, and completes the steps of the methods in combination with hardware of the processor 1402.

In this embodiment of the present application, the user equipment 1400 determines a resource location of an actual access resource in a resource on which an access cell is located by using a location relationship between a candidate access resource and the resource on which the access cell is located and a detected actual sequence of a synchronization signal, which can, to some extent, avoid interference impact caused by intensive cells to access by the UE, coordinate inter-cell interference of a common control channel, and improve performance of detection on the common control channel.

In addition, the actual access resource is determined by detecting the sequence of the synchronization signal. Because detection on the synchronization signal is the first step for the UE to discover a carrier, the UE can determine an access resource earliest, and detect another signal, such as a reference signal for measurement, on the resource, rather than determine the access resource by further reading another message such as a broadcast channel, which simplifies steps of system discovery and access, makes it unnecessary to read a broadcast message during measurement, and improves time efficiency and power efficiency.

Optionally, when configured to determine the resource location of the actual access resource corresponding to the detected actual sequence in the access cell according to the location relationship between each candidate access resource in the multiple candidate access resources and the resource on which the access cell is located and a correspondence between the any candidate sequence in the at least one candidate sequence and the multiple candidate access resources, the processor 1402 is specifically configured to: determine the actual access resource corresponding to the actual sequence from the multiple candidate access resources; and determine the resource location of the actual access resource in the access cell according to the location relationship between the multiple candidate access resources and the resource on which the access cell is located.

Optionally, the candidate sequence may be a complete sequence; or the candidate sequence may be a segmental sequence in a complete sequence.

Optionally, besides a first candidate access resource, at least one candidate access resource exists in the multiple candidate access resources. The first candidate access resource is a resource having a frequency domain width of N resource blocks in a center of the access cell, and N is a preconfigured natural number, for example, N is equal to 6. In addition, N may be specified in a protocol, or specified according to a policy of an operator.

Optionally, the processor 1402 is further configured to determine a location of a center frequency point of the access cell according to the resource location of the actual access resource in the access cell.

Optionally, the receiver 1404 may be configured to receive a broadcast channel of the access cell, and the processor 1402 is further configured to determine a bandwidth of the access cell according to bandwidth indication information. The broadcast channel carries the bandwidth indication information of the access cell.

Optionally, the receiver 1404 may be configured to: if the actual access resource includes a first actual access resource and a second actual access resource, respectively acquire a first random access configuration and a second random access configuration on the first actual access resource and the second actual access resource. The first random access configuration corresponds to the first actual access resource, and the second random access configuration corresponds to the second actual access resource.

Optionally, the processor 1402 is further configured to determine a second reference signal that is at the resource location of the actual access resource. The second reference signal is a reference signal segment clipped from a first reference signal and corresponding to the resource location, and the first reference signal is a reference signal generated by using the center frequency point of the access cell as a center and using a quantity of resource blocks included in the bandwidth of the access cell as a frequency domain width; or the second reference signal is a reference signal segment clipped from a frequency domain center of a first reference signal and corresponding to a first frequency domain width, the first frequency domain width is a frequency domain width occupied by the actual access resource, a reference signal in the bandwidth of the access cell is a cyclic shift of the first reference signal, and the first reference signal is a reference signal generated by using the center frequency point of the access cell as a center and using a quantity of resource blocks included in the bandwidth of the access cell as a frequency domain width.

Optionally, the processor 1402 is further configured to: if the resource location of the actual access resource is not a frequency domain center location of the access cell, process a subcarrier in a center of the actual access resource as a virtual direct current subcarrier when determining division of resource blocks in the actual access resource.

Figure 15:
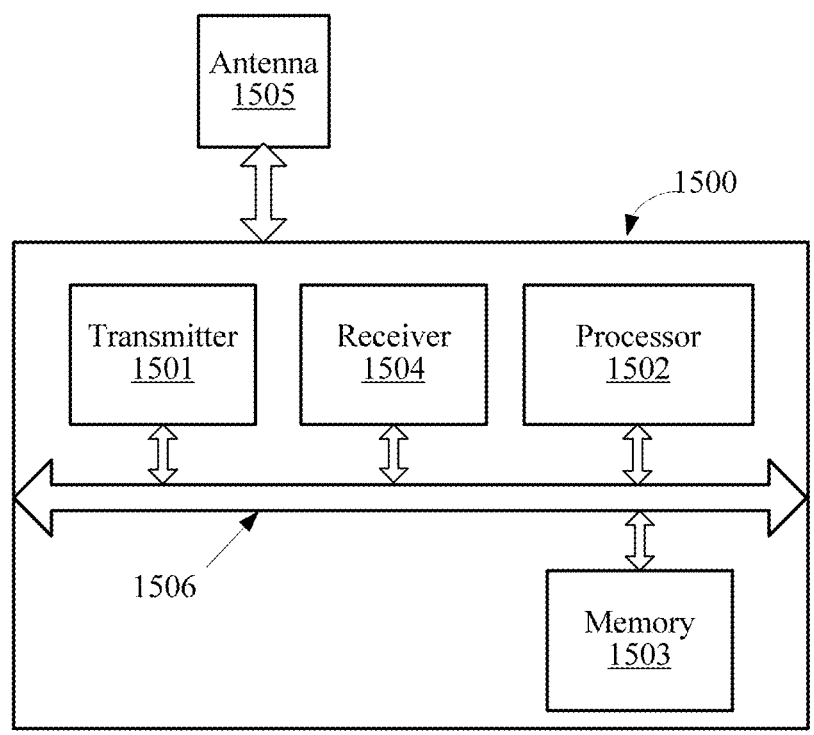
FIG. 15 is a simplified structural diagram of still another base station according to an embodiment of the present application.

FIG. 15 is a simplified structural diagram of a base station 1500 according to an embodiment of the present application. The base station 1500 may include: a processor 1502, a memory 1503, a transmitter 1501, and a receiver 1504.

The receiver 1504, the transmitter 1501, the processor 1502, and the memory 1503 are connected to each other by using a bus 1506 system. The bus 1506 may be an ISA bus, a PCI bus, an EISA bus, or the like. The bus may be classified into an address bus, a data bus, a control bus, and the like. For ease of illustration, in FIG. 15, the bus is represented by using only one double-sided arrow, which, however, does not indicate that there is only one bus or only one type of bus. In specific application, the transmitter 1501 and the receiver 1504 may be coupled to an antenna 1505.

The memory 1503 is configured to store a program. Specifically, the program may include program code, where the program code includes a computer operation instruction. The memory 1503 may include a read-only memory and a random access memory, and provides an instruction and data to the processor 1502. The memory 1503 may include a high-speed RAM memory, and may further include a non-volatile memory (non-volatile memory), for example, at least one magnetic disk memory.

The processor 1502 executes the program stored in the memory 1503, to determine an actual access resource of a current cell of the base station 1500 and an actual sequence of a synchronization signal of the current cell, and send, by using the transmitter 1501, the synchronization signal on the actual access resource by using the actual sequence. The actual access resource is at least one candidate access resource in multiple candidate access resources used by the current cell to send the synchronization signal, the actual sequence is one of at least one candidate sequence of the synchronization signal, and any candidate sequence in the at least one candidate sequence corresponds to one of the multiple candidate access resources.

Any one of the foregoing embodiments like that in FIG. 7 of the present application and the method disclosed in Embodiment 2 of the present application and executed by a coordination device may be applied to the processor 1502, or implemented by the processor 1502. The processor 1502 may be an integrated circuit chip and has a signal processing capability. In an implementation process, steps of the foregoing method may be completed by using an integrated logical circuit of hardware in the processor 1502 or an instruction in a form of software. The processor 1502 may be a general-purpose processor, including a central processing unit (CPU), a network processor (NP), and the like; and may also be a digital signal processor (DSP), an application-specific integrated circuit (ASIC), a field programmable gate array (FPGA) or another programmable logical device, discrete gate or transistor logic device, or discrete hardware assembly. The processor may implement or execute methods, steps, and logical block diagrams disclosed in the embodiments of the present application. The general-purpose processor may be a microprocessor or the processor may be any regular processor, or the like. Steps of the methods disclosed with reference to the embodiments of the present application may be directly executed and completed by means of a hardware decoding processor, or may be executed and completed by using a combination of hardware and software modules in a decoding processor. The software modules may be located in a mature storage medium in the art, such as a random access memory, a flash memory, a read-only memory, a programmable read-only memory, an electronically erasable programmable memory, or a register. The storage medium is located in the memory 1503, and the processor 1502 reads information in the memory 1503, and completes the steps of the methods in combination with hardware of the processor 1502.

In this embodiment of the present application, the base station 1500 sends a synchronization signal on an actual access resource according to a correspondence between a sequence for sending the synchronization signal and a candidate access resource of the synchronization signal by using an actual sequence, so that UE can determine a resource location of the actual access resource in a current cell according to the actual sequence, the actual access resource, and a relative location relationship between a candidate access resource indicated by the actual sequence and the current cell, which can, to some extent, avoid interference impact caused by intensive cells to access by the UE when the UE accesses the current cell, coordinate inter-cell interference of a common control channel, and improve performance of detection on the common control channel.

Optionally, the one of the at least one candidate sequence is a complete sequence; or the one of the at least one candidate sequence is a segmental sequence in a complete sequence.

Optionally, besides a first candidate access resource, at least one candidate access resource exists in the multiple candidate access resources. The first candidate access resource is a resource having a frequency domain width of N resource blocks in a center of the current cell, and N is a preconfigured natural number. In addition, N may be specified in a protocol, or specified according to a policy of an operator.

Optionally, the processor 1502 is further configured to send a broadcast channel in the current cell by using the transmitter 1501. The broadcast channel carries bandwidth indication information of the current cell, and the bandwidth indication information of the current cell is used for indicating a bandwidth of the current cell.

Optionally, the processor 1502 is further configured to: if the actual access resource includes a first actual access resource and a second actual access resource, by using the transmitter 1501, send a first random access configuration of the current cell on a broadcast channel resource or common channel resource corresponding to the first actual access resource, and send a second random access configuration of the current cell on a broadcast channel resource or common channel resource corresponding to the second actual access resource.

Optionally, the processor 1502 is further configured to send a second reference signal at the resource location of the actual access resource by using the transmitter 1501. The second reference signal is a reference signal segment clipped from a first reference signal and corresponding to the resource location, and the first reference signal is a reference signal generated by using a center frequency point of the current cell as a center and using a quantity of resource blocks included in the bandwidth of the current cell as a frequency domain width; or the second reference signal is a reference signal segment clipped from a frequency domain center of a first reference signal and corresponding to a first frequency domain width, the first frequency domain width is a frequency domain width occupied by the actual access resource, a reference signal in the bandwidth of the current cell is a cyclic shift of the first reference signal, and the first reference signal is a reference signal generated by using a center frequency point of the current cell as a center and using a quantity of resource blocks included in the bandwidth of the current cell as a frequency domain width.

Optionally, when configured to determine the actual access resource of the current cell of the base station 1500, the processor 1502 is specifically configured to: if the resource location of the actual access resource is not a frequency domain center location of the current cell, process a subcarrier in a center of the actual access resource as a virtual direct current subcarrier when determining division of resource blocks in the actual access resource.

Figure 16:
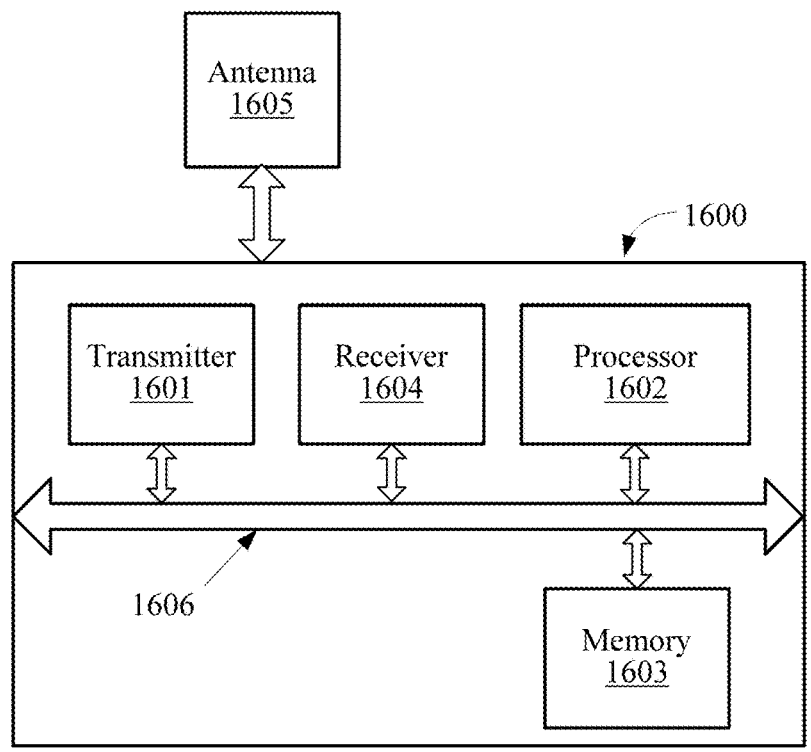
FIG. 16 is a simplified structural diagram of still another user equipment according to an embodiment of the present application.

FIG. 16 is a simplified structural diagram of user equipment 1600 according to an embodiment of the present application. The user equipment 1600 may include: a processor 1602, a memory 1603, a transmitter 1601, and a receiver 1604.

The receiver 1604, the transmitter 1601, the processor 1602, and the memory 1603 are connected to each other by using a bus 1606 system. The bus 1606 may be an ISA bus, a PCI bus, an EISA bus, or the like. The bus may be classified into an address bus, a data bus, a control bus, and the like. For ease of illustration, in FIG. 16, the bus is represented by using only one double-sided arrow, which, however, does not indicate that there is only one bus or only one type of bus. In specific application, the transmitter 1601 and the receiver 1604 may be coupled to an antenna 1605.

The memory 1603 is configured to store a program. Specifically, the program may include program code, where the program code includes a computer operation instruction. The memory 1603 may include a read-only memory and a random access memory, and provides an instruction and data to the processor 1602. The memory 1603 may include a high-speed RAM memory, and may further include a non-volatile memory, for example, at least one magnetic disk memory.

The processor 1602 executes the program stored in the memory 1603, to determine at least one candidate sequence of a synchronization signal of an access cell and multiple candidate access resources of the access cell, detect the synchronization signal according to the at least one candidate sequence by using the receiver 1604, and receive, by using the receiver 1604, a broadcast channel of the access cell on a broadcast channel resource corresponding to an actual access resource on which the detected synchronization signal is located, where the actual access resource is one of the multiple candidate access resources, the broadcast channel carries resource indication information, and the resource indication information is used for indicating the actual access resource in the multiple candidate access resources, or the resource indication information is used for indicating a location relationship between the actual access resource and a resource on which the access cell is located; and the processor 1602 is further configured to determine a resource location of the actual access resource in the access cell according to the resource indication information.

Any one of the foregoing embodiments like that in FIG. 8 of the present application and the methods disclosed in Embodiments 3 and 4 of the present application and executed by a coordination device may be applied to the processor 1602, or implemented by the processor 1602. The processor 1602 may be an integrated circuit chip and has a signal processing capability. In an implementation process, steps of the foregoing method may be completed by using an integrated logical circuit of hardware in the processor 1602 or an instruction in a form of software. The processor 1602 may be a general-purpose processor, including a central processing unit (CPU), a network processor (NP), and the like; and may also be a digital signal processor (DSP), an application-specific integrated circuit (ASIC), a field programmable gate array (FPGA) or another programmable logical device, discrete gate or transistor logic device, or discrete hardware assembly. The processor may implement or execute methods, steps, and logical block diagrams disclosed in the embodiments of the present application. The general-purpose processor may be a microprocessor or the processor may be any regular processor, or the like. Steps of the methods disclosed with reference to the embodiments of the present application may be directly executed and completed by means of a hardware decoding processor, or may be executed and completed by using a combination of hardware and software modules in a decoding processor. The software modules may be located in a mature storage medium in the art, such as a random access memory, a flash memory, a read-only memory, a programmable read-only memory, an electronically erasable programmable memory, or a register. The storage medium is located in the memory 1603, and the processor 1602 reads information in the memory 1603, and completes the steps of the methods in combination with hardware of the processor 1602.

In this embodiment of the present application, the user equipment 1600 determines a resource location of an actual access resource in an access cell by using the actual access resource of a detected synchronization signal and resource indication information received on a broadcast channel, which can, to some extent, avoid interference impact caused by intensive cells to access by the UE, coordinate inter-cell interference of a common control channel, and improve performance of detection on the common control channel.

Optionally, in an embodiment, when the resource indication information is used for indicating the actual access resource in the multiple candidate access resources, a corresponding location relationship exists between each candidate access resource in the multiple candidate access resources and the resource on which the access cell is located, and the processor 1602 is specifically configured to: determine the actual access resource in the multiple candidate access resources according to the resource indication information; and determine the resource location of the actual access resource in the access cell according to the corresponding location relationship existing between each candidate access resource in the multiple candidate access resources and the resource on which the access cell is located.

Optionally, in another embodiment, when the resource indication information is used for indicating the location relationship between the actual access resource and the resource on which the access cell is located, when configured to determine the resource location of the actual access resource in the access cell according to the resource indication information, the processor 1602 is specifically configured to: determine the resource location of the actual access resource in the access cell according to the location relationship, indicated by the resource indication information, between the actual access resource and the resource on which the access cell is located.

Optionally, the processor 1602 is further configured to determine a cell identifier of the access cell according to the resource location of the actual access resource in the access cell and an actual sequence of the detected synchronization signal.

Optionally, the processor 1602 is further configured to: if the actual access resource includes a first actual access resource and a second actual access resource, respectively acquire a first random access configuration and a second random access configuration on the first actual access resource and the second actual access resource by using the receiver 1603. The first random access configuration corresponds to the first actual access resource, and the second random access configuration corresponds to the second actual access resource.

Optionally, the processor 1602 is further configured to determine a second reference signal that is at the resource location of the actual access resource. The second reference signal is a reference signal segment clipped from a first reference signal and corresponding to the resource location, and the first reference signal is a reference signal generated by using a center frequency point of the access cell as a center and using a quantity of resource blocks included in a bandwidth of the access cell as a frequency domain width; or the second reference signal is a reference signal segment clipped from a frequency domain center of a first reference signal and corresponding to a first frequency domain width, the first frequency domain width is a frequency domain width occupied by the actual access resource, a reference signal in a bandwidth of the access cell is a cyclic shift of the first reference signal, and the first reference signal is a reference signal generated by using a center frequency point of the access cell as a center and using a quantity of resource blocks included in the bandwidth of the access cell as a frequency domain width.

Optionally, the processor 1602 is further configured to: if the resource location of the actual access resource is not a frequency domain center location of the access cell, process a subcarrier in a center of the actual access resource as a virtual direct current subcarrier when determining division of resource blocks in the actual access resource.

Optionally, the broadcast channel resource corresponding to the actual access resource is a resource on a predefined side of a center frequency point of the actual access resource.

Figure 17:
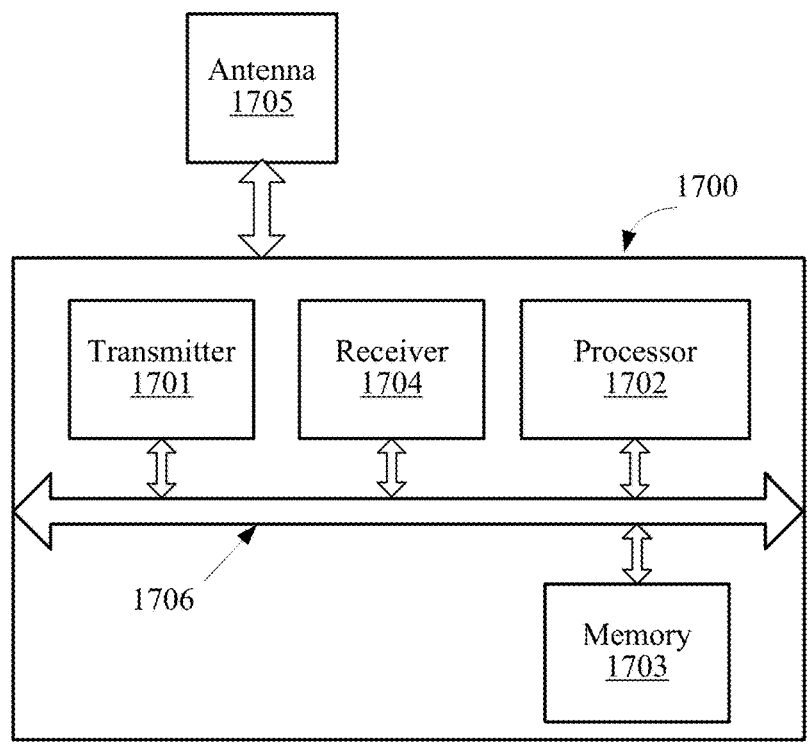
FIG. 17 is a simplified structural diagram of still another base station according to an embodiment of the present application.

FIG. 17 is a simplified structural diagram of a base station 1700 according to an embodiment of the present application. The base station 1700 may include: a processor 1702, a memory 1703, a transmitter 1701, and a receiver 1704.

The receiver 1704, the transmitter 1701, the processor 1702, and the memory 1703 are connected to each other by using a bus 1706 system. The bus 1706 may be an ISA bus, a PCI bus, an EISA bus, or the like. The bus may be classified into an address bus, a data bus, a control bus, and the like. For ease of illustration, in FIG. 17, the bus is represented by using only one double-sided arrow, which, however, does not indicate that there is only one bus or only one type of bus. In specific application, the transmitter 1701 and the receiver 1704 may be coupled to an antenna 1705.

The memory 1703 is configured to store a program. Specifically, the program may include program code, where the program code includes a computer operation instruction. The memory 1703 may include a read-only memory and a random access memory, and provides an instruction and data to the processor 1702. The memory 1703 may include a high-speed RAM memory, and may further include a non-volatile memory, for example, at least one magnetic disk memory.

The processor 1702 executes the program stored in the memory 1703, to determine an actual access resource of a current cell of the base station and an actual sequence of a synchronization signal of the current cell. The actual access resource is at least one candidate access resource in multiple candidate access resources of the current cell, and the actual sequence is one of at least one candidate sequence of the synchronization signal. The processor 1702 is further configured to send, by using the transmitter 1701, the synchronization signal of the current cell on the actual access resource by using the actual sequence, and send, by using the transmitter 1701, a broadcast channel on a broadcast channel resource corresponding to the actual access resource. The broadcast channel carries resource indication information, and the resource indication information is used for indicating the actual access resource in the multiple candidate access resources, or the resource indication information is used for indicating a location relationship between the actual access resource and a resource on which the current cell is located.

Any one of the foregoing embodiments like that in FIG. 9 of the present application and the methods disclosed in Embodiments 5 and 6 of the present application and executed by a coordination device may be applied to the processor 1702, or implemented by the processor 1702. The processor 1702 may be an integrated circuit chip and has a signal processing capability. In an implementation process, steps of the foregoing method may be completed by using an integrated logical circuit of hardware in the processor 1702 or an instruction in a form of software. The processor 1702 may be a general-purpose processor, including a central processing unit (CPU), a network processor (NP), and the like; and may also be a digital signal processor (DSP), an application-specific integrated circuit (ASIC), a field programmable gate array (FPGA) or another programmable logical device, discrete gate or transistor logic device, or discrete hardware assembly. The processor may implement or execute methods, steps, and logical block diagrams disclosed in the embodiments of the present application. The general-purpose processor may be a microprocessor or the processor may be any regular processor, or the like. Steps of the methods disclosed with reference to the embodiments of the present application may be directly executed and completed by means of a hardware decoding processor, or may be executed and completed by using a combination of hardware and software modules in a decoding processor. The software modules may be located in a mature storage medium in the art, such as a random access memory, a flash memory, a read-only memory, a programmable read-only memory, an electronically erasable programmable memory, or a register. The storage medium is located in the memory 1703, and the processor 1702 reads information in the memory 1703, and completes the steps of the methods in combination with hardware of the processor 1702.

In this embodiment of the present application, the base station 1700 sends a resource indication information on a broadcast channel of an actual access resource for sending a synchronization signal, so that a UE side can determine a resource location of the actual access resource in a current cell according to the resource indication information, which can, to some extent, avoid interference impact caused by intensive cells to access by UE when the UE accesses the current cell, coordinate inter-cell interference of a common control channel, and improve performance of detection on the common control channel.

Optionally, the resource location of the actual access resource in the current cell and the actual sequence of the synchronization signal are further used for indicating a cell identifier of the current cell.

Optionally, the processor 1702 is further configured to: if the actual access resource includes a first actual access resource and a second actual access resource, respectively send, by using the transmitter 1701, a first random access configuration and a second random access configuration on a broadcast channel resource or common channel resource corresponding to the first actual access resource and a broadcast channel resource or common channel resource corresponding to the second actual access resource. The first random access configuration corresponds to the first actual access resource, and the second random access configuration corresponds to the second actual access resource.

Optionally, the processor 1702 is further configured to send a second reference signal at the resource location of the actual access resource by using the transmitter 1701. The second reference signal is a reference signal segment clipped from a first reference signal and corresponding to the resource location, and the first reference signal is a reference signal generated by using a center frequency point of the current cell as a center and using a quantity of resource blocks included in a bandwidth of the current cell as a frequency domain width; or the second reference signal is a reference signal segment clipped from a frequency domain center of a first reference signal and corresponding to a first frequency domain width, the first frequency domain width is a frequency domain width occupied by the actual access resource, a reference signal in a bandwidth of the current cell is a cyclic shift of the first reference signal, and the first reference signal is a reference signal generated by using a center frequency point of the current cell as a center and using a quantity of resource blocks included in the bandwidth of the current cell as a frequency domain width.

Optionally, when configured to determine the actual access resource of the current cell of the base station 1700, the processor 1702 is specifically configured to: if the resource location of the actual access resource is not a frequency domain center location of the current cell, process a subcarrier in a center of the actual access resource as a virtual direct current subcarrier when determining division of resource blocks in the actual access resource.

Optionally, the broadcast channel resource corresponding to the actual access resource is a resource on a predefined side of a center frequency point of the actual access resource.

It should be understood that sequence numbers of the foregoing processes do not mean execution sequences in various embodiments of the present application. The execution sequences of the processes should be determined according to functions and internal logic of the processes, and should not be construed as any limitation on the implementation processes of the embodiments of the present application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present application. The foregoing storage medium includes: any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method for acquiring information of access resources, comprising:
   detecting, by a terminal device, a synchronization signal of a cell to be accessed by the terminal device;
   receiving, by the terminal device, a broadcast channel of the cell on a broadcast channel resource; and
   determining, by the terminal device, a resource on which the cell is located according to resource indication information carried in the broadcast channel;
   wherein the broadcast channel resource corresponds to an actual access resource, and the synchronization signal is detected on the actual access resource;
   wherein the actual access resource is one of a plurality of candidate access resources of the cell; and
   wherein the resource indication information indicates a location relationship between the actual access resource and the resource on which the cell is located.

2. The method according to claim 1, wherein the actual access resource comprises a first actual access resource and a second actual access resource, the first actual access resource corresponds to a first random access configuration, and the second actual access resource corresponds to a second random access configuration.

3. The method according to claim 2, wherein the first random access configuration and the second random access configuration are uplink random access configurations, and each uplink random access configuration comprises preamble sequences for uplink random access.

4. The method according to claim 1, wherein the resource on which the cell is located is an entire carrier resource on which the cell is located.

5. The method according to claim 1, wherein the location relationship between the actual access resource and the resource on which the cell is located is a frequency offset between a resource location of the actual access resource and a lowest frequency resource location of the resource on which the cell is located.

6. The method according to claim 1, further comprising:
   determining, by the terminal device, a candidate sequence of the synchronization signal of the cell;
   and wherein detecting the synchronization signal of the cell comprises:
   detecting, by the terminal device, the synchronization signal of the cell according to the candidate sequence of the synchronization signal.

7. The method according to claim 6, wherein the candidate sequence is a Zadoff-Chu sequence or an m sequence.

8. The method according to claim 1, further comprising:
   determining, by the terminal device, the plurality of candidate access resources of the cell.

9. The method according to claim 1, wherein the resource indication information is carried by a payload or a time/frequency resource location in the broadcast channel.

10. The method according to claim 1, wherein the broadcast channel further carries bandwidth information of the cell.

11. An apparatus, comprising:
    one or more processors, and
    a non-transitory storage medium configure to store program instructions;
    wherein, when executed by the one or more processors, the instructions cause the apparatus to perform a method that comprises:
    detecting a synchronization signal of a cell to be accessed by the apparatus;
    receiving a broadcast channel of the cell on a broadcast channel resource; and
    determining a resource on which the cell is located according to resource indication information carried in the broadcast channel;

wherein the broadcast channel resource corresponds to an actual access resource, and the synchronization signal is detected on the actual access resource;

wherein the actual access resource is one of a plurality of candidate access resources of the cell; and wherein the resource indication information indicates a location relationship between the actual access resource and the resource on which the cell is located.

12. The apparatus according to claim 11, wherein the actual access resource comprises a first actual access resource and a second actual access resource, the first actual access resource corresponds to a first random access configuration, and the second actual access resource corresponds to a second random access configuration.

13. The apparatus according to claim 12, wherein the first random access configuration and the second random access configuration are uplink random access configurations, and each uplink random access configuration comprises preamble sequences for uplink random access.

14. The apparatus according to claim 11, wherein the resource on which the cell is located is an entire carrier resource on which the cell is located.

15. The apparatus according to claim 11, wherein the location relationship between the actual access resource and the resource on which the cell is located is a frequency offset between a resource location of the actual access resource and a lowest frequency resource location of the resource on which the cell is located.

16. The apparatus according to claim 11, wherein the method further comprises:
    determining a candidate sequence of the synchronization signal of the cell;
    and wherein detecting the synchronization signal of the cell comprises:
        detecting the synchronization signal of the cell according to the candidate sequence of the synchronization signal.

17. The apparatus according to claim 16, wherein the candidate sequence is a Zadoff-Chu sequence or an m sequence.

18. The apparatus according to claim 11, wherein the method further comprises:
    determining the plurality of candidate access resources of the cell.

19. The apparatus according to claim 11, wherein the resource indication information is carried by a payload or a time/frequency resource location in the broadcast channel.

20. The apparatus according to claim 11, wherein the broadcast channel further carries bandwidth information of the cell.

21. The apparatus according to claim 11, wherein the apparatus is a terminal device.

22. A non-transitory computer-readable medium having program instructions recorded thereon, wherein, when executed by a processor of a terminal device, the instructions cause the terminal device to:
    detect a synchronization signal of a cell to be accessed by the terminal device;
    receive a broadcast channel of the cell on a broadcast channel resource; and
    determine a resource on which the cell is located according to resource indication information carried in the broadcast channel;
    wherein the broadcast channel resource corresponds to an actual access resource, and the synchronization signal is detected on the actual access resource;
    wherein the actual access resource is one of a plurality of candidate access resources of the cell; and
    wherein the resource indication information indicates a location relationship between the actual access resource and the resource on which the cell is located.

* * * * *

UNITED STATES PATENT AND TRADEMARK OFFICE
CERTIFICATE OF CORRECTION

PATENT NO. : 10,687,332 B2  
APPLICATION NO. : 15/947876  
DATED : June 16, 2020  
INVENTOR(S) : Lixia Xue et al.

Page 1 of 4

It is certified that error appears in the above-identified patent and that said Letters Patent is hereby corrected as shown below:

In the Claims

From Column 69, Line 63, to Column 72, Line 35, delete all claims. At Column 69, Line 63, insert the following therefor:

-- What is claimed is:
1. A method for acquiring information of access resources, comprising:
   detecting, by a terminal device, a synchronization signal of a cell to be accessed by the terminal device;
   receiving, by the terminal device, a broadcast channel of the cell on a broadcast channel resource; and
   obtaining, by the terminal device, a resource on which the cell is located according to resource indication information carried in the broadcast channel;
   wherein the broadcast channel resource corresponds to an actual access resource, and the synchronization signal is detected on the actual access resource;
   wherein the actual access resource is one of a plurality of candidate access resources of the cell; and
   wherein the resource indication information indicates a location relationship between the actual access resource and the resource on which the cell is located.

2. The method according to claim 1, wherein the actual access resource comprises a first actual access resource and a second actual access resource, the first actual access resource corresponds to a first random access configuration, and the second actual access resource corresponds to a second random access configuration.

3. The method according to claim 2, wherein the first random access configuration and the second random access configuration are uplink random access configurations, and each uplink random access configuration comprises preamble sequences for uplink random access.

Signed and Sealed this  
Twentieth Day of July, 2021

Drew Hirshfeld  
*Performing the Functions and Duties of the*  
*Under Secretary of Commerce for Intellectual Property and*  
*Director of the United States Patent and Trademark Office*

4. The method according to claim 1, wherein the resource on which the cell is located is an entire carrier resource on which the cell is located.

5. The method according to claim 1, wherein the location relationship between the actual access resource and the resource on which the cell is located is a frequency offset between a resource location of the actual access resource and a lowest frequency resource location of the resource on which the cell is located.

6. The method according to claim 1, further comprising:
    determining, by the terminal device, a candidate sequence of the synchronization signal of the cell;
and wherein detecting the synchronization signal of the cell comprises:
    detecting, by the terminal device, the synchronization signal of the cell according to the candidate sequence of the synchronization signal.

7. The method according to claim 6, wherein the candidate sequence is a Zadoff-Chu sequence or an m sequence.

8. The method according to claim 1, further comprising:
    determining, by the terminal device, the plurality of candidate access resources of the cell.

9. The method according to claim 1, wherein the resource indication information is carried by a payload or a time/frequency resource location in the broadcast channel.

10. The method according to claim 1, further comprising:
    receiving, by the terminal device, bandwidth information of the cell for indicating a bandwidth of the cell.

11. An apparatus, comprising:
one or more processors, and
a non-transitory storage medium configure to store program instructions;
wherein, when executed by the one or more processors, the instructions cause the apparatus to perform a method that comprises:
    detecting a synchronization signal of a cell to be accessed by the apparatus;
    receiving a broadcast channel of the cell on a broadcast channel resource; and
    obtaining a resource on which the cell is located according to resource indication information carried in the broadcast channel;
    wherein the broadcast channel resource corresponds to an actual access resource, and the synchronization signal is detected on the actual access resource;
    wherein the actual access resource is one of a plurality of candidate access resources of the cell; and
wherein the resource indication information indicates a location relationship between the actual access resource and the resource on which the cell is located.

12. The apparatus according to claim 11, wherein the actual access resource comprises a first actual access resource and a second actual access resource, the first actual access resource corresponds to a first random access configuration, and the second actual access resource corresponds to a second random access configuration.

13. The apparatus according to claim 12, wherein the first random access configuration and the second random access configuration are uplink random access configurations, and each uplink random access configuration comprises preamble sequences for uplink random access.

14. The apparatus according to claim 11, wherein the resource on which the cell is located is an entire carrier resource on which the cell is located.

15. The apparatus according to claim 11, wherein the location relationship between the actual access resource and the resource on which the cell is located is a frequency offset between a resource location of the actual access resource and a lowest frequency resource location of the resource on which the cell is located.

16. The apparatus according to claim 11, wherein the method further comprises:
    determining a candidate sequence of the synchronization signal of the cell;
    and wherein detecting the synchronization signal of the cell comprises:
        detecting the synchronization signal of the cell according to the candidate sequence of the synchronization signal.

17. The apparatus according to claim 16, wherein the candidate sequence is a Zadoff-Chu sequence or an m sequence.

18. The apparatus according to claim 11, wherein the method further comprises:
    determining the plurality of candidate access resources of the cell.

19. The apparatus according to claim 11, wherein the resource indication information is carried by a payload or a time/frequency resource location in the broadcast channel.

20. The apparatus according to claim 11, wherein the apparatus is a terminal device.

21. The apparatus according to claim 11, wherein the method further comprises:
    receiving bandwidth information of the cell for indicating a bandwidth of the cell.

22. A non-transitory computer-readable medium having program instructions recorded thereon, wherein, when executed by a processor of a terminal device, the instructions cause the terminal device to:
    detect a synchronization signal of a cell to be accessed by the terminal device;
    receive a broadcast channel of the cell on a broadcast channel resource; and
    obtain a resource on which the cell is located according to resource indication information carried in the broadcast channel;
    wherein the broadcast channel resource corresponds to an actual access resource, and the synchronization signal is detected on the actual access resource;
    wherein the actual access resource is one of a plurality of candidate access resources of the cell; and wherein the resource indication information indicates a location relationship between the actual access resource and the resource on which the cell is located. --